(12) United States Patent
Duan et al.

(10) Patent No.: US 10,714,272 B2
(45) Date of Patent: Jul. 14, 2020

(54) GRAPHENE FRAMEWORKS FOR SUPERCAPACITORS

(71) Applicant: THE REGENTS OF THE UNIVERSITY OF CALIFORNIA, Oakland, CA (US)

(72) Inventors: Xiangfeng Duan, Los Angeles, CA (US); Yu Huang, Los Angeles, CA (US); Benjamin Papandrea, Los Angeles, CA (US); Xu Xu, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 15/415,732

(22) Filed: Jan. 25, 2017

(65) Prior Publication Data

US 2017/0213656 A1 Jul. 27, 2017

Related U.S. Application Data

(60) Provisional application No. 62/287,402, filed on Jan. 26, 2016, provisional application No. 62/287,403, filed on Jan. 26, 2016.

(51) Int. Cl.
*H01G 11/32* (2013.01)
*H01G 11/36* (2013.01)
(Continued)

(52) U.S. Cl.
CPC ............ *H01G 11/32* (2013.01); *H01G 11/24* (2013.01); *H01G 11/28* (2013.01); *H01G 11/36* (2013.01);
(Continued)

(58) Field of Classification Search
CPC ........ H01G 11/32; H01G 11/24; H01G 11/28; H01G 11/36; H01G 11/46; H01G 11/66;
(Continued)

(56) References Cited

U.S. PATENT DOCUMENTS

2009/0305135 A1* 12/2009 Shi .................. B82Y 30/00
429/217
2013/0021718 A1 1/2013 Yager
(Continued)

FOREIGN PATENT DOCUMENTS

| CN | 101780952 A | 7/2010 |
| CN | 103199224 A | 7/2013 |

(Continued)

OTHER PUBLICATIONS

Chen, H. et al. (2015) "Monodispersed Sulfur Nanoparticles for Lithium-Sulfur Batteries with Theoretical Performance," Nano Lett. 15:798-802.
(Continued)

*Primary Examiner* — Michael P Mcfadden
(74) *Attorney, Agent, or Firm* — Foley & Lardner LLP

(57) ABSTRACT

The present disclosure provides supercapacitors that may avoid shortcomings of current energy storage technology. Provided herein are materials and fabrication processes of such supercapacitors. In some embodiments, an electrochemical system comprising a first electrode, a second electrode, wherein at least one of the first electrode and the second electrode comprises a three dimensional porous reduced graphene oxide framework.

22 Claims, 19 Drawing Sheets

(51) Int. Cl.
*H01G 11/24* (2013.01)
*H01G 11/28* (2013.01)
*H01G 11/66* (2013.01)
*H01G 11/86* (2013.01)
*H01G 11/70* (2013.01)
*H01G 11/04* (2013.01)
*H01G 11/46* (2013.01)
*H01G 11/58* (2013.01)

(52) U.S. Cl.
CPC ............. *H01G 11/66* (2013.01); *H01G 11/86* (2013.01); *H01G 11/04* (2013.01); *H01G 11/46* (2013.01); *H01G 11/58* (2013.01); *H01G 11/70* (2013.01); *Y02E 60/13* (2013.01); *Y02T 10/7022* (2013.01)

(58) Field of Classification Search
CPC ........ H01G 11/70; H01G 11/86; H01G 11/04; H01G 11/58; Y02E 60/13
USPC ......................................................... 361/502
See application file for complete search history.

(56) References Cited

U.S. PATENT DOCUMENTS

| | | | |
|---|---|---|---|
| 2013/0182373 A1 | 7/2013 | Yu et al. | |
| 2013/0315816 A1* | 11/2013 | Watson | C01B 32/23 423/448 |
| 2014/0030590 A1 | 1/2014 | Wang et al. | |
| 2015/0235730 A1* | 8/2015 | Afzali-Ardakani | H01B 1/04 428/201 |
| 2015/0340170 A1 | 11/2015 | Jun et al. | |
| 2016/0043384 A1* | 2/2016 | Zhamu | H01M 4/133 429/231.4 |
| 2016/0099116 A1* | 4/2016 | Yang | H01G 11/86 264/406 |
| 2017/0014780 A1* | 1/2017 | Birss | B01J 20/324 |
| 2017/0179477 A1* | 6/2017 | Walters | H01M 4/136 |

FOREIGN PATENT DOCUMENTS

| | | |
|---|---|---|
| CN | 103395778 A | 11/2013 |
| KR | 10-2013-0124635 A | 11/2013 |
| WO | WO-2013/132388 A1 | 9/2013 |
| WO | WO-2015/069332 A1 | 5/2015 |

OTHER PUBLICATIONS

Cheng, X-B. et al. (2013) "Aligned carbon nanotube/sulfur composite cathodes with high sulfur content for lithium-sulfur batteries," Nano Energy 4:65-72.
He, G. et al. (2011) "High 'C' rate Li—S cathodes: sulfur imbibed bimodal porous carbons," Energy Environ. Sci. 4:2878-2883.
Ji, X. et al. (2009) "A highly ordered nanostructured carbon-sulphur cathode for lithium-sulphur batteries," Nat. Mater. 8:500-506.
Kim, H. et al. (2014) "Graphene for advanced Li/S and Li/air batteries," J. Mater. Chem. A 2:33-47.
Li, W. et al. (2015) "A Sulfur Cathode with Pomegranate-Like Cluster Structure," Adv. Energy Mater. 5:1500211.
Li, Z. et al. (2014) "A Highly Ordered Meso©Microporous Carbon-Supported Sulfur©Smaller Sulfur Core-Shell Structured Cathode for LiS Batteries," ASC Nano 8(9):9295-9303.
Lu, S. et al. (2014) "Three-Dimensional Sulfur/Graphene Multifunctional Hybrid Sponges for Lithium-Sulfur Batteries with Large Areal Mass Loading," Sci. Rep. 4:4629.
Papandrea, B. et al. (2016) "Three-dimensional graphene framework with ultra-high sulfur content for a robust lithium-sulfur battery," Nano Res. 9:240-248.
Park, M-S. et al. (2012) "One-step synthesis of a sulfur-impregnated graphene cathode for lithium-sulfur batteries," Phys. Chem. Chem. Phys. 14:6796-6804.
Tang, Z. et al. (2010) Noble-Metal-Promoted Three-Dimensional Macroassembly of Single-Layered Graphene Oxide, Angew. Chem. Int. Ed. 49:4603-4607.
Xi, K. et al. (2014) "Binder free three-dimensional sulphur/few-layer graphene foam cathode with enhanced high-rate capability for rechargeable lithium sulphur batteries," Nanoscale 6:5746-5753.
Xu, G-L. et al. (2013) "Porous Graphitic Carbon Loading Ultra High Sulfur as High-Performance Cathode of Rechargeable Lithium-Sulfur Batteries," ACS Appl. Mater. Interfaces 5:10782-10793.
Xu, Y. et al. (2010) "Self-Assembled Graphene Hydrogel via a One-Step Hydrothermal Process," ACS Nano 4(7):4324-4330.
Xu, Y. et al. (2013) "Flexible solid-state supercapacitors based on three-dimensional graphene hydrogel films," ACS Nano 7:4042-4049.
Xu, Y. et al. (2013) "Functionalized Graphene Hydrogel-Based High-Performance Supercapacitors," Adv. Mater. 25:5779-5784.
Xu, Y. et al. (2013) "One-step strategy to graphene/Ni(OH)2 composite hydrogels as advanced three-dimensional supercapacitor electrode materials," Nano Res. 6:65-76.
Xu, Y. et al. (2014) "Holey grapheme frameworks for highly efficient capacitive energy storage," Nature Communications 5:4554.
Xu, Y. et al. (2015) "Self-Assembled Three-Dimensional Graphene Macrostructures: Synthesis and Applications in Supercapacitors," Acc. Chem. Res. 248:1666-1675.
Xu, Y. et al. (2015) "Solution Processable Holey Graphene Oxide and Its Derived Macrostructures for High-Performance Supercapacitors," Nano Lett. 15:4605-4610.
Zhang, K. et al. (2013) "Composite of sulfur impregnated in porous hollow carbon spheres as the cathode of Li—S batteries with high performance," Nano Research 6(1):38-46.
Zhou, G. et al. (2013) "Fibrous Hybrid of Graphene and Sulfur Nanocrystals for High-Performance Lithium-Sulfur Batteries," ACS Nano 7:5367-5375.
International Search Report and Written Opinion for International Application No. PCT/US2017/014979 dated May 11, 2017, 12 pages.
Xu et al., "Holey Graphene Frameworks for Highly Efficient Capacitive Energy Storage," Nature Communications, 5, (2014) DOI: 10.1038/ncomms5554, 8 pages.
Choi et al., "3D Macroporous Graphene Frameworks for Supercapacitors with High Energy and Power Densities", ACS NANO, vol. 6, No. 5, May 22, 2012, pp. 4020-4028.
Extended European Search Report issued in EP Application No. 17744849.5 dated Aug. 12, 2019, 7 pages.
Kong et al., "Free-Standing T-Nb2O5/Graphene Composite Papers with Ultrahigh Gravimetric/Volumetric Capacitance for Li-Ion Intercalation Pseudocapacitor", ACS NANO, vol. 9, No. 11, Nov. 24, 2015, pp. 11200-11208.
First Office Action and Search Report on CN Application No. 201780008342.X dated Mar. 12, 2020, 30 pages.

* cited by examiner

GRAPHENE FRAMEWORKS FOR SUPERCAPACITORS

CROSS-REFERENCE

This application claims the benefit of U.S. Provisional Application No. 62/287,402, filed Jan. 26, 2016, and U.S. Provisional Application No. 62/287,403, filed Jan. 26, 2016, which applications are incorporated herein by reference.

BACKGROUND

As a result of the rapidly growing energy needs of modern life, the development of high performance electrical energy storage devices has gained significant attention. Supercapacitors are promising electrical energy storage devices with properties intermediate between those of batteries and traditional capacitors, but are being improved more rapidly than either. Over the past couple of decades, supercapacitors have become key components of everyday products by replacing batteries and capacitors in an increasing number of applications. The future growth of this technology depends on further improvements in energy density, power density, cycle life and production cost.

SUMMARY

The instant inventors have recognized and provided a solution to the need for higher performance electrical energy storage devices (EESDs). Provided herein are graphene materials, compositions of matter, fabrication processes and devices with improved performance. Features of the subject matter described here provide for high power density and excellent low temperature performance, including but not limited to applications for back-up power, cold starting, flash cameras, regenerative braking and hybrid electric vehicles.

The applications described herein provide for improvements in the areas of electronics and energy storage systems with high power densities. Many conventional supercapacitors exhibit low energy and power densities, and low cycling and capacitive capabilities. While normal electronic devices have seen very rapid progress following Moore's law, electrical energy storage devices have advanced only slightly because of the lack of new materials with high charge storage capacity.

The present disclosure provides supercapacitors that may avoid shortcomings of current energy storage technology. Provided herein are materials and fabrication processes of such supercapacitors. In some embodiments, an electrochemical system comprising a first electrode, a second electrode, wherein at least one of the first electrode and the second electrode comprises a three dimensional porous reduced graphene oxide framework. In some embodiments, the energy storage device further comprises an electrolyte disposed between the first electrode and the second electrode. In some embodiments, the electrolyte is an aqueous electrolyte. In some embodiments, the electrochemical system further comprises a separator disposed between the first electrode and the second electrode. In some embodiments, the electrochemical system further comprises a current collector.

One aspect provided herein is an electrode comprising a 3D graphene framework, comprising an interconnected conductive network of graphene sheets with a porous structure (e.g., a hierarchical porous structure), and a composite material comprising a capacitive or pseudo-capacitive material.

In some embodiments, the 3D graphene framework comprises a holey 3D graphene framework.

In some embodiments, the electrode has a specific surface area of about 450 $m^2/g$ to about 3,000 $m^2/g$. In some embodiments, the electrode has a specific surface area of at least about 450 $m^2/g$. In some embodiments, the electrode has a specific surface area of at most about 3,000 $m^2/g$. In some embodiments, the electrode has a specific surface area of about 450 $m^2/g$ to about 600 $m^2/g$, about 450 $m^2/g$ to about 750 $m^2/g$, about 450 $m^2/g$ to about 900 $m^2/g$, about 450 $m^2/g$ to about 1,050 $m^2/g$, about 450 $m^2/g$ to about 1,200 $m^2/g$, about 450 $m^2/g$ to about 1,800 $m^2/g$, about 450 $m^2/g$ to about 2,200 $m^2/g$, about 450 $m^2/g$ to about 2,600 $m^2/g$, about 450 $m^2/g$ to about 3,000 $m^2/g$, about 600 $m^2/g$ to about 750 $m^2/g$, about 600 $m^2/g$ to about 900 $m^2/g$, about 600 $m^2/g$ to about 1,050 $m^2/g$, about 600 $m^2/g$ to about 1,200 $m^2/g$, about 600 $m^2/g$ to about 1,800 $m^2/g$, about 600 $m^2/g$ to about 2,200 $m^2/g$, about 600 $m^2/g$ to about 2,600 $m^2/g$, about 600 $m^2/g$ to about 3,000 $m^2/g$, about 750 $m^2/g$ to about 900 $m^2/g$, about 750 $m^2/g$ to about 1,050 $m^2/g$, about 750 $m^2/g$ to about 1,200 $m^2/g$, about 750 $m^2/g$ to about 1,800 $m^2/g$, about 750 $m^2/g$ to about 2,200 $m^2/g$, about 750 $m^2/g$ to about 2,600 $m^2/g$, about 750 $m^2/g$ to about 3,000 $m^2/g$, about 900 $m^2/g$ to about 1,050 $m^2/g$, about 900 $m^2/g$ to about 1,200 $m^2/g$, about 900 $m^2/g$ to about 1,800 $m^2/g$, about 900 $m^2/g$ to about 2,200 $m^2/g$, about 900 $m^2/g$ to about 2,600 $m^2/g$, about 900 $m^2/g$ to about 3,000 $m^2/g$, about 1,050 $m^2/g$ to about 1,200 $m^2/g$, about 1,050 $m^2/g$ to about 1,800 $m^2/g$, about 1,050 $m^2/g$ to about 2,200 $m^2/g$, about 1,050 $m^2/g$ to about 2,600 $m^2/g$, about 1,050 $m^2/g$ to about 3,000 $m^2/g$, about 1,200 $m^2/g$ to about 1,800 $m^2/g$, about 1,200 $m^2/g$ to about 2,200 $m^2/g$, about 1,200 $m^2/g$ to about 2,600 $m^2/g$, about 1,200 $m^2/g$ to about 3,000 $m^2/g$, about 1,800 $m^2/g$ to about 2,200 $m^2/g$, about 1,800 $m^2/g$ to about 2,600 $m^2/g$, about 1,800 $m^2/g$ to about 3,000 $m^2/g$, about 2,200 $m^2/g$ to about 2,600 $m^2/g$, about 2,200 $m^2/g$ to about 3,000 $m^2/g$, or about 2,600 $m^2/g$ to about 3,000 $m^2/g$.

In some embodiments, the electrode has a loading ratio of about 30% to about 99%. In some embodiments, the electrode has a loading ratio of at least about 30%. In some embodiments, the electrode has a loading ratio of at most about 99%. In some embodiments, the electrode has a loading ratio of about 30% to about 40%, about 30% to about 50%, about 30% to about 60%, about 30% to about 70%, about 30% to about 80%, about 30% to about 90%, about 30% to about 99%, about 40% to about 50%, about 40% to about 60%, about 40% to about 70%, about 40% to about 80%, about 40% to about 90%, about 40% to about 99%, about 50% to about 60%, about 50% to about 70%, about 50% to about 80%, about 50% to about 90%, about 50% to about 99%, about 60% to about 70%, about 60% to about 80%, about 60% to about 90%, about 60% to about 99%, about 70% to about 80%, about 70% to about 90%, about 70% to about 99%, about 80% to about 90%, about 80% to about 99%, or about 90% to about 99%.

In some embodiments, the electrode has a cycle lifetime of about 500 cycles to about 2,000,000 cycles. In some embodiments, the electrode has a cycle lifetime of at least about 500 cycles. In some embodiments, the electrode has a cycle lifetime of at most about 2,000,000 cycles. In some embodiments, the electrode has a cycle lifetime of about 500 cycles to about 1,000 cycles, about 500 cycles to about 5,000 cycles, about 500 cycles to about 10,000 cycles, about 500 cycles to about 50,000 cycles, about 500 cycles to about 100,000 cycles, about 500 cycles to about 500,000 cycles, about 500 cycles to about 1,000,000 cycles, about 500 cycles to about 2,000,000 cycles, about 1,000 cycles to about 5,000 cycles, about 1,000 cycles to about 10,000 cycles, about 1,000 cycles to about 50,000 cycles, about 1,000 cycles to about 100,000 cycles, about 1,000 cycles to about 500,000 cycles, about 1,000 cycles to about 1,000,000 cycles, about 1,000 cycles to about 2,000,000 cycles, about 5,000 cycles to about 10,000 cycles, about 5,000 cycles to about 50,000 cycles, about 5,000 cycles to about 100,000 cycles, about 5,000 cycles to about 500,000 cycles, about 5,000 cycles to about 1,000,000 cycles, about 5,000 cycles to about 2,000,000 cycles, about 10,000 cycles to about 50,000 cycles, about 10,000 cycles to about 100,000 cycles, about 10,000 cycles to about 500,000 cycles, about 10,000 cycles to about 1,000,000 cycles, about 10,000 cycles to about 2,000,000 cycles, about 50,000 cycles to about 100,000 cycles, about 50,000 cycles to about 500,000 cycles, about 50,000 cycles to about 1,000,000 cycles, about 50,000 cycles to about 2,000,000 cycles, about 100,000 cycles to about 500,000 cycles, about 100,000 cycles to about 1,000,000 cycles, about 100,000 cycles to about 2,000,000 cycles, about 500,000 cycles to about 1,000,000 cycles, about 500,000 cycles to about 2,000,000 cycles, or about 1,000,000 cycles to about 2,000,000 cycles.

In some embodiments, the electrode has a specific capacity at a C-rate of about 0.1 of about 250 mAh/g to about 2,600 mAh/g. In some embodiments, the electrode has a specific capacity at a C-rate of about 0.1 of at least about 250 mAh/g. In some embodiments, the electrode has a specific capacity at a C-rate of about 0.1 of at most about 4,000 mAh/g. In some embodiments, the electrode has a specific capacity at a C-rate of about 0.1 of about 250 mAh/g to about 500 mAh/g, about 250 mAh/g to about 750 mAh/g, about 250 mAh/g to about 1,000 mAh/g, about 250 mAh/g to about 2,000 mAh/g, about 250 mAh/g to about 3,000 mAh/g, about 250 mAh/g to about 4,000 mAh/g, about 500 mAh/g to about 750 mAh/g, about 500 mAh/g to about 1,000 mAh/g, about 500 mAh/g to about 2,000 mAh/g, about 500 mAh/g to about 3,000 mAh/g, about 500 mAh/g to about 4,000 mAh/g, about 750 mAh/g to about 1,000 mAh/g, about 750 mAh/g to about 2,000 mAh/g, about 750 mAh/g to about 3,000 mAh/g, about 750 mAh/g to about 4,000 mAh/g, about 1,000 mAh/g to about 2,000 mAh/g, about 1,000 mAh/g to about 3,000 mAh/g, about 1,000 mAh/g to about 4,000 mAh/g, about 2,000 mAh/g to about 3,000 mAh/g, about 2,000 mAh/g to about 4,000 mAh/g, or about 3,000 mAh/g to about 4,000 mAh/g.

In some embodiments, the electrode has a porosity of about 90% to about 99%. In some embodiments, the electrode has a porosity of at least about 90%. In some embodiments, the electrode has a porosity of at most about 99%. In some embodiments, the electrode has a porosity of about 90% to about 92%, about 90% to about 94%, about 90% to about 96%, about 90% to about 98%, about 90% to about 99%, about 92% to about 94%, about 92% to about 96%, about 92% to about 98%, about 92% to about 99%, about 94% to about 96%, about 94% to about 98%, about 94% to about 99%, about 96% to about 98%, about 96% to about 99%, or about 98% to about 99%.

In some embodiments, the electrode has a pore diameter of about 0.002 µm to about 100,000 µm. In some embodiments, the electrode has a pore diameter of at least about 0.002 µm. In some embodiments, the electrode has a pore diameter of at most about 100,000 µm. In some embodiments, the electrode has a pore diameter of at most about 100 µm. In some embodiments, the electrode has a pore diameter of about 0.002 µm to about 0.01 µm, about 0.002 µm to about 0.1 µm, about 0.002 µm to about 1 µm, about 0.002 µm to about 10 µm, about 0.002 µm to about 100 µm, about 0.002 µm to about 1,000 µm, about 0.002 µm to about 10,000 µm, about 0.002 µm to about 100,000 µm, about 0.01 µm to about 0.1 µm, about 0.01 µm to about 1 µm, about 0.01 µm to about 10 µm, about 0.01 µm to about 100 µm, about 0.01 µm to about 1,000 µm, about 0.01 µm to about 10,000 µm, about 0.01 µm to about 100,000 µm, about 0.1 µm to about 1 µm, about 0.1 µm to about 10 µm, about 0.1 µm to about 100 µm, about 0.1 µm to about 1,000 µm, about 0.1 µm to about 10,000 µm, about 0.1 µm to about 100,000 µm, about 1 µm to about 10 µm, about 1 µm to about 100 µm, about 1 µm to about 1,000 µm, about 1 µm to about 10,000 µm, about 1 µm to about 100,000 µm, about 10 µm to about 100 µm, about 10 µm to about 1,000 µm, about 10 µm to about 10,000 µm, about 10 µm to about 100,000 µm, about 100 µm to about 1,000 µm, about 100 µm to about 10,000 µm, about 100 µm to about 100,000 µm, about 1,000 µm to about 10,000 µm, about 1,000 µm to about 100,000 µm, about 10,000 µm to about 100,000 µm, about 0.002 µm to about 0.005 µm, about 0.002 µm to about 0.02 µm, about 0.002 µm to about 0.05 µm, about 0.002 µm to about 0.2 µm, about 0.002 µm to about 0.5 µm, about 0.002 µm to about 2 µm, about 0.002 µm to about 5 µm, about 0.002 µm to about 20 µm, about 0.002 µm to about 50 µm, about 0.002 µm to about 100 µm, about 0.005 µm to about 0.02 µm, about 0.005 µm to about 0.05 µm, about 0.005 µm to about 0.2 µm, about 0.005 µm to about 0.5 µm, about 0.005 µm to about 2 µm, about 0.005 µm to about 5 µm, about 0.005 µm to about 20 µm, about 0.005 µm to about 50 µm, about 0.005 µm to about 100 µm, about 0.02 µm to about 0.05 µm, about 0.02 µm to about 0.2 µm, about 0.02 µm to about 0.5 µm, about 0.02 µm to about 2 µm, about 0.02 µm to about 5 µm, about 0.02 µm to about 20 µm, about 0.02 µm to about 50 µm, about 0.02 µm to about 100 µm, about 0.05 µm to about 0.2 µm, about 0.05 µm to about 0.5 µm, about 0.05 µm to about 2 µm, about 0.05 µm to about 5 µm, about 0.05 µm to about 20 µm, about 0.05 µm to about 50 µm, about 0.05 µm to about 100 µm, about 0.2 µm to about 0.5 µm, about 0.2 µm to about 2 µm, about 0.2 µm to about 5 µm, about 0.2 µm to about 20 µm, about 0.2 µm to about 50 µm, about 0.2 µm to about 100 µm, about 0.5 µm to about 2 µm, about 0.5 µm to about 5 µm, about 0.5 µm to about 20 µm, about 0.5 µm to about 50 µm, about 0.5 µm to about 100 µm, about 2 µm to about 5 µm, about 2 µm to about 20 µm, about 2 µm to about 50 µm, about 2 µm to about 100 µm, about 5 µm to about 20 µm, about 5 µm to about 50 µm, about 5 µm to about 100 µm, about 20 µm to about 50 µm, about 20 µm to about 100 µm, or about 50 µm to about 100 µm.

In some embodiments, the electrode does not comprise a binder. In some embodiments, the electrode does not comprise a conductive additive. In some embodiments, the electrode does not comprise a conductive additive or a binder.

In some embodiments, the electrode is freestanding.

In some embodiments wherein the electrode comprises a 3D graphene framework comprising an interconnected conductive network of graphene sheets with a porous structure, the electrode has a thickness of at most about 280 µm. In some embodiments wherein the electrode comprises a 3D graphene framework comprising an interconnected conductive network of graphene sheets with a porous structure, the electrode has a thickness of about 70 µm to about 280 µm. In some embodiments wherein the electrode comprises a 3D graphene framework comprising an interconnected conductive network of graphene sheets with a porous structure, the electrode has a thickness of at least about 70 µm. In some embodiments wherein the electrode comprises a 3D graphene framework comprising an interconnected conductive network of graphene sheets with a porous structure, the electrode has a thickness of about 70 µm to about 100 µm, about 70 µm to about 130 µm, about 70 µm to about 160 µm, about 70 µm to about 190 µm, about 70 µm to about 220 µm, about 70 µm to about 250 µm, about 70 µm to about 280 µm, about 100 µm to about 130 µm, about 100 µm to about 160 µm, about 100 µm to about 190 µm, about 100 µm to about 220 µm, about 100 µm to about 250 µm, about 100 µm to about 280 µm, about 130 µm to about 160 µm, about 130 µm to about 190 µm, about 130 µm to about 220 µm, about 130 µm to about 250 µm, about 130 µm to about 280 µm, about 160 µm to about 190 µm, about 160 µm to about 220 µm, about 160 µm to about 250 µm, about 160 µm to about 280 µm, about 190 µm to about 220 µm, about 190 µm to about 250 µm, about 190 µm to about 280 µm, about 220 µm to about 250 µm, about 220 µm to about 280 µm, or about 250 µm to about 280 µm.

In some embodiments wherein the electrode comprises a 3D graphene framework comprising an interconnected conductive network of graphene sheets with a porous structure, the electrode has an areal loading mass of about 1 mg/cm$^2$ to about 15 mg/cm$^2$. In some embodiments wherein the electrode comprises a 3D graphene framework comprising an interconnected conductive network of graphene sheets with a porous structure, the electrode has an areal loading mass of at least about 1 mg/cm$^2$. In some embodiments wherein the electrode comprises a 3D graphene framework comprising an interconnected conductive network of graphene sheets with a porous structure, the electrode has an areal loading mass of at most about 15 mg/cm$^2$. In some embodiments wherein the electrode comprises a 3D graphene framework comprising an interconnected conductive network of graphene sheets with a porous structure, the electrode has an areal loading mass of about 1 mg/cm$^2$ to about 2 mg/cm$^2$, about 1 mg/cm$^2$ to about 3 mg/cm$^2$, about 1 mg/cm$^2$ to about 5 mg/cm$^2$, about 1 mg/cm$^2$ to about 8 mg/cm$^2$, about 1 mg/cm$^2$ to about 12 mg/cm$^2$, about 1 mg/cm$^2$ to about 15 mg/cm$^2$, about 2 mg/cm$^2$ to about 3 mg/cm$^2$, about 2 mg/cm$^2$ to about 5 mg/cm$^2$, about 2 mg/cm$^2$ to about 8 mg/cm$^2$, about 2 mg/cm$^2$ to about 12 mg/cm$^2$, about 2 mg/cm$^2$ to about 15 mg/cm$^2$, about 3 mg/cm$^2$ to about 5 mg/cm$^2$, about 3 mg/cm$^2$ to about 8 mg/cm$^2$, about 3 mg/cm$^2$ to about 12 mg/cm$^2$, about 3 mg/cm$^2$ to about 15 mg/cm$^2$, about 5 mg/cm$^2$ to about 8 mg/cm$^2$, about 5 mg/cm$^2$ to about 12 mg/cm$^2$, about 5 mg/cm$^2$ to about 15 mg/cm$^2$, about 8 mg/cm$^2$ to about 12 mg/cm$^2$, about 8 mg/cm$^2$ to about 15 mg/cm$^2$, or about 12 mg/cm$^2$ to about 15 mg/cm$^2$.

In some embodiments wherein the electrode comprises a 3D graphene framework comprising an interconnected conductive network of graphene sheets with a porous structure, the electrode has a specific surface area of about 500 m$^2$/g to about 3,000 m$^2$/g. In some embodiments wherein the electrode comprises a 3D graphene framework comprising an interconnected conductive network of graphene sheets with a porous structure, the electrode has a specific surface area of at least about 500 m$^2$/g. In some embodiments wherein the electrode comprises a 3D graphene framework comprising an interconnected conductive network of graphene sheets with a porous structure, the electrode has a specific surface area of at most about 3,000 m$^2$/g. In some embodiments wherein the electrode comprises a 3D graphene framework comprising an interconnected conductive network of graphene sheets with a porous structure, the electrode has a specific surface area about 500 m$^2$/g to about 750 m$^2$/g, about 500 m$^2$/g to about 1,000 m$^2$/g, about 500 m$^2$/g to about 1,500 m$^2$/g, about 500 m$^2$/g to about 2,000 m$^2$/g, about 500 m$^2$/g to about 2,500 m$^2$/g, about 500 m$^2$/g to about 3,000 m$^2$/g, about 750 m$^2$/g to about 1,000 m$^2$/g, about 750 m$^2$/g to about 1,500 m$^2$/g, about 750 m$^2$/g to about 2,000 m$^2$/g, about 750 m$^2$/g to about 2,500 m$^2$/g, about 750 m$^2$/g to about 3,000 m$^2$/g, about 1,000 m$^2$/g to about 1,500 m$^2$/g, about 1,000 m$^2$/g to about 2,000 m$^2$/g, about 1,000 m$^2$/g to about 2,500 m$^2$/g, about 1,000 m$^2$/g to about 3,000 m$^2$/g, about 1,500 m$^2$/g to about 2,000 m$^2$/g, about 1,500 m$^2$/g to about 2,500 m$^2$/g, about 1,500 m$^2$/g to about 3,000 m$^2$/g, about 2,000 m$^2$/g to about 2,500 m$^2$/g, about 2,000 m$^2$/g to about 3,000 m$^2$/g, or about 2,500 m$^2$/g to about 3,000 m$^2$/g.

In some embodiments wherein the electrode comprises a 3D graphene framework comprising an interconnected conductive network of graphene sheets with a porous structure, the electrode has a porosity of about 90% to about 99%. In some embodiments wherein the electrode comprises a 3D graphene framework comprising an interconnected conductive network of graphene sheets with a porous structure, the electrode has a porosity of at least about 90%. In some embodiments wherein the electrode comprises a 3D graphene framework comprising an interconnected conductive network of graphene sheets with a porous structure, the electrode has a porosity of at most about 99%. In some embodiments wherein the electrode comprises a 3D graphene framework comprising an interconnected conductive network of graphene sheets with a porous structure, the electrode has a porosity of about 90% to about 92%, about 90% to about 94%, about 90% to about 96%, about 90% to about 98%, about 90% to about 99%, about 92% to about 94%, about 92% to about 96%, about 92% to about 98%, about 92% to about 99%, about 94% to about 96%, about 94% to about 98%, about 94% to about 99%, about 96% to about 98%, about 96% to about 99%, or about 98% to about 99%.

In some embodiments wherein the electrode comprises a 3D graphene framework comprising an interconnected conductive network of graphene sheets with a porous structure, the electrode has a conductivity of about 500 S/m to about 2,000 S/m. In some embodiments wherein the electrode comprises a 3D graphene framework comprising an interconnected conductive network of graphene sheets with a porous structure, the electrode has a conductivity of at least about 500 S/m. In some embodiments wherein the electrode comprises a 3D graphene framework comprising an interconnected conductive network of graphene sheets with a porous structure, the electrode has a conductivity of at most about 2,000 S/m. In some embodiments wherein the electrode comprises a 3D graphene framework comprising an interconnected conductive network of graphene sheets with a porous structure, the electrode has a conductivity of about 500 S/m to about 750 S/m, about 500 S/m to about 1,000 S/m, about 500 S/m to about 1,250 S/m, about 500 S/m to about 1,500 S/m, about 500 S/m to about 1,750 S/m, about 500 S/m to about 2,000 S/m, about 750 S/m to about 1,000 S/m, about 750 S/m to about 1,250 S/m, about 750 S/m to about 1,500 S/m, about 750 S/m to about 1,750 S/m, about 750 S/m to about 2,000 S/m, about 1,000 S/m to about 1,250 S/m, about 1,000 S/m to about 1,500 S/m, about 1,000 S/m to about 1,750 S/m, about 1,000 S/m to about 2,000 S/m, about 1,250 S/m to about 1,500 S/m, about 1,250 S/m to about 1,750 S/m, about 1,250 S/m to about 2,000 S/m, about 1,500 S/m to about 1,750 S/m, about 1,500 S/m to about 2,000 S/m, or about 1,750 S/m to about 2,000 S/m.

In some embodiments wherein the electrode comprises a 3D graphene framework comprising an interconnected conductive network of graphene sheets with a porous structure, the electrode has an electrode-specific gravimetric capacitance of about 125 F/g to about 800 F/g. In some embodiments wherein the electrode comprises a 3D graphene framework comprising an interconnected conductive network of graphene sheets with a porous structure, the electrode has an electrode-specific gravimetric capacitance of at least about 125 F/g. In some embodiments wherein the electrode comprises a 3D graphene framework comprising an interconnected conductive network of graphene sheets with a porous structure, the electrode has an electrode-specific gravimetric capacitance of at most about 800 F/g. In some embodiments wherein the electrode comprises a 3D graphene framework comprising an interconnected conductive network of graphene sheets with a porous structure, the electrode has an electrode-specific gravimetric capacitance of about 125 F/g to about 200 F/g, about 125 F/g to about 300 F/g, about 125 F/g to about 400 F/g, about 125 F/g to about 500 F/g, about 125 F/g to about 600 F/g, about 125 F/g to about 700 F/g, about 125 F/g to about 800 F/g, about 200 F/g to about 300 F/g, about 200 F/g to about 400 F/g, about 200 F/g to about 500 F/g, about 200 F/g to about 600 F/g, about 200 F/g to about 700 F/g, about 200 F/g to about 800 F/g, about 300 F/g to about 400 F/g, about 300 F/g to about 500 F/g, about 300 F/g to about 600 F/g, about 300 F/g to about 700 F/g, about 300 F/g to about 800 F/g, about 400 F/g to about 500 F/g, about 400 F/g to about 600 F/g, about 400 F/g to about 700 F/g, about 400 F/g to about 800 F/g, about 500 F/g to about 600 F/g, about 500 F/g to about 700 F/g, about 500 F/g to about 800 F/g, about 600 F/g to about 700 F/g, about 600 F/g to about 800 F/g, or about 700 F/g to about 800 F/g.

In some embodiments, the electrode is a composite electrode, wherein the composite material comprises a capacitive or pseudo-capacitive material. In some embodiments, the capacitive or pseudo-capacitive material comprises silicon, sulfur, $Nb_2O_5$, $Al_2O_3$, $V_2O_5$, $Re_2O_7$, $CrO_3$, $CeO_2$, $RuO_2$, $ZrO_2$, $MoO_3$, $WO_3$, $TiO_2$, or any combination thereof.

In some embodiments, the electrode is a composite electrode, wherein the composite material comprises silicon.

In some embodiments wherein the electrode is a composite electrode, and wherein the composite material comprises silicon, the electrode has a specific surface area of about 450 $m^2/g$ to about 1,800 $m^2/g$. In some embodiments wherein the electrode is a composite electrode, and wherein the composite material comprises silicon, the electrode has a specific surface area of at least about 450 $m^2/g$. In some embodiments wherein the electrode is a composite electrode, and wherein the composite material comprises silicon, the electrode has a specific surface area of at most about 1,800 $m^2/g$. In some embodiments wherein the electrode is a composite electrode, and wherein the composite material comprises silicon, the electrode has a specific surface area about 450 $m^2/g$ to about 750 $m^2/g$, about 450 $m^2/g$ to about 1,000 $m^2/g$, about 450 $m^2/g$ to about 1,500 $m^2/g$, about 450 $m^2/g$ to about 2,000 $m^2/g$, about 450 $m^2/g$ to about 2,500 $m^2/g$, about 450 $m^2/g$ to about 3,000 $m^2/g$, about 750 $m^2/g$ to about 1,000 $m^2/g$, about 750 $m^2/g$ to about 1,500 $m^2/g$, about 750 $m^2/g$ to about 2,000 $m^2/g$, about 750 $m^2/g$ to about 2,500 $m^2/g$, about 750 $m^2/g$ to about 3,000 $m^2/g$, about 1,000 $m^2/g$ to about 1,500 $m^2/g$, about 1,000 $m^2/g$ to about 2,000 $m^2/g$, about 1,000 $m^2/g$ to about 2,500 $m^2/g$, about 1,000 $m^2/g$ to about 3,000 $m^2/g$, or about 1,500 $m^2/g$ to about 1,800 $m^2/g$.

In some embodiments wherein the electrode is a composite electrode, and wherein the composite material comprises silicon, the electrode has a loading ratio of about 35% to about 95%. In some embodiments wherein the electrode is a composite electrode, and wherein the composite material comprises silicon, the electrode has a loading ratio of at least about 35%. In some embodiments wherein the electrode is a composite electrode, and wherein the composite material comprises silicon, the electrode has a loading ratio of at most about 95%. In some embodiments wherein the electrode is a composite electrode, and wherein the composite material comprises silicon, the electrode has a loading ratio of about 35% to about 40%, about 35% to about 45%, about 35% to about 50%, about 35% to about 55%, about 35% to about 60%, about 35% to about 65%, about 35% to about 70%, about 35% to about 85%, about 35% to about 90%, about 35% to about 95%, about 40% to about 45%, about 40% to about 50%, about 40% to about 55%, about 40% to about 60%, about 40% to about 65%, about 40% to about 70%, about 40% to about 85%, about 40% to about 90%, about 40% to about 95%, about 45% to about 50%, about 45% to about 55%, about 45% to about 60%, about 45% to about 65%, about 45% to about 70%, about 45% to about 85%, about 45% to about 90%, about 45% to about 95%, about 50% to about 55%, about 50% to about 60%, about 50% to about 65%, about 50% to about 70%, about 50% to about 85%, about 50% to about 90%, about 50% to about 95%, about 55% to about 60%, about 55% to about 65%, about 55% to about 70%, about 55% to about 85%, about 55% to about 90%, about 55% to about 95%, about 60% to about 65%, about 60% to about 70%, about 60% to about 85%, about 60% to about 90%, about 60% to about 95%, about 65% to about 70%, about 65% to about 85%, about 65% to about 90%, about 65% to about 95%, about 70% to about 85%, about 70% to about 90%, about 70% to about 95%, about 85% to about 90%, about 85% to about 95%, or about 90% to about 95%.

In some embodiments wherein the electrode is a composite electrode, and wherein the composite material comprises silicon, the electrode has a conductivity of about 700 S/m to about 2,800 S/m. In some embodiments wherein the electrode is a composite electrode, and wherein the composite material comprises silicon, the electrode has a conductivity of at least about 700 S/m. In some embodiments wherein the electrode is a composite electrode, and wherein the composite material comprises silicon, the electrode has a conductivity of at most about 2,800 S/m. In some embodiments wherein the electrode is a composite electrode, and wherein the composite material comprises silicon, the electrode has a conductivity of about 700 S/m to about 800 S/m, about 700 S/m to about 1,000 S/m, about 700 S/m to about 1,200 S/m, about 700 S/m to about 1,400 S/m, about 700 S/m to about 1,800 S/m, about 700 S/m to about 2,200 S/m, about 700 S/m to about 2,800 S/m, about 800 S/m to about 1,000 S/m, about 800 S/m to about 1,200 S/m, about 800 S/m to about 1,400 S/m, about 800 S/m to about 1,800 S/m, about 800 S/m to about 2,200 S/m, about 800 S/m to about 2,800 S/m, about 1,000 S/m to about 1,200 S/m, about 1,000 S/m to about 1,400 S/m, about 1,000 S/m to about 1,800 S/m, about 1,000 S/m to about 2,200 S/m, about 1,000 S/m to about 2,800 S/m, about 1,200 S/m to about 1,400 S/m, about 1,200 S/m to about 1,800 S/m, about 1,200 S/m to about 2,200 S/m, about 1,200 S/m to about 2,800 S/m, about 1,400 S/m to about 1,800 S/m, about 1,400 S/m to about 2,200 S/m, about 1,400 S/m to about 2,800 S/m, about 1,800 S/m to about 2,200 S/m, about 1,800 S/m to about 2,800 S/m, or about 2,200 S/m to about 2,800 S/m.

In some embodiments wherein the electrode is a composite electrode, and wherein the composite material comprises silicon, the electrode has an operation voltage potential of about 0.25 V to about 1 V. In some embodiments wherein the electrode is a composite electrode, and wherein the composite material comprises silicon, the electrode has an operation voltage potential of at least about 0.25 V. In some embodiments wherein the electrode is a composite electrode, and wherein the composite material comprises silicon, the electrode has an operation voltage potential of at most about 1 V. In some embodiments wherein the electrode is a composite electrode, and wherein the composite material comprises silicon, the electrode has an operation voltage potential of about 0.25 V to about 0.375 V, about 0.25 V to about 0.5 V, about 0.25 V to about 0.625 V, about 0.25 V to about 1 V, about 0.375 V to about 0.5 V, about 0.375 V to about 0.625 V, about 0.375 V to about 1 V, about 0.5 V to about 0.625 V, about 0.5 V to about 1 V, or about 0.625 V to about 1 V.

In some embodiments wherein the electrode is a composite electrode, and wherein the composite material comprises silicon, the electrode has a specific capacity at 0.1 C of about 250 mAh/g to about 4,000 mAh/g. In some embodiments wherein the electrode is a composite electrode, and wherein the composite material comprises silicon, the electrode has a specific capacity at 0.1 C of at least about 250 mAh/g. In some embodiments wherein the electrode is a composite electrode, and wherein the composite material comprises silicon, the electrode has a specific capacity at 0.1 C of at most about 4,000 mAh/g. In some embodiments wherein the electrode is a composite electrode, and wherein the composite material comprises silicon, the electrode has a specific capacity at 0.1 C of about 250 mAh/g to about 500 mAh/g, about 250 mAh/g to about 1,000 mAh/g, about 250 mAh/g to about 1,500 mAh/g, about 250 mAh/g to about 2,000 mAh/g, about 250 mAh/g to about 2,500 mAh/g, about 250 mAh/g to about 3,000 mAh/g, about 250 mAh/g to about 3,500 mAh/g, about 250 mAh/g to about 4,000 mAh/g, about 500 mAh/g to about 1,000 mAh/g, about 500 mAh/g to about 1,500 mAh/g, about 500 mAh/g to about 2,000 mAh/g, about 500 mAh/g to about 2,500 mAh/g, about 500 mAh/g to about 3,000 mAh/g, about 500 mAh/g to about 3,500 mAh/g, about 500 mAh/g to about 4,000 mAh/g, about 1,000 mAh/g to about 1,500 mAh/g, about 1,000 mAh/g to about 2,000 mAh/g, about 1,000 mAh/g to about 2,500 mAh/g, about 1,000 mAh/g to about 3,000 mAh/g, about 1,000 mAh/g to about 3,500 mAh/g, about 1,000 mAh/g to about 4,000 mAh/g, about 1,500 mAh/g to about 2,000 mAh/g, about 1,500 mAh/g to about 2,500 mAh/g, about 1,500 mAh/g to about 3,000 mAh/g, about 1,500 mAh/g to about 3,500 mAh/g, about 1,500 mAh/g to about 4,000 mAh/g, about 2,000 mAh/g to about 2,500 mAh/g, about 2,000 mAh/g to about 3,000 mAh/g, about 2,000 mAh/g to about 3,500 mAh/g, about 2,000 mAh/g to about 4,000 mAh/g, about 2,500 mAh/g to about 3,000 mAh/g, about 2,500 mAh/g to about 3,500 mAh/g, about 2,500 mAh/g to about 4,000 mAh/g, about 3,000 mAh/g to about 3,500 mAh/g, about 3,000 mAh/g to about 4,000 mAh/g, or about 3,500 mAh/g to about 4,000 mAh/g.

In some embodiments, the electrode is a composite electrode, wherein the composite material comprises sulfur.

In some embodiments wherein the electrode is a composite electrode, and wherein the composite material comprises sulfur, the electrode has an areal loading mass of about 2 mg/cm$^2$ to about 9 mg/cm$^2$. In some embodiments wherein the electrode is a composite electrode, and wherein the composite material comprises sulfur, the electrode has an areal loading mass of at least about 2 mg/cm$^2$. In some embodiments wherein the electrode is a composite electrode, and wherein the composite material comprises sulfur, the electrode has an areal loading mass of at most about 9 mg/cm$^2$. In some embodiments wherein the electrode is a composite electrode, and wherein the composite material comprises sulfur, the electrode has an areal loading mass of about 2 mg/cm$^2$ to about 3 mg/cm$^2$, about 2 mg/cm$^2$ to about 4 mg/cm$^2$, about 2 mg/cm$^2$ to about 5 mg/cm$^2$, about 2 mg/cm$^2$ to about 6 mg/cm$^2$, about 2 mg/cm$^2$ to about 7 mg/cm$^2$, about 2 mg/cm$^2$ to about 8 mg/cm$^2$, about 2 mg/cm$^2$ to about 9 mg/cm$^2$, about 3 mg/cm$^2$ to about 4 mg/cm$^2$, about 3 mg/cm$^2$ to about 5 mg/cm$^2$, about 3 mg/cm$^2$ to about 6 mg/cm$^2$, about 3 mg/cm$^2$ to about 7 mg/cm$^2$, about 3 mg/cm$^2$ to about 8 mg/cm$^2$, about 3 mg/cm$^2$ to about 9 mg/cm$^2$, about 4 mg/cm$^2$ to about 5 mg/cm$^2$, about 4 mg/cm$^2$ to about 6 mg/cm$^2$, about 4 mg/cm$^2$ to about 7 mg/cm$^2$, about 4 mg/cm$^2$ to about 8 mg/cm$^2$, about 4 mg/cm$^2$ to about 9 mg/cm$^2$, about 5 mg/cm$^2$ to about 6 mg/cm$^2$, about 5 mg/cm$^2$ to about 7 mg/cm$^2$, about 5 mg/cm$^2$ to about 8 mg/cm$^2$, about 5 mg/cm$^2$ to about 9 mg/cm$^2$, about 6 mg/cm$^2$ to about 7 mg/cm$^2$, about 6 mg/cm$^2$ to about 8 mg/cm$^2$, about 6 mg/cm$^2$ to about 9 mg/cm$^2$, about 7 mg/cm$^2$ to about 8 mg/cm$^2$, about 7 mg/cm$^2$ to about 9 mg/cm$^2$, or about 8 mg/cm$^2$ to about 9 mg/cm$^2$.

In some embodiments wherein the electrode is a composite electrode, and wherein the composite material comprises sulfur, the electrode has a specific surface area of about 450 m$^2$/g to about 1,800 m$^2$/g. In some embodiments wherein the electrode is a composite electrode, and wherein the composite material comprises sulfur, the electrode has a specific surface area of at least about 450 m$^2$/g. In some embodiments wherein the electrode is a composite electrode, and wherein the composite material comprises sulfur, the electrode has a specific surface area of at most about 1,800 m$^2$/g. In some embodiments wherein the electrode is a composite electrode, and wherein the composite material comprises sulfur, the electrode has a specific surface area of about 450 m$^2$/g to about 650 m$^2$/g, about 450 m$^2$/g to about 850 m$^2$/g, about 450 m$^2$/g to about 1,050 m$^2$/g, about 450 m$^2$/g to about 1,200 m$^2$/g, about 450 m$^2$/g to about 1,400 m$^2$/g, about 450 m$^2$/g to about 1,600 m$^2$/g, about 450 m$^2$/g to about 1,800 m$^2$/g, about 650 m$^2$/g to about 850 m$^2$/g, about 650 m$^2$/g to about 1,050 m$^2$/g, about 650 m$^2$/g to about 1,200 m$^2$/g, about 650 m$^2$/g to about 1,400 m$^2$/g, about 650 m$^2$/g to about 1,600 m$^2$/g, about 650 m$^2$/g to about 1,800 m$^2$/g, about 850 m$^2$/g to about 1,050 m$^2$/g, about 850 m$^2$/g to about 1,200 m$^2$/g, about 850 m$^2$/g to about 1,400 m$^2$/g, about 850 m$^2$/g to about 1,600 m$^2$/g, about 850 m$^2$/g to about 1,800 m$^2$/g, about 1,050 m$^2$/g to about 1,200 m$^2$/g, about 1,050 m$^2$/g to about 1,400 m$^2$/g, about 1,050 m$^2$/g to about 1,600 m$^2$/g, about 1,050 m$^2$/g to about 1,800 m$^2$/g, about 1,200 m$^2$/g to about 1,400 m$^2$/g, about 1,200 m$^2$/g to about 1,600 m$^2$/g, about 1,200 m$^2$/g to about 1,800 m$^2$/g, about 1,400 m$^2$/g to about 1,600 m$^2$/g, about 1,400 m$^2$/g to about 1,800 m$^2$/g, or about 1,600 m$^2$/g to about 1,800 m$^2$/g.

In some embodiments wherein the electrode is a composite electrode, and wherein the composite material comprises sulfur, the electrode has a sulfur particle size of about 0.01 μm to about 100 μm. In some embodiments wherein the electrode is a composite electrode, and wherein the composite material comprises sulfur, the electrode has a sulfur particle size of at least about 0.01 μm. In some embodiments wherein the electrode is a composite electrode, and wherein the composite material comprises sulfur, the electrode has a sulfur particle size of at most about 100 μm. In some embodiments wherein the electrode is a composite electrode, and wherein the composite material comprises sulfur, the electrode has a sulfur particle size of about 0.01 μm to about 0.05 μm, about 0.01 μm to about 0.1 μm, about 0.01

μm to about 0.5 μm, about 0.01 μm to about 1 μm, about 0.01 μm to about 5 μm, about 0.01 μm to about 10 μm, about 0.01 μm to about 25 μm, about 0.01 μm to about 50 μm, about 0.01 μm to about 100 μm, about 0.05 μm to about 0.1 μm, about 0.05 μm to about 0.5 μm, about 0.05 μm to about 1 μm, about 0.05 μm to about 5 μm, about 0.05 μm to about 10 μm, about 0.05 μm to about 25 μm, about 0.05 μm to about 50 μm, about 0.05 μm to about 100 μm, about 0.1 μm to about 0.5 μm, about 0.1 μm to about 1 μm, about 0.1 μm to about 5 μm, about 0.1 μm to about 10 μm, about 0.1 μm to about 25 μm, about 0.1 μm to about 50 μm, about 0.1 μm to about 100 μm, about 0.5 μm to about 1 μm, about 0.5 μm to about 5 μm, about 0.5 μm to about 10 μm, about 0.5 μm to about 25 μm, about 0.5 μm to about 50 μm, about 0.5 μm to about 100 μm, about 1 μm to about 5 μm, about 1 μm to about 10 μm, about 1 μm to about 25 μm, about 1 μm to about 50 μm, about 1 μm to about 100 μm, about 5 μm to about 10 μm, about 5 μm to about 25 μm, about 5 μm to about 50 μm, about 5 μm to about 100 μm, about 10 μm to about 25 μm, about 10 μm to about 50 μm, about 10 μm to about 100 μm, about 25 μm to about 50 μm, about 25 μm to about 100 μm, or about 50 μm to about 100 μm.

In some embodiments wherein the electrode is a composite electrode, and wherein the composite material comprises sulfur, the electrode has a loading ratio of about 30% to about 99%. In some embodiments wherein the electrode is a composite electrode, and wherein the composite material comprises sulfur, the electrode has a loading ratio of at least about 30%. In some embodiments wherein the electrode is a composite electrode, and wherein the composite material comprises sulfur, the electrode has a loading ratio of at most about 99%. In some embodiments wherein the electrode is a composite electrode, and wherein the composite material comprises sulfur, the electrode has a loading ratio of about 30% to about 40%, about 30% to about 50%, about 30% to about 60%, about 30% to about 70%, about 30% to about 80%, about 30% to about 90%, about 30% to about 99%, about 40% to about 50%, about 40% to about 60%, about 40% to about 70%, about 40% to about 80%, about 40% to about 90%, about 40% to about 99%, about 50% to about 60%, about 50% to about 70%, about 50% to about 80%, about 50% to about 90%, about 50% to about 99%, about 60% to about 70%, about 60% to about 80%, about 60% to about 90%, about 60% to about 99%, about 70% to about 80%, about 70% to about 90%, about 70% to about 99%, about 80% to about 90%, about 80% to about 99%, or about 90% to about 99%.

In some embodiments wherein the electrode is a composite electrode, and wherein the composite material comprises sulfur, the electrode has a sulfur loading ratio of about 30% to about 95%. In some embodiments wherein the electrode is a composite electrode, and wherein the composite material comprises sulfur, the electrode has a sulfur loading ratio of at least about 35%. In some embodiments wherein the electrode is a composite electrode, and wherein the composite material comprises sulfur, the electrode has a sulfur loading ratio of at most about 95%. In some embodiments wherein the electrode is a composite electrode, and wherein the composite material comprises sulfur, the electrode has a loading ratio of about 30% to about 40%, about 30% to about 45%, about 30% to about 50%, about 30% to about 55%, about 30% to about 60%, about 30% to about 65%, about 30% to about 70%, about 30% to about 85%, about 30% to about 90%, about 30% to about 95%, about 40% to about 45%, about 40% to about 50%, about 40% to about 55%, about 40% to about 60%, about 40% to about 65%, about 40% to about 70%, about 40% to about 85%, about 40% to about 90%, about 40% to about 95%, about 45% to about 50%, about 45% to about 55%, about 45% to about 60%, about 45% to about 65%, about 45% to about 70%, about 45% to about 85%, about 45% to about 90%, about 45% to about 95%, about 50% to about 55%, about 50% to about 60%, about 50% to about 65%, about 50% to about 70%, about 50% to about 85%, about 50% to about 90%, about 50% to about 95%, about 55% to about 60%, about 55% to about 65%, about 55% to about 70%, about 55% to about 85%, about 55% to about 90%, about 55% to about 95%, about 60% to about 65%, about 60% to about 70%, about 60% to about 85%, about 60% to about 90%, about 60% to about 95%, about 65% to about 70%, about 65% to about 85%, about 65% to about 90%, about 65% to about 95%, about 70% to about 85%, about 70% to about 90%, about 70% to about 95%, about 85% to about 90%, about 85% to about 95%, or about 90% to about 95%.

In some embodiments wherein the electrode is a composite electrode, and wherein the composite material comprises sulfur, the electrode has a specific capacity at a C-rate of about 0.1 of about 400 mAh/g to about 2,600 mAh/g. In some embodiments wherein the electrode is a composite electrode, and wherein the composite material comprises sulfur, the electrode has a specific capacity at a C-rate of about 0.1 of at least about 400 mAh/g. In some embodiments wherein the electrode is a composite electrode, and wherein the composite material comprises sulfur, the electrode has a specific capacity at a C-rate of about 0.1 of at most about 2,600 mAh/g. In some embodiments wherein the electrode is a composite electrode, and wherein the composite material comprises sulfur, the electrode has a specific capacity at a C-rate of about 0.1 of about 400 mAh/g to about 600 mAh/g, about 400 mAh/g to about 800 mAh/g, about 400 mAh/g to about 1,000 mAh/g, about 400 mAh/g to about 1,400 mAh/g, about 400 mAh/g to about 1,800 mAh/g, about 400 mAh/g to about 2,200 mAh/g, about 400 mAh/g to about 2,600 mAh/g, about 600 mAh/g to about 800 mAh/g, about 600 mAh/g to about 1,000 mAh/g, about 600 mAh/g to about 1,400 mAh/g, about 600 mAh/g to about 1,800 mAh/g, about 600 mAh/g to about 2,200 mAh/g, about 600 mAh/g to about 2,600 mAh/g, about 800 mAh/g to about 1,000 mAh/g, about 800 mAh/g to about 1,400 mAh/g, about 800 mAh/g to about 1,800 mAh/g, about 800 mAh/g to about 2,200 mAh/g, about 800 mAh/g to about 2,600 mAh/g, about 1,000 mAh/g to about 1,400 mAh/g, about 1,000 mAh/g to about 1,800 mAh/g, about 1,000 mAh/g to about 2,200 mAh/g, about 1,000 mAh/g to about 2,600 mAh/g, about 1,400 mAh/g to about 1,800 mAh/g, about 1,400 mAh/g to about 2,200 mAh/g, about 1,400 mAh/g to about 2,600 mAh/g, about 1,800 mAh/g to about 2,200 mAh/g, about 1,800 mAh/g to about 2,600 mAh/g, or about 2,200 mAh/g to about 2,600 mAh/g.

In some embodiments wherein the electrode is a composite electrode, wherein the composite material comprises sulfur, and wherein the electrode is comprised of about 70% sulfur by weight, the electrode has a sulfur-specific capacity at a C-rate of about 0.1 of about 640 mAh/g to about 2,600 mAh/g. In some embodiments wherein the electrode is a composite electrode, wherein the composite material comprises sulfur, and wherein the electrode is comprised of about 70% sulfur by weight, the electrode has a sulfur-specific capacity at a C-rate of about 0.1 of at least about 640 mAh/g. In these embodiments, the electrode has a sulfur-specific capacity at a C-rate of about 0.1 of at most about 2,600 mAh/g. In some embodiments wherein the electrode is a composite electrode, wherein the composite material comprises sulfur, and wherein the electrode is comprised of about 70% sulfur by weight, the electrode has a sulfur-specific capacity at a C-rate of about 0.1 of about 640 mAh/g to about 700 mAh/g, about 640 mAh/g to about 800 mAh/g, about 640 mAh/g to about 900 mAh/g, about 640 mAh/g to about 1,000 mAh/g, about 640 mAh/g to about 1,400 mAh/g, about 640 mAh/g to about 1,800 mAh/g, about 640 mAh/g to about 2,200 mAh/g, about 640 mAh/g to about 2,600 mAh/g, about 700 mAh/g to about 800 mAh/g, about 700 mAh/g to about 900 mAh/g, about 700 mAh/g to about 1,000 mAh/g, about 700 mAh/g to about 1,400 mAh/g, about 700 mAh/g to about 1,800 mAh/g, about 700 mAh/g to about 2,200 mAh/g, about 700 mAh/g to about 2,600 mAh/g, about 800 mAh/g to about 900 mAh/g, about 800 mAh/g to about 1,000 mAh/g, about 800 mAh/g to about 1,400 mAh/g, about 800 mAh/g to about 1,800 mAh/g, about 800 mAh/g to about 2,200 mAh/g, about 800 mAh/g to about 2,600 mAh/g, about 900 mAh/g to about 1,000 mAh/g, about 900 mAh/g to about 1,400 mAh/g, about 900 mAh/g to about 1,800 mAh/g, about 900 mAh/g to about 2,200 mAh/g, about 900 mAh/g to about 2,600 mAh/g, about 1,000 mAh/g to about 1,400 mAh/g, about 1,000 mAh/g to about 1,800 mAh/g, about 1,000 mAh/g to about 2,200 mAh/g, about 1,000 mAh/g to about 2,600 mAh/g, about 1,400 mAh/g to about 1,800 mAh/g, about 1,400 mAh/g to about 2,200 mAh/g, about 1,400 mAh/g to about 2,600 mAh/g, about 1,800 mAh/g to about 2,200 mAh/g, about 1,800 mAh/g to about 2,600 mAh/g, or about 2,200 mAh/g to about 2,600 mAh/g.

In some embodiments wherein the electrode is a composite electrode, wherein the composite material comprises sulfur, and wherein the electrode is comprised of about 70% sulfur by weight, the electrode has a sulfur-specific capacity at a C-rate of about 0.1 after about 50 cycles of use of about 420 mAh/g to about 1,700 mAh/g. In some embodiments wherein the electrode is a composite electrode, and wherein the composite material comprises sulfur, the electrode has a sulfur-specific capacity at a C-rate of about 0.1 after about 50 cycles of use of at least about 420 mAh/g. In some embodiments wherein the electrode is a composite electrode, wherein the composite material comprises sulfur, and wherein the electrode is comprised of about 70% sulfur by weight, the electrode has a sulfur-specific capacity at a C-rate of about 0.1 after about 50 cycles of use of at most about 1,700 mAh/g. In some embodiments wherein the electrode is a composite electrode, wherein the composite material comprises sulfur, and wherein the electrode is comprised of about 70% sulfur by weight, the electrode has a sulfur-specific capacity at a C-rate of about 0.1 after about 50 cycles of use of about 420 mAh/g to about 450 mAh/g, about 420 mAh/g to about 500 mAh/g, about 420 mAh/g to about 600 mAh/g, about 420 mAh/g to about 800 mAh/g, about 420 mAh/g to about 1,000 mAh/g, about 420 mAh/g to about 1,200 mAh/g, about 420 mAh/g to about 1,400 mAh/g, about 420 mAh/g to about 1,700 mAh/g, about 450 mAh/g to about 500 mAh/g, about 450 mAh/g to about 600 mAh/g, about 450 mAh/g to about 800 mAh/g, about 450 mAh/g to about 1,000 mAh/g, about 450 mAh/g to about 1,200 mAh/g, about 450 mAh/g to about 1,400 mAh/g, about 450 mAh/g to about 1,700 mAh/g, about 500 mAh/g to about 600 mAh/g, about 500 mAh/g to about 800 mAh/g, about 500 mAh/g to about 1,000 mAh/g, about 500 mAh/g to about 1,200 mAh/g, about 500 mAh/g to about 1,400 mAh/g, about 500 mAh/g to about 1,700 mAh/g, about 600 mAh/g to about 800 mAh/g, about 600 mAh/g to about 1,000 mAh/g, about 600 mAh/g to about 1,200 mAh/g, about 600 mAh/g to about 1,400 mAh/g, about 600 mAh/g to about 1,700 mAh/g, about 800 mAh/g to about 1,000 mAh/g, about 800 mAh/g to about 1,200 mAh/g, about 800 mAh/g to about 1,400 mAh/g, about 800 mAh/g to about 1,700 mAh/g, about 1,000 mAh/g to about 1,200 mAh/g, about 1,000 mAh/g to about 1,400 mAh/g, about 1,000 mAh/g to about 1,700 mAh/g, about 1,200 mAh/g to about 1,400 mAh/g, about 1,200 mAh/g to about 1,700 mAh/g, or about 1,400 mAh/g to about 1,700 mAh/g.

In some embodiments wherein the electrode is a composite electrode, wherein the composite material comprises sulfur, and wherein the electrode is comprised of about 80% sulfur by weight, the electrode has a sulfur-specific capacity at a C-rate of about 0.1 of about 600 mAh/g to about 2,400 mAh/g. In some embodiments wherein the electrode is a composite electrode, wherein the composite material comprises sulfur, and wherein the electrode is comprised of about 80% sulfur by weight, the electrode has a sulfur-specific capacity at a C-rate of about 0.1 of at least about 600 mAh/g. In some embodiments wherein the electrode is a composite electrode, wherein the composite material comprises sulfur, and wherein the electrode is comprised of about 80% sulfur by weight, the electrode has a sulfur-specific capacity at a C-rate of about 0.1 of at most about 2,400 mAh/g. In some embodiments wherein the electrode is a composite electrode, wherein the composite material comprises sulfur, and wherein the electrode is comprised of about 80% sulfur by weight, the electrode has a sulfur-specific capacity at a C-rate of about 0.1 of about 600 mAh/g to about 800 mAh/g, about 600 mAh/g to about 1,000 mAh/g, about 600 mAh/g to about 1,200 mAh/g, about 600 mAh/g to about 1,400 mAh/g, about 600 mAh/g to about 1,800 mAh/g, about 600 mAh/g to about 2,000 mAh/g, about 600 mAh/g to about 2,200 mAh/g, about 600 mAh/g to about 2,400 mAh/g, about 800 mAh/g to about 1,000 mAh/g, about 800 mAh/g to about 1,200 mAh/g, about 800 mAh/g to about 1,400 mAh/g, about 800 mAh/g to about 1,800 mAh/g, about 800 mAh/g to about 2,000 mAh/g, about 800 mAh/g to about 2,200 mAh/g, about 800 mAh/g to about 2,400 mAh/g, about 1,000 mAh/g to about 1,200 mAh/g, about 1,000 mAh/g to about 1,400 mAh/g, about 1,000 mAh/g to about 1,800 mAh/g, about 1,000 mAh/g to about 2,000 mAh/g, about 1,000 mAh/g to about 2,200 mAh/g, about 1,000 mAh/g to about 2,400 mAh/g, about 1,200 mAh/g to about 1,400 mAh/g, about 1,200 mAh/g to about 1,800 mAh/g, about 1,200 mAh/g to about 2,000 mAh/g, about 1,200 mAh/g to about 2,200 mAh/g, about 1,200 mAh/g to about 2,400 mAh/g, about 1,400 mAh/g to about 1,800 mAh/g, about 1,400 mAh/g to about 2,000 mAh/g, about 1,400 mAh/g to about 2,200 mAh/g, about 1,400 mAh/g to about 2,400 mAh/g, about 1,800 mAh/g to about 2,000 mAh/g, about 1,800 mAh/g to about 2,200 mAh/g, about 1,800 mAh/g to about 2,400 mAh/g, about 2,000 mAh/g to about 2,200 mAh/g, about 2,000 mAh/g to about 2,400 mAh/g, or about 2,200 mAh/g to about 2,400 mAh/g.

In some embodiments wherein the electrode is a composite electrode, wherein the composite material comprises sulfur, and wherein the electrode is comprised of about 80% sulfur by weight, the electrode has a sulfur-specific capacity at a C-rate of about 0.1 after about 50 cycles of use of about 380 mAh/g to about 1,550 mAh/g. In some embodiments wherein the electrode is a composite electrode, wherein the composite material comprises sulfur, and wherein the electrode is comprised of about 80% sulfur by weight, the electrode has a sulfur-specific capacity at a C-rate of about 0.1 after about 50 cycles of use of at least about 380 mAh/g. In some embodiments wherein the electrode is a composite electrode, wherein the composite material comprises sulfur, and wherein the electrode is comprised of about 80% sulfur by weight, the electrode has a sulfur-specific capacity at a C-rate of about 0.1 after about 50 cycles of use of at most about 1,550 mAh/g. In some embodiments wherein the electrode is a composite electrode, wherein the composite material comprises sulfur, and wherein the electrode is comprised of about 80% sulfur by weight, the electrode has a sulfur-specific capacity at a C-rate of about 0.1 after about 50 cycles of use of about 380 mAh/g to about 400 mAh/g, about 380 mAh/g to about 500 mAh/g, about 380 mAh/g to about 600 mAh/g, about 380 mAh/g to about 800 mAh/g, about 380 mAh/g to about 1,000 mAh/g, about 380 mAh/g to about 1,200 mAh/g, about 380 mAh/g to about 1,550 mAh/g, about 400 mAh/g to about 500 mAh/g, about 400 mAh/g to about 600 mAh/g, about 400 mAh/g to about 800 mAh/g, about 400 mAh/g to about 1,000 mAh/g, about 400 mAh/g to about 1,200 mAh/g, about 400 mAh/g to about 1,550 mAh/g, about 500 mAh/g to about 600 mAh/g, about 500 mAh/g to about 800 mAh/g, about 500 mAh/g to about 1,000 mAh/g, about 500 mAh/g to about 1,200 mAh/g, about 500 mAh/g to about 1,550 mAh/g, about 600 mAh/g to about 800 mAh/g, about 600 mAh/g to about 1,000 mAh/g, about 600 mAh/g to about 1,200 mAh/g, about 600 mAh/g to about 1,550 mAh/g, about 800 mAh/g to about 1,000 mAh/g, about 800 mAh/g to about 1,200 mAh/g, about 800 mAh/g to about 1,550 mAh/g, about 1,000 mAh/g to about 1,200 mAh/g, about 1,000 mAh/g to about 1,550 mAh/g, or about 1,200 mAh/g to about 1,550 mAh/g.

In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 of about 500 mAh/g to about 2,200 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 of at least about 500 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 of at most about 2,200 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 of about 500 mAh/g to about 700 mAh/g, about 500 mAh/g to about 900 mAh/g, about 500 mAh/g to about 1,000 mAh/g, about 500 mAh/g to about 1,400 mAh/g, about 500 mAh/g to about 1,800 mAh/g, about 500 mAh/g to about 2,200 mAh/g, about 700 mAh/g to about 900 mAh/g, about 700 mAh/g to about 1,000 mAh/g, about 700 mAh/g to about 1,400 mAh/g, about 700 mAh/g to about 1,800 mAh/g, about 700 mAh/g to about 2,200 mAh/g, about 900 mAh/g to about 1,000 mAh/g, about 900 mAh/g to about 1,400 mAh/g, about 900 mAh/g to about 1,800 mAh/g, about 900 mAh/g to about 2,200 mAh/g, about 1,000 mAh/g to about 1,400 mAh/g, about 1,000 mAh/g to about 1,800 mAh/g, about 1,000 mAh/g to about 2,200 mAh/g, about 1,400 mAh/g to about 1,800 mAh/g, about 1,400 mAh/g to about 2,200 mAh/g, or about 1,800 mAh/g to about 2,200 mAh/g.

In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 10 cycles of use of about 410 mAh/g to about 1,650 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 10 cycles of use of at least about 410 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 10 cycles of use of at most about 1,650 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 10 cycles of use of about 410 mAh/g to about 450 mAh/g, about 410 mAh/g to about 500 mAh/g, about 410 mAh/g to about 600 mAh/g, about 410 mAh/g to about 800 mAh/g, about 410 mAh/g to about 1,000 mAh/g, about 410 mAh/g to about 1,200 mAh/g, about 410 mAh/g to about 1,400 mAh/g, about 410 mAh/g to about 1,650 mAh/g, about 450 mAh/g to about 500 mAh/g, about 450 mAh/g to about 600 mAh/g, about 450 mAh/g to about 800 mAh/g, about 450 mAh/g to about 1,000 mAh/g, about 450 mAh/g to about 1,200 mAh/g, about 450 mAh/g to about 1,400 mAh/g, about 450 mAh/g to about 1,650 mAh/g, about 500 mAh/g to about 600 mAh/g, about 500 mAh/g to about 800 mAh/g, about 500 mAh/g to about 1,000 mAh/g, about 500 mAh/g to about 1,200 mAh/g, about 500 mAh/g to about 1,400 mAh/g, about 500 mAh/g to about 1,650 mAh/g, about 600 mAh/g to about 800 mAh/g, about 600 mAh/g to about 1,000 mAh/g, about 600 mAh/g to about 1,200 mAh/g, about 600 mAh/g to about 1,400 mAh/g, about 600 mAh/g to about 1,650 mAh/g, about 800 mAh/g to about 1,000 mAh/g, about 800 mAh/g to about 1,200 mAh/g, about 800 mAh/g to about 1,400 mAh/g, about 800 mAh/g to about 1,650 mAh/g, about 1,000 mAh/g to about 1,200 mAh/g, about 1,000 mAh/g to about 1,400 mAh/g, about 1,000 mAh/g to about 1,650 mAh/g, about 1,200 mAh/g to about 1,400 mAh/g, about 1,200 mAh/g to about 1,650 mAh/g, or about 1,400 mAh/g to about 1,650 mAh/g.

In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 20 cycles of use of about 400 mAh/g to about 1,600 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 20 cycles of use of at least about 400 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 20 cycles of use of at most about 1,600 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 20 cycles of use of about 400 mAh/g to about 600 mAh/g, about 400 mAh/g to about 800 mAh/g, about 400 mAh/g to about 1,000 mAh/g, about 400 mAh/g to about 1,200 mAh/g, about 400 mAh/g to about 1,400 mAh/g, about 400 mAh/g to about 1,600 mAh/g, about 600 mAh/g to about 800 mAh/g, about 600 mAh/g to about 1,000 mAh/g, about 600 mAh/g to about 1,200 mAh/g, about 600 mAh/g to about 1,400 mAh/g, about 600 mAh/g to about 1,600 mAh/g, about 800 mAh/g to about 1,000 mAh/g, about 800 mAh/g to about 1,200 mAh/g, about 800 mAh/g to about 1,400 mAh/g, about 800 mAh/g to about 1,600 mAh/g, about 1,000 mAh/g to about 1,200 mAh/g, about 1,000 mAh/g to about 1,400 mAh/g, about 1,000 mAh/g to about 1,600 mAh/g, about 1,200 mAh/g to about 1,400 mAh/g, about 1,200 mAh/g to about 1,600 mAh/g, or about 1,400 mAh/g to about 1,600 mAh/g.

In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 50 cycles of use of about 330 mAh/g to about 1,500 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 50 cycles of use of at least about 330 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 50 cycles of use of at most about 1,400 mAh/g. In some embodiments wherein the electrode is a composite electrode, wherein the composite material comprises sulfur, and wherein the electrode is comprised of about 90% sulfur by weight, the electrode has a sulfur-specific capacity at a C-rate of about 0.1 after about 50 cycles of use of about 330 mAh/g to about 450 mAh/g, about 330 mAh/g to about 500 mAh/g, about 330 mAh/g to about 600 mAh/g, about 330 mAh/g to about 800 mAh/g, about 330 mAh/g to about 1,000 mAh/g, about 330 mAh/g to about 1,200 mAh/g, about 330 mAh/g to about 1,400 mAh/g, about 450 mAh/g to about 500 mAh/g, about 450 mAh/g to about 600 mAh/g, about 450 mAh/g to about 800 mAh/g, about 450 mAh/g to about 1,000 mAh/g, about 450 mAh/g to about 1,200 mAh/g, about 450 mAh/g to about 1,400 mAh/g, about 500 mAh/g to about 600 mAh/g, about 500 mAh/g to about 800 mAh/g, about 500 mAh/g to about 1,000 mAh/g, about 500 mAh/g to about 1,200 mAh/g, about 500 mAh/g to about 1,400 mAh/g, about 600 mAh/g to about 800 mAh/g, about 600 mAh/g to about 1,000 mAh/g, about 600 mAh/g to about 1,200 mAh/g, about 600 mAh/g to about 1,400 mAh/g, about 800 mAh/g to about 1,000 mAh/g, about 800 mAh/g to about 1,200 mAh/g, about 800 mAh/g to about 1,400 mAh/g, about 1,000 mAh/g to about 1,200 mAh/g, about 1,000 mAh/g to about 1,400 mAh/g, about 1,000 mAh/g to about 1,500 mAh/g, or about 1,200 mAh/g to about 1,400 mAh/g.

In some embodiments wherein the electrode is a composite electrode, wherein the composite material comprises sulfur, and wherein the electrode is comprised of about 90% sulfur by weight, the electrode has an electrode-specific capacity at a C-rate of about 0.1 of about 480 mAh/g to about 1,940 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.1 of at least about 480 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.1 of at most about 1,940 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.1 of about 480 mAh/g to about 500 mAh/g, about 480 mAh/g to about 600 mAh/g, about 480 mAh/g to about 800 mAh/g, about 480 mAh/g to about 1,000 mAh/g, about 480 mAh/g to about 1,200 mAh/g, about 480 mAh/g to about 1,400 mAh/g, about 480 mAh/g to about 1,600 mAh/g, about 480 mAh/g to about 1,800 mAh/g, about 480 mAh/g to about 1,940 mAh/g, about 500 mAh/g to about 600 mAh/g, about 500 mAh/g to about 800 mAh/g, about 500 mAh/g to about 1,000 mAh/g, about 500 mAh/g to about 1,200 mAh/g, about 500 mAh/g to about 1,400 mAh/g, about 500 mAh/g to about 1,600 mAh/g, about 500 mAh/g to about 1,800 mAh/g, about 500 mAh/g to about 1,940 mAh/g, about 600 mAh/g to about 800 mAh/g, about 600 mAh/g to about 1,000 mAh/g, about 600 mAh/g to about 1,200 mAh/g, about 600 mAh/g to about 1,400 mAh/g, about 600 mAh/g to about 1,600 mAh/g, about 600 mAh/g to about 1,800 mAh/g, about 600 mAh/g to about 1,940 mAh/g, about 800 mAh/g to about 1,000 mAh/g, about 800 mAh/g to about 1,200 mAh/g, about 800 mAh/g to about 1,400 mAh/g, about 800 mAh/g to about 1,600 mAh/g, about 800 mAh/g to about 1,800 mAh/g, about 800 mAh/g to about 1,940 mAh/g, about 1,000 mAh/g to about 1,200 mAh/g, about 1,000 mAh/g to about 1,400 mAh/g, about 1,000 mAh/g to about 1,600 mAh/g, about 1,000 mAh/g to about 1,800 mAh/g, about 1,000 mAh/g to about 1,940 mAh/g, about 1,200 mAh/g to about 1,400 mAh/g, about 1,200 mAh/g to about 1,600 mAh/g, about 1,200 mAh/g to about 1,800 mAh/g, about 1,200 mAh/g to about 1,940 mAh/g, about 1,400 mAh/g to about 1,600 mAh/g, about 1,400 mAh/g to about 1,800 mAh/g, about 1,400 mAh/g to about 1,940 mAh/g, about 1,600 mAh/g to about 1,800 mAh/g, about 1,600 mAh/g to about 1,940 mAh/g, or about 1,800 mAh/g to about 1,940 mAh/g.

In some embodiments wherein the electrode is a composite electrode, wherein the composite material comprises sulfur, and wherein the electrode is comprised of about 90% sulfur by weight, the electrode has an electrode-specific capacity at a C-rate of about 0.2 of about 380 mAh/g to about 1,550 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.2 of at least about 380 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.2 of at most about 1,550 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.2 of about 380 mAh/g to about 400 mAh/g, about 380 mAh/g to about 500 mAh/g, about 380 mAh/g to about 600 mAh/g, about 380 mAh/g to about 800 mAh/g, about 380 mAh/g to about 1,000 mAh/g, about 380 mAh/g to about 1,200 mAh/g, about 380 mAh/g to about 1,400 mAh/g, about 380 mAh/g to about 1,550 mAh/g, about 400 mAh/g to about 500 mAh/g, about 400 mAh/g to about 600 mAh/g, about 400 mAh/g to about 800 mAh/g, about 400 mAh/g to about 1,000 mAh/g, about 400 mAh/g to about 1,200 mAh/g, about 400 mAh/g to about 1,400 mAh/g, about 400 mAh/g to about 1,550 mAh/g, about 500 mAh/g to about 600 mAh/g, about 500 mAh/g to about 800 mAh/g, about 500 mAh/g to about 1,000 mAh/g, about 500 mAh/g to about 1,200 mAh/g, about 500 mAh/g to about 1,400 mAh/g, about 500 mAh/g to about 1,550 mAh/g, about 600 mAh/g to about 800 mAh/g, about 600 mAh/g to about 1,000 mAh/g, about 600 mAh/g to about 1,200 mAh/g, about 600 mAh/g to about 1,400 mAh/g, about 600 mAh/g to about 1,550 mAh/g, about 800 mAh/g to about 1,000 mAh/g, about 800 mAh/g to about 1,200 mAh/g, about 800 mAh/g to about 1,400 mAh/g, about 800 mAh/g to about 1,550 mAh/g, about 1,000 mAh/g to about 1,200 mAh/g, about 1,000 mAh/g to about 1,400 mAh/g, about 1,000 mAh/g to about 1,550 mAh/g, about 1,200 mAh/g to about 1,400 mAh/g, about 1,200 mAh/g to about 1,550 mAh/g, or about 1,400 mAh/g to about 1,550 mAh/g.

In some embodiments wherein the electrode is a composite electrode, wherein the composite material comprises sulfur, and wherein the electrode is comprised of about 90% sulfur by weight, the electrode has an electrode-specific capacity at a C-rate of about 0.5 of about 300 mAh/g to about 1,230 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.5 of at least about 300 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.5 of at most about 1,230 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 0.5 of about 300 mAh/g to about 400 mAh/g, about 300 mAh/g to about 500 mAh/g, about 300 mAh/g to about 600 mAh/g, about 300 mAh/g to about 800 mAh/g, about 300 mAh/g to about 1,000 mAh/g, about 300 mAh/g to about 1,230 mAh/g, about 400 mAh/g to about 500 mAh/g, about 400 mAh/g to about 600 mAh/g, about 400 mAh/g to about 800 mAh/g, about 400 mAh/g to about 1,000 mAh/g, about 400 mAh/g to about 1,230 mAh/g, about 500 mAh/g to about 600 mAh/g, about 500 mAh/g to about 800 mAh/g, about 500 mAh/g to about 1,000 mAh/g, about 500 mAh/g to about 1,230 mAh/g, about 600 mAh/g to about 800 mAh/g, about 600 mAh/g to about 1,000 mAh/g, about 600 mAh/g to about 1,230 mAh/g, about 800 mAh/g to about 1,000 mAh/g, about 800 mAh/g to about 1,230 mAh/g, or about 1,000 mAh/g to about 1,230 mAh/g.

In some embodiments wherein the electrode is a composite electrode, wherein the composite material comprises sulfur, and wherein the electrode is comprised of about 90% sulfur by weight, the electrode has an electrode-specific capacity at a C-rate of about 1.0 of about 250 mAh/g to about 1,000 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 1.0 of at least about 250 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 1.0 of at most about 1,000 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 1.0 of about 250 mAh/g to about 300 mAh/g, about 250 mAh/g to about 400 mAh/g, about 250 mAh/g to about 500 mAh/g, about 250 mAh/g to about 600 mAh/g, about 250 mAh/g to about 700 mAh/g, about 250 mAh/g to about 800 mAh/g, about 250 mAh/g to about 900 mAh/g, about 250 mAh/g to about 1,000 mAh/g, about 300 mAh/g to about 400 mAh/g, about 300 mAh/g to about 500 mAh/g, about 300 mAh/g to about 600 mAh/g, about 300 mAh/g to about 700 mAh/g, about 300 mAh/g to about 800 mAh/g, about 300 mAh/g to about 900 mAh/g, about 300 mAh/g to about 1,000 mAh/g, about 400 mAh/g to about 500 mAh/g, about 400 mAh/g to about 600 mAh/g, about 400 mAh/g to about 700 mAh/g, about 400 mAh/g to about 800 mAh/g, about 400 mAh/g to about 900 mAh/g, about 400 mAh/g to about 1,000 mAh/g, about 500 mAh/g to about 600 mAh/g, about 500 mAh/g to about 700 mAh/g, about 500 mAh/g to about 800 mAh/g, about 500 mAh/g to about 900 mAh/g, about 500 mAh/g to about 1,000 mAh/g, about 600 mAh/g to about 700 mAh/g, about 600 mAh/g to about 800 mAh/g, about 600 mAh/g to about 900 mAh/g, about 600 mAh/g to about 1,000 mAh/g, about 700 mAh/g to about 800 mAh/g, about 700 mAh/g to about 900 mAh/g, about 700 mAh/g to about 1,000 mAh/g, about 800 mAh/g to about 900 mAh/g, about 800 mAh/g to about 1,000 mAh/g, or about 900 mAh/g to about 1,000 mAh/g.

In some embodiments wherein the electrode is a composite electrode, wherein the composite material comprises sulfur, and wherein the electrode is comprised of about 90% sulfur by weight, the electrode has an electrode-specific capacity at a C-rate of about 2.0 of about 190 mAh/g to about 770 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 2.0 of at least about 190 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 2.0 of at most about 770 mAh/g. In some embodiments wherein the electrode is a composite electrode, wherein the composite material comprises sulfur, and wherein the electrode is comprised of about 90% sulfur by weight, the electrode has an electrode-specific capacity at a C-rate of about 2.0 of about 190 mAh/g to about 300 mAh/g, about 190 mAh/g to about 400 mAh/g, about 190 mAh/g to about 500 mAh/g, about 190 mAh/g to about 600 mAh/g, about 190 mAh/g to about 700 mAh/g, about 190 mAh/g to about 770 mAh/g, about 300 mAh/g to about 400 mAh/g, about 300 mAh/g to about 500 mAh/g, about 300 mAh/g to about 600 mAh/g, about 300 mAh/g to about 700 mAh/g, about 300 mAh/g to about 770 mAh/g, about 400 mAh/g to about 500 mAh/g, about 400 mAh/g to about 600 mAh/g, about 400 mAh/g to about 700 mAh/g, about 400 mAh/g to about 770 mAh/g, about 500 mAh/g to about 600 mAh/g, about 500 mAh/g to about 700 mAh/g, about 500 mAh/g to about 770 mAh/g, about 600 mAh/g to about 700 mAh/g, about 600 mAh/g to about 770 mAh/g, or about 700 mAh/g to about 770 mAh/g.

In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 about 220 mAh/g to about 880 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 of at least about 220 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 of at most about 880 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 about 220 mAh/g to about 250 mAh/g, about 220 mAh/g to about 300 mAh/g, about 220 mAh/g to about 350 mAh/g, about 220 mAh/g to about 400 mAh/g, about 220 mAh/g to about 450 mAh/g, about 220 mAh/g to about 500 mAh/g, about 220 mAh/g to about 600 mAh/g, about 220 mAh/g to about 700 mAh/g, about 220 mAh/g to about 800 mAh/g, about 220 mAh/g to about 880 mAh/g, about 250 mAh/g to about 300 mAh/g, about 250 mAh/g to about 350 mAh/g, about 250 mAh/g to about 400 mAh/g, about 250 mAh/g to about 450 mAh/g, about 250 mAh/g to about 500 mAh/g, about 250 mAh/g to about 600 mAh/g, about 250 mAh/g to about 700 mAh/g, about 250 mAh/g to about 800 mAh/g, about 250 mAh/g to about 880 mAh/g, about 300 mAh/g to about 350 mAh/g, about 300 mAh/g to about 400 mAh/g, about 300 mAh/g to about 450 mAh/g, about 300 mAh/g to about 500 mAh/g, about 300 mAh/g to about 600 mAh/g, about 300 mAh/g to about 700 mAh/g, about 300 mAh/g to about 800 mAh/g, about 300 mAh/g to about 880 mAh/g, about 350 mAh/g to about 400 mAh/g, about 350 mAh/g to about 450 mAh/g, about 350 mAh/g to about 500 mAh/g, about 350 mAh/g to about 600 mAh/g, about 350 mAh/g to about 700 mAh/g, about 350 mAh/g to about 800 mAh/g, about 350 mAh/g to about 880 mAh/g, about 400 mAh/g to about 450 mAh/g, about 400 mAh/g to about 500 mAh/g, about 400 mAh/g to about 600 mAh/g, about 400 mAh/g to about 700 mAh/g, about 400 mAh/g to about 800 mAh/g, about 400 mAh/g to about 880 mAh/g, about 450 mAh/g to about 500 mAh/g, about 450 mAh/g to about 600 mAh/g, about 450 mAh/g to about 700 mAh/g, about 450 mAh/g to about 800 mAh/g, about 450 mAh/g to about 880 mAh/g, about 500 mAh/g to about 600 mAh/g, about 500 mAh/g to about 700 mAh/g, about 500 mAh/g to about 800 mAh/g, about 500 mAh/g to about 880 mAh/g, about 600 mAh/g to about 700 mAh/g, about 600 mAh/g to about 800 mAh/g, about 600 mAh/g to about 880 mAh/g, about 700 mAh/g to about 800 mAh/g, about 700 mAh/g to about 880 mAh/g, or about 800 mAh/g to about 880 mAh/g.

In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 and after 30 cycles of about 445 mAh/g to about 950 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 and after about 30 cycles of use of at least about 445 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 and after about 30 cycles of use of at most about 950 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 and after about 30 cycles of use of about 445 mAh/g to about 500 mAh/g, about 445 mAh/g to about 600 mAh/g, about 445 mAh/g to about 700 mAh/g, about 445 mAh/g to about 800 mAh/g, about 445 mAh/g to about 900 mAh/g, about 445 mAh/g to about 950 mAh/g, about 500 mAh/g to about 600 mAh/g, about 500 mAh/g to about 700 mAh/g, about 500 mAh/g to about 800 mAh/g, about 500 mAh/g to about 900 mAh/g, about 500 mAh/g to about 950 mAh/g, about 600 mAh/g to about 700 mAh/g, about 600 mAh/g to about 800 mAh/g, about 600 mAh/g to about 900 mAh/g, about 600 mAh/g to about 950 mAh/g, about 700 mAh/g to about 800 mAh/g, about 700 mAh/g to about 900 mAh/g, about 700 mAh/g to about 950 mAh/g, about 800 mAh/g to about 900 mAh/g, about 800 mAh/g to about 950 mAh/g, or about 900 mAh/g to about 950 mAh/g.

In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 and after about 500 cycles of use about 170 mAh/g to about 680 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 and after about 500 cycles of use of at least about 170 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 and after about 500 cycles of use of at most about 680 mAh/g. In some embodiments wherein the electrode is a composite electrode, wherein the composite material comprises sulfur, and wherein the electrode is comprised of about 90% sulfur by weight, the electrode has an electrode-specific discharge capacity at a C-rate of about 1.0 and after about 500 cycles of use about 170 mAh/g to about 200 mAh/g, about 170 mAh/g to about 300 mAh/g, about 170 mAh/g to about 400 mAh/g, about 170 mAh/g to about 500 mAh/g, about 170 mAh/g to about 600 mAh/g, about 170 mAh/g to about 680 mAh/g, about 200 mAh/g to about 300 mAh/g, about 200 mAh/g to about 400 mAh/g, about 200 mAh/g to about 500 mAh/g, about 200 mAh/g to about 600 mAh/g, about 200 mAh/g to about 680 mAh/g, about 300 mAh/g to about 400 mAh/g, about 300 mAh/g to about 500 mAh/g, about 300 mAh/g to about 600 mAh/g, about 300 mAh/g to about 680 mAh/g, about 400 mAh/g to about 500 mAh/g, about 400 mAh/g to about 600 mAh/g, about 400 mAh/g to about 680 mAh/g, about 500 mAh/g to about 600 mAh/g, about 500 mAh/g to about 680 mAh/g, or about 600 mAh/g to about 680 mAh/g.

In some embodiments wherein the electrode is a composite electrode, wherein the composite material comprises sulfur, and wherein the electrode is comprised of about 90% sulfur by weight, the electrode has an electrode-specific capacity fading at a C-rate of about 1.0 of about 0.025% to about 1%. In some embodiments wherein the electrode is a composite electrode, wherein the composite material comprises sulfur, and wherein the electrode is comprised of about 90% sulfur by weight, the electrode has an electrode-specific capacity fading at a C-rate of about 1.0 of at least about 0.025%. In some embodiments wherein the electrode is a composite electrode, wherein the composite material comprises sulfur, and wherein the electrode is comprised of about 90% sulfur by weight, the electrode has an electrode-specific capacity fading at a C-rate of about 1.0 of at most about 1%. In some embodiments wherein the electrode is a composite electrode, wherein the composite material comprises sulfur, and wherein the electrode is comprised of about 90% sulfur by weight, the electrode has an electrode-specific capacity fading at a C-rate of about 1.0 of about 0.025% to about 0.05%, about 0.025% to about 0.1%, about 0.025% to about 0.25%, about 0.025% to about 0.5%, about 0.025% to about 0.75%, about 0.025% to about 1%, about 0.05% to about 0.1%, about 0.05% to about 0.25%, about 0.05% to about 0.5%, about 0.05% to about 0.75%, about 0.05% to about 1%, about 0.1% to about 0.25%, about 0.1% to about 0.5%, about 0.1% to about 0.75%, about 0.1% to about 1%, about 0.25% to about 0.5%, about 0.25% to about 0.75%, about 0.25% to about 1%, about 0.5% to about 0.75%, about 0.5% to about 1%, or about 0.75% to about 1%.

In some embodiments, the electrode is a composite electrode, wherein the composite material comprises a transition metal oxide.

In some embodiments, a transition metal oxide comprises $Nb_2O_5$, $Al_2O_3$, $V_2O_5$, $Re_2O_7$, $CrO_3$, $CeO_2$, $RuO_2$, $ZrO_2$, $MoO_3$, $WO_3$, $TiO_2$, or any combination thereof.

In some embodiments wherein the electrode is a composite electrode, and wherein the composite material comprises a transition metal oxide, the electrode has a loading ratio of about 40% to about 95%. In some embodiments wherein the electrode is a composite electrode, and wherein the composite material comprises a transition metal oxide, the electrode has a loading ratio of at least about 40%. In some embodiments wherein the electrode is a composite electrode, and wherein the composite material comprises a transition metal oxide, the electrode has a loading ratio of at most about 95%. In some embodiments wherein the electrode is a composite electrode, and wherein the composite material comprises a transition metal oxide, the electrode has a loading ratio of about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95%, or about 90% to about 95%.

In some embodiments wherein the electrode is a composite electrode, and wherein the composite material comprises a transition metal oxide, the electrode has an electrode-specific gravimetric capacitance about 250 F/g to about 2,000 F/g. In some embodiments wherein the electrode is a composite electrode, and wherein the composite material comprises a transition metal oxide, the electrode has an electrode-specific gravimetric capacitance of at least about 250 F/g. In some embodiments wherein the electrode is a composite electrode, and wherein the composite material comprises a transition metal oxide, the electrode has an electrode-specific gravimetric capacitance of at most about 2,000 F/g. In some embodiments wherein the electrode is a composite electrode, and wherein the composite material comprises a transition metal oxide, the electrode has an electrode-specific gravimetric capacitance about 250 F/g to about 500 F/g, about 250 F/g to about 750 F/g, about 250 F/g to about 1,000 F/g, about 250 F/g to about 1,250 F/g, about 250 F/g to about 1,500 F/g, about 250 F/g to about 1,750 F/g, about 250 F/g to about 2,000 F/g, about 500 F/g to about 750 F/g, about 500 F/g to about 1,000 F/g, about 500 F/g to about 1,250 F/g, about 500 F/g to about 1,500 F/g, about 500 F/g to about 1,750 F/g, about 500 F/g to about 2,000 F/g, about 750 F/g to about 1,000 F/g, about 750 F/g to about 1,250 F/g, about 750 F/g to about 1,500 F/g, about 750 F/g to about 1,750 F/g, about 750 F/g to about 2,000 F/g, about 1,000 F/g to about 1,250 F/g, about 1,000 F/g to about 1,500 F/g, about 1,000 F/g to about 1,750 F/g, about 1,000 F/g to about 2,000 F/g, about 1,250 F/g to about 1,500 F/g, about 1,250 F/g to about 1,750 F/g, about 1,250 F/g to about 2,000 F/g, about 1,500 F/g to about 1,750 F/g, about 1,500 F/g to about 2,000 F/g, or about 1,750 F/g to about 2,000 F/g.

In some embodiments wherein the electrode is a composite electrode, and wherein the composite material comprises a transition metal oxide, the electrode has an operation voltage potential of about 0.5 V to about 4 V. In some embodiments wherein the electrode is a composite electrode, and wherein the composite material comprises a transition metal oxide, the electrode has an operation voltage potential of at least about 0.5 V. In some embodiments wherein the electrode is a composite electrode, and wherein the composite material comprises a transition metal oxide, the electrode has an operation voltage potential of at most about 4 V. In some embodiments wherein the electrode is a composite electrode, and wherein the composite material comprises a transition metal oxide, the electrode has an operation voltage potential of about 0.5 V to about 0.75 V, about 0.5 V to about 1 V, about 0.5 V to about 2 V, about 0.5 V to about 3 V, about 0.5 V to about 4 V, about 0.75 V to about 1 V, about 0.75 V to about 2 V, about 0.75 V to about 3 V, about 0.75 V to about 4 V, about 1 V to about 2 V, about 1 V to about 3 V, about 1 V to about 4 V, about 2 V to about 3 V, about 2 V to about 4 V, or about 3 V to about 4 V.

A second embodiment provided herein is an energy storage device comprising a first electrode, a second electrode, and an electrolyte, wherein at least one of the first electrode and the second electrode comprises a 3D graphene framework, wherein the 3D graphene framework comprises an interconnected conductive network of graphene sheets with a porous structure and wherein at least one of the first electrode and the second electrode further comprises a composite material comprising a capacitive or pseudo-capacitive material.

In some embodiments, the 3D graphene framework comprises a holey 3D graphene framework.

In some embodiments, the electrolyte is a non-aqueous electrolyte comprising lithium hexafluorophosphate, iodomethane, dimethyl sulfate, dimethyl carbonate, tetramethylammonium chloride, methyl triflate, diazomethane, methyl fluorosulfonate ethyl acetate, acetone, dimethylformamide, acetonitrile, dimethyl sulfoxide, nitromethane, propylene carbonate, ethylene carbonate, lithium bis(trifluoromethanesulphonyl)imide, 1-2 dimethoxyethane, 1,3-dioxolane, lithium nitrate, or any combination thereof.

In some embodiments, the energy storage device has a stack-specific energy density of about 16 Wh/kg to about 750 Wh/kg. In some embodiments, the energy storage device has a stack-specific energy density of at least about 16 Wh/kg. In some embodiments, the energy storage device has a stack-specific energy density of at most about 750 Wh/kg. In some embodiments, the energy storage device has a stack-specific energy density of about 16 Wh/kg to about 25 Wh/kg, about 16 Wh/kg to about 50 Wh/kg, about 16 Wh/kg to about 100 Wh/kg, about 16 Wh/kg to about 200 Wh/kg, about 16 Wh/kg to about 400 Wh/kg, about 16 Wh/kg to about 600 Wh/kg, about 16 Wh/kg to about 750 Wh/kg, about 25 Wh/kg to about 50 Wh/kg, about 25 Wh/kg to about 100 Wh/kg, about 25 Wh/kg to about 200 Wh/kg, about 25 Wh/kg to about 400 Wh/kg, about 25 Wh/kg to about 600 Wh/kg, about 25 Wh/kg to about 750 Wh/kg, about 50 Wh/kg to about 100 Wh/kg, about 50 Wh/kg to about 200 Wh/kg, about 50 Wh/kg to about 400 Wh/kg, about 50 Wh/kg to about 600 Wh/kg, about 50 Wh/kg to about 750 Wh/kg, about 100 Wh/kg to about 200 Wh/kg, about 100 Wh/kg to about 400 Wh/kg, about 100 Wh/kg to about 600 Wh/kg, about 100 Wh/kg to about 750 Wh/kg, about 200 Wh/kg to about 400 Wh/kg, about 200 Wh/kg to about 600 Wh/kg, about 200 Wh/kg to about 750 Wh/kg, about 400 Wh/kg to about 600 Wh/kg, about 400 Wh/kg to about 750 Wh/kg, or about 600 Wh/kg to about 750 Wh/kg.

In some embodiments, the energy storage device has a stack-specific power density of about 0.5 kW/kg to about 20 kW/kg. In some embodiments, the energy storage device has a stack-specific power density of at least about 0.5 kW/kg. In some embodiments, the energy storage device has a stack-specific power density of at most about 20 kW/kg. In some embodiments, the energy storage device has a stack-specific power density about 0.5 kW/kg to about 1 kW/kg, about 0.5 kW/kg to about 2 kW/kg, about 0.5 kW/kg to about 5 kW/kg, about 0.5 kW/kg to about 10 kW/kg, about 0.5 kW/kg to about 15 kW/kg, about 0.5 kW/kg to about 20 kW/kg, about 1 kW/kg to about 2 kW/kg, about 1 kW/kg to about 5 kW/kg, about 1 kW/kg to about 10 kW/kg, about 1 kW/kg to about 15 kW/kg, about 1 kW/kg to about 20 kW/kg, about 2 kW/kg to about 5 kW/kg, about 2 kW/kg to about 10 kW/kg, about 2 kW/kg to about 15 kW/kg, about 2 kW/kg to about 20 kW/kg, about 5 kW/kg to about 10 kW/kg, about 5 kW/kg to about 15 kW/kg, about 5 kW/kg to about 20 kW/kg, about 10 kW/kg to about 15 kW/kg, about 10 kW/kg to about 20 kW/kg, or about 15 kW/kg to about 20 kW/kg.

In some embodiments, the energy storage device has an electrode-specific gravimetric energy density of about 16 Wh/kg to about 900 Wh/kg. In some embodiments, the energy storage device has an electrode-specific gravimetric energy density of at least about 16 Wh/kg. In some embodiments, the energy storage device has an electrode-specific gravimetric energy density of at most about 900 Wh/kg. In some embodiments, the energy storage device has an electrode-specific gravimetric energy density of about 16 Wh/kg to about 25 Wh/kg, about 16 Wh/kg to about 50 Wh/kg, about 16 Wh/kg to about 100 Wh/kg, about 16 Wh/kg to about 200 Wh/kg, about 16 Wh/kg to about 400 Wh/kg, about 16 Wh/kg to about 600 Wh/kg, about 16 Wh/kg to about 800 Wh/kg, about 16 Wh/kg to about 900 Wh/kg, about 25 Wh/kg to about 50 Wh/kg, about 25 Wh/kg to about 100 Wh/kg, about 25 Wh/kg to about 200 Wh/kg, about 25 Wh/kg to about 400 Wh/kg, about 25 Wh/kg to about 600 Wh/kg, about 25 Wh/kg to about 800 Wh/kg, about 25 Wh/kg to about 900 Wh/kg, about 50 Wh/kg to about 100 Wh/kg, about 50 Wh/kg to about 200 Wh/kg, about 50 Wh/kg to about 400 Wh/kg, about 50 Wh/kg to about 600 Wh/kg, about 50 Wh/kg to about 800 Wh/kg, about 50 Wh/kg to about 900 Wh/kg, about 100 Wh/kg to about 200 Wh/kg, about 100 Wh/kg to about 400 Wh/kg, about 100 Wh/kg to about 600 Wh/kg, about 100 Wh/kg to about 800 Wh/kg, about 100 Wh/kg to about 900 Wh/kg, about 200 Wh/kg to about 400 Wh/kg, about 200 Wh/kg to about 600 Wh/kg, about 200 Wh/kg to about 800 Wh/kg, about 200 Wh/kg to about 900 Wh/kg, about 400 Wh/kg to about 600 Wh/kg, about 400 Wh/kg to about 800 Wh/kg, about 400 Wh/kg to about 900 Wh/kg, about 600 Wh/kg to about 800 Wh/kg, about 600 Wh/kg to about 900 Wh/kg, or about 800 Wh/kg to about 900 Wh/kg.

In some embodiments, the energy storage device has an electrode-specific gravimetric power density of about 0.5 kW/kg to about 40 kW/kg. In some embodiments, the energy storage device has an electrode-specific gravimetric power density of at least about 0.5 kW/kg. In some embodiments, the energy storage device has an electrode-specific gravimetric power density of at most about 40 kW/kg. In some embodiments, the energy storage device has an electrode-specific gravimetric power density of about 0.5 kW/kg to about 1 kW/kg, about 0.5 kW/kg to about 2 kW/kg, about 0.5 kW/kg to about 5 kW/kg, about 0.5 kW/kg to about 10 kW/kg, about 0.5 kW/kg to about 20 kW/kg, about 0.5 kW/kg to about 30 kW/kg, about 0.5 kW/kg to about 40 kW/kg, about 1 kW/kg to about 2 kW/kg, about 1 kW/kg to about 5 kW/kg, about 1 kW/kg to about 10 kW/kg, about 1 kW/kg to about 20 kW/kg, about 1 kW/kg to about 30 kW/kg, about 1 kW/kg to about 40 kW/kg, about 2 kW/kg to about 5 kW/kg, about 2 kW/kg to about 10 kW/kg, about 2 kW/kg to about 20 kW/kg, about 2 kW/kg to about 30 kW/kg, about 2 kW/kg to about 40 kW/kg, about 5 kW/kg to about 10 kW/kg, about 5 kW/kg to about 20 kW/kg, about 5 kW/kg to about 30 kW/kg, about 5 kW/kg to about 40 kW/kg, about 10 kW/kg to about 20 kW/kg, about 10 kW/kg to about 30 kW/kg, about 10 kW/kg to about 40 kW/kg, about 20 kW/kg to about 30 kW/kg, about 20 kW/kg to about 40 kW/kg, or about 30 kW/kg to about 40 kW/kg.

In some embodiments, the energy storage device has a total capacitance of about 0.001 F to about 10 F. In some embodiments, the energy storage device has a total capacitance of at least about 0.001 F. In some embodiments, the energy storage device has a total capacitance of at most about 10 F. In some embodiments, the energy storage device has a total capacitance of about 0.001 F to about 0.005 F, about 0.001 F to about 0.01 F, about 0.001 F to about 0.05 F, about 0.001 F to about 0.1 F, about 0.001 F to about 0.5 F, about 0.001 F to about 1 F, about 0.001 F to about 5 F, about 0.001 F to about 10 F, about 0.005 F to about 0.01 F, about 0.005 F to about 0.05 F, about 0.005 F to about 0.1 F, about 0.005 F to about 0.5 F, about 0.005 F to about 1 F, about 0.005 F to about 5 F, about 0.005 F to about 10 F, about 0.01 F to about 0.05 F, about 0.01 F to about 0.1 F, about 0.01 F to about 0.5 F, about 0.01 F to about 1 F, about 0.01 F to about 5 F, about 0.01 F to about 10 F, about 0.05 F to about 0.1 F, about 0.05 F to about 0.5 F, about 0.05 F to about 1 F, about 0.05 F to about 5 F, about 0.05 F to about 10 F, about 0.1 F to about 0.5 F, about 0.1 F to about 1 F, about 0.1 F to about 5 F, about 0.1 F to about 10 F, about 0.5 F to about 1 F, about 0.5 F to about 5 F, about 0.5 F to about 10 F, about 1 F to about 5 F, about 1 F to about 10 F, or about 5 F to about 10 F.

In some embodiments, the energy storage device is a pouch cell. In some embodiments, the energy storage device is a coin cell. In some embodiments, the first electrode is the cathode and the second electrode is the anode. In some embodiments, the first electrode is the anode and the second electrode is the cathode, wherein the electrolyte is a non-aqueous electrolyte.

In some embodiments, the anode comprises a composite electrode, wherein the composite material comprises silicon, and wherein the cathode comprises a composite electrode, wherein the composite material comprises sulfur.

In some embodiments, the energy storage device has an areal energy density about 11 Wh/m$^2$ to about 45 Wh/m$^2$. In some embodiments, the energy storage device has an areal energy density of at least about 11 Wh/m$^2$. In some embodiments, the energy storage device has an areal energy density of at most about 45 Wh/m$^2$. In some embodiments, the energy storage device has an areal energy density about 11 Wh/m$^2$ to about 15 Wh/m$^2$, about 11 Wh/m$^2$ to about 20 Wh/m$^2$, about 11 Wh/m$^2$ to about 25 Wh/m$^2$, about 11 Wh/m$^2$ to about 30 Wh/m$^2$, about 11 Wh/m$^2$ to about 35 Wh/m$^2$, about 11 Wh/m$^2$ to about 45 Wh/m$^2$, about 15 Wh/m$^2$ to about 20 Wh/m$^2$, about 15 Wh/m$^2$ to about 25 Wh/m$^2$, about 15 Wh/m$^2$ to about 30 Wh/m$^2$, about 15 Wh/m$^2$ to about 35 Wh/m$^2$, about 15 Wh/m$^2$ to about 45 Wh/m$^2$, about 20 Wh/m$^2$ to about 25 Wh/m$^2$, about 20 Wh/m$^2$ to about 30 Wh/m$^2$, about 20 Wh/m$^2$ to about 35 Wh/m$^2$, about 20 Wh/m$^2$ to about 45 Wh/m$^2$, about 25 Wh/m$^2$ to about 30 Wh/m$^2$, about 25 Wh/m$^2$ to about 35 Wh/m$^2$, about 25 Wh/m$^2$ to about 45 Wh/m$^2$, about 30 Wh/m$^2$ to about 35 Wh/m$^2$, about 30 Wh/m$^2$ to about 45 Wh/m$^2$, or about 35 Wh/m$^2$ to about 45 Wh/m$^2$.

In some embodiments, the energy storage device has an areal power density about 85 kW/m$^2$ to about 360 kW/m$^2$. In some embodiments, the energy storage device has an areal power density of at least about 85 kW/m$^2$. In some embodiments, the energy storage device has an areal power density of at most about 360 kW/m$^2$. In some embodiments, the energy storage device has an areal power density about 85 kW/m$^2$ to about 100 kW/m$^2$, about 85 kW/m$^2$ to about 150 kW/m$^2$, about 85 kW/m$^2$ to about 200 kW/m$^2$, about 85 kW/m$^2$ to about 250 kW/m$^2$, about 85 kW/m$^2$ to about 300 kW/m$^2$, about 85 kW/m$^2$ to about 360 kW/m$^2$, about 100 kW/m$^2$ to about 150 kW/m$^2$, about 100 kW/m$^2$ to about 200 kW/m$^2$, about 100 kW/m$^2$ to about 250 kW/m$^2$, about 100 kW/m$^2$ to about 300 kW/m$^2$, about 100 kW/m$^2$ to about 360 kW/m$^2$, about 150 kW/m$^2$ to about 200 kW/m$^2$, about 150 kW/m$^2$ to about 250 kW/m$^2$, about 150 kW/m$^2$ to about 300 kW/m$^2$, about 150 kW/m$^2$ to about 360 kW/m$^2$, about 200 kW/m$^2$ to about 250 kW/m$^2$, about 200 kW/m$^2$ to about 300 kW/m$^2$, about 200 kW/m$^2$ to about 360 kW/m$^2$, about 250 kW/m$^2$ to about 300 kW/m$^2$, about 250 kW/m$^2$ to about 360 kW/m$^2$, or about 300 kW/m$^2$ to about 360 kW/m$^2$.

In some embodiments, the energy storage device has a stack-specific energy density about 6 Wh/kg to about 70 Wh/kg. In some embodiments, the energy storage device has a stack-specific energy density of at least about 6 Wh/kg. In some embodiments, the energy storage device has a stack-specific energy density of at most about 70 Wh/kg. In some embodiments, the energy storage device has a stack-specific energy density about 6 Wh/kg to about 10 Wh/kg, about 6 Wh/kg to about 20 Wh/kg, about 6 Wh/kg to about 30 Wh/kg, about 6 Wh/kg to about 40 Wh/kg, about 6 Wh/kg to about 50 Wh/kg, about 6 Wh/kg to about 60 Wh/kg, about 6 Wh/kg to about 70 Wh/kg, about 10 Wh/kg to about 20 Wh/kg, about 10 Wh/kg to about 30 Wh/kg, about 10 Wh/kg to about 40 Wh/kg, about 10 Wh/kg to about 50 Wh/kg, about 10 Wh/kg to about 60 Wh/kg, about 10 Wh/kg to about 70 Wh/kg, about 20 Wh/kg to about 30 Wh/kg, about 20 Wh/kg to about 40 Wh/kg, about 20 Wh/kg to about 50 Wh/kg, about 20 Wh/kg to about 60 Wh/kg, about 20 Wh/kg to about 70 Wh/kg, about 30 Wh/kg to about 40 Wh/kg, about 30 Wh/kg to about 50 Wh/kg, about 30 Wh/kg to about 60 Wh/kg, about 30 Wh/kg to about 70 Wh/kg, about 40 Wh/kg to about 50 Wh/kg, about 40 Wh/kg to about 60 Wh/kg, about 40 Wh/kg to about 70 Wh/kg, about 50 Wh/kg to about 60 Wh/kg, about 50 Wh/kg to about 70 Wh/kg, or about 60 Wh/kg to about 70 Wh/kg.

In some embodiments, the energy storage device has a stack-specific volumetric energy density about 25 Wh/L to about 100 Wh/L. In some embodiments, the energy storage device has a stack-specific volumetric energy density of at least about 25 Wh/L. In some embodiments, the energy storage device has a stack-specific volumetric energy density of at most about 100 Wh/L. In some embodiments, the energy storage device has a stack-specific volumetric energy density about 25 Wh/L to about 30 Wh/L, about 25 Wh/L to about 40 Wh/L, about 25 Wh/L to about 50 Wh/L, about 25 Wh/L to about 60 Wh/L, about 25 Wh/L to about 70 Wh/L, about 25 Wh/L to about 80 Wh/L, about 25 Wh/L to about 90 Wh/L, about 25 Wh/L to about 100 Wh/L, about 30 Wh/L to about 40 Wh/L, about 30 Wh/L to about 50 Wh/L, about 30 Wh/L to about 60 Wh/L, about 30 Wh/L to about 70 Wh/L, about 30 Wh/L to about 80 Wh/L, about 30 Wh/L to about 90 Wh/L, about 30 Wh/L to about 100 Wh/L, about 40 Wh/L to about 50 Wh/L, about 40 Wh/L to about 60 Wh/L, about 40 Wh/L to about 70 Wh/L, about 40 Wh/L to about 80 Wh/L, about 40 Wh/L to about 90 Wh/L, about 40 Wh/L to about 100 Wh/L, about 50 Wh/L to about 60 Wh/L, about 50 Wh/L to about 70 Wh/L, about 50 Wh/L to about 80 Wh/L, about 50 Wh/L to about 90 Wh/L, about 50 Wh/L to about 100 Wh/L, about 60 Wh/L to about 70 Wh/L, about 60 Wh/L to about 80 Wh/L, about 60 Wh/L to about 90 Wh/L, about 60 Wh/L to about 100 Wh/L, about 70 Wh/L to about 80 Wh/L, about 70 Wh/L to about 90 Wh/L, about 70 Wh/L to about 100 Wh/L, about 80 Wh/L to about 90 Wh/L, about 80 Wh/L to about 100 Wh/L, or about 90 Wh/L to about 100 Wh/L.

In some embodiments, the energy storage device has an electrode-specific gravimetric energy density of about 1.5 Wh/kg to about 240 Wh/kg. In some embodiments, the energy storage device has an electrode-specific gravimetric energy density of at least about 1.5 Wh/kg. In some embodiments, the energy storage device has an electrode-specific gravimetric energy density of at most about 240 Wh/kg. In some embodiments, the energy storage device has an electrode-specific gravimetric energy density of about 1.5 Wh/kg to about 5 Wh/kg, about 1.5 Wh/kg to about 10 Wh/kg, about 1.5 Wh/kg to about 20 Wh/kg, about 1.5 Wh/kg to about 50 Wh/kg, about 1.5 Wh/kg to about 100 Wh/kg, about 1.5 Wh/kg to about 150 Wh/kg, about 1.5 Wh/kg to about 200 Wh/kg, about 1.5 Wh/kg to about 240 Wh/kg, about 5 Wh/kg to about 10 Wh/kg, about 5 Wh/kg to about 20 Wh/kg, about 5 Wh/kg to about 50 Wh/kg, about 5 Wh/kg to about 100 Wh/kg, about 5 Wh/kg to about 150 Wh/kg, about 5 Wh/kg to about 200 Wh/kg, about 5 Wh/kg to about 240 Wh/kg, about 10 Wh/kg to about 20 Wh/kg, about 10 Wh/kg to about 50 Wh/kg, about 10 Wh/kg to about 100 Wh/kg, about 10 Wh/kg to about 150 Wh/kg, about 10 Wh/kg to about 200 Wh/kg, about 10 Wh/kg to about 240 Wh/kg, about 20 Wh/kg to about 50 Wh/kg, about 20 Wh/kg to about 100 Wh/kg, about 20 Wh/kg to about 150 Wh/kg, about 20 Wh/kg to about 200 Wh/kg, about 20 Wh/kg to about 240 Wh/kg, about 50 Wh/kg to about 100 Wh/kg, about 50 Wh/kg to about 150 Wh/kg, about 50 Wh/kg to about 200 Wh/kg, about 50 Wh/kg to about 240 Wh/kg, about 100 Wh/kg to about 150 Wh/kg, about 100 Wh/kg to about 200 Wh/kg, about 100 Wh/kg to about 240 Wh/kg, about 150 Wh/kg to about 200 Wh/kg, about 150 Wh/kg to about 240 Wh/kg, or about 200 Wh/kg to about 240 Wh/kg.

In some embodiments, the energy storage device has an electrode-specific gravimetric power density of about 1.5 kW/kg to about 40 kW/kg. In some embodiments, the energy storage device has an electrode-specific gravimetric power density of at least about 1.5 kW/kg. In some embodiments, the energy storage device has an electrode-specific gravimetric power density of at most about 40 kW/kg. In some embodiments, the energy storage device has an electrode-specific gravimetric power density of about 1.5 kW/kg to about 5 kW/kg, about 1.5 kW/kg to about 10 kW/kg, about 1.5 kW/kg to about 20 kW/kg, about 1.5 kW/kg to about 30 kW/kg, about 1.5 kW/kg to about 40 kW/kg, about 5 kW/kg to about 10 kW/kg, about 5 kW/kg to about 20 kW/kg, about 5 kW/kg to about 30 kW/kg, about 5 kW/kg to about 40 kW/kg, about 10 kW/kg to about 20 kW/kg, about 10 kW/kg to about 30 kW/kg, about 10 kW/kg to about 40 kW/kg, about 20 kW/kg to about 30 kW/kg, about 20 kW/kg to about 40 kW/kg, or about 30 kW/kg to about 40 kW/kg.

In some embodiments, the energy storage device has a total capacitance of about 100 F to about 1,000 F. In some embodiments, the energy storage device has a total capacitance of at least about 100 F. In some embodiments, the energy storage device has a total capacitance of at most about 1,000 F. In some embodiments, the energy storage device has a total capacitance of about 500 F to about 100 F, about 500 F to about 200 F, about 500 F to about 300 F, about 500 F to about 400 F, about 500 F to about 500 F, about 500 F to about 750 F, about 500 F to about 1,000 F, about 100 F to about 200 F, about 100 F to about 300 F, about 100 F to about 400 F, about 100 F to about 500 F, about 100 F to about 750 F, about 100 F to about 1,000 F, about 200 F to about 300 F, about 200 F to about 400 F, about 200 F to about 500 F, about 200 F to about 750 F, about 200 F to about 1,000 F, about 300 F to about 400 F, about 300 F to about 500 F, about 300 F to about 750 F, about 300 F to about 1,000 F, about 400 F to about 500 F, about 400 F to about 750 F, about 400 F to about 1,000 F, about 500 F to about 750 F, about 500 F to about 1,000 F, or about 750 F to about 1,000 F.

In some embodiments, an electrode comprises a composite electrode comprising a composite material, wherein the composite material comprises silicon, In some embodiments wherein an electrode comprises a composite electrode comprising a composite material, wherein the composite material comprises silicon, the energy storage device has a stack-specific energy density about 20 Wh/kg to about 200 Wh/kg. In some embodiments wherein an electrode comprises a composite electrode comprising a composite material, wherein the composite material comprises silicon, the energy storage device has a stack-specific energy density of at least about 20 Wh/kg. In some embodiments wherein an electrode comprises a composite electrode comprising a composite material, wherein the composite material comprises silicon, the energy storage device has a stack-specific energy density of at most about 200 Wh/kg. In some embodiments wherein an electrode comprises a composite electrode comprising a composite material, wherein the composite material comprises silicon, the energy storage device has a stack-specific energy density about 20 Wh/kg to about 40 Wh/kg, about 20 Wh/kg to about 60 Wh/kg, about 20 Wh/kg to about 80 Wh/kg, about 20 Wh/kg to about 100 Wh/kg, about 20 Wh/kg to about 120 Wh/kg, about 20 Wh/kg to about 160 Wh/kg, about 20 Wh/kg to about 180 Wh/kg, about 20 Wh/kg to about 200 Wh/kg, about 40 Wh/kg to about 60 Wh/kg, about 40 Wh/kg to about 80 Wh/kg, about 40 Wh/kg to about 100 Wh/kg, about 40 Wh/kg to about 120 Wh/kg, about 40 Wh/kg to about 160 Wh/kg, about 40 Wh/kg to about 180 Wh/kg, about 40 Wh/kg to about 200 Wh/kg, about 60 Wh/kg to about 80 Wh/kg, about 60 Wh/kg to about 100 Wh/kg, about 60 Wh/kg to about 120 Wh/kg, about 60 Wh/kg to about 160 Wh/kg, about 60 Wh/kg to about 180 Wh/kg, about 60 Wh/kg to about 200 Wh/kg, about 80 Wh/kg to about 100 Wh/kg, about 80 Wh/kg to about 120 Wh/kg, about 80 Wh/kg to about 160 Wh/kg, about 80 Wh/kg to about 180 Wh/kg, about 80 Wh/kg to about 200 Wh/kg, about 100 Wh/kg to about 120 Wh/kg, about 100 Wh/kg to about 160 Wh/kg, about 100 Wh/kg to about 180 Wh/kg, about 100 Wh/kg to about 200 Wh/kg, about 120 Wh/kg to about 160 Wh/kg, about 120 Wh/kg to about 180 Wh/kg, about 120 Wh/kg to about 200 Wh/kg, about 160 Wh/kg to about 180 Wh/kg, about 160 Wh/kg to about 200 Wh/kg, or about 180 Wh/kg to about 200 Wh/kg.

In some embodiments wherein an electrode comprises a composite electrode comprising a composite material, wherein the composite material comprises silicon, the energy storage device has a stack-specific power density of about 0.5 kW/kg to about 20 kW/kg. In some embodiments wherein an electrode comprises a composite electrode comprising a composite material, wherein the composite material comprises silicon, the energy storage device has a stack-specific power density of at least about 0.5 kW/kg. In some embodiments wherein an electrode comprises a composite electrode comprising a composite material, wherein the composite material comprises silicon, the energy storage device has a stack-specific power density of at most about 20 kW/kg. In some embodiments wherein an electrode comprises a composite electrode comprising a composite material, wherein the composite material comprises silicon, the energy storage device has a stack-specific power density of about 0.5 kW/kg to about 1 kW/kg, about 0.5 kW/kg to about 2 kW/kg, about 0.5 kW/kg to about 5 kW/kg, about 0.5 kW/kg to about 10 kW/kg, about 0.5 kW/kg to about 15 kW/kg, about 0.5 kW/kg to about 20 kW/kg, about 1 kW/kg to about 2 kW/kg, about 1 kW/kg to about 5 kW/kg, about 1 kW/kg to about 10 kW/kg, about 1 kW/kg to about 15 kW/kg, about 1 kW/kg to about 20 kW/kg, about 2 kW/kg to about 5 kW/kg, about 2 kW/kg to about 10 kW/kg, about 2 kW/kg to about 15 kW/kg, about 2 kW/kg to about 20 kW/kg, about 5 kW/kg to about 10 kW/kg, about 5 kW/kg to about 15 kW/kg, about 5 kW/kg to about 20 kW/kg, about 10 kW/kg to about 15 kW/kg, about 10 kW/kg to about 20 kW/kg, or about 15 kW/kg to about 20 kW/kg.

In some embodiments wherein an electrode comprises a composite electrode comprising a composite material, wherein the composite material comprises silicon, the energy storage device has an electrode-specific gravimetric energy density of about 60 Wh/kg to about 500 Wh/kg. In some embodiments wherein an electrode comprises a composite electrode comprising a composite material, wherein the composite material comprises silicon, the energy storage device has an electrode-specific gravimetric energy density of at least about 60 Wh/kg. In some embodiments wherein an electrode comprises a composite electrode comprising a composite material, wherein the composite material comprises silicon, the energy storage device has an electrode-specific gravimetric energy density of at most about 500 Wh/kg. In some embodiments wherein an electrode comprises a composite electrode comprising a composite material, wherein the composite material comprises silicon, the energy storage device has an electrode-specific gravimetric energy density of about 60 Wh/kg to about 80 Wh/kg, about 60 Wh/kg to about 100 Wh/kg, about 60 Wh/kg to about 150 Wh/kg, about 60 Wh/kg to about 200 Wh/kg, about 60 Wh/kg to about 250 Wh/kg, about 60 Wh/kg to about 300 Wh/kg, about 60 Wh/kg to about 350 Wh/kg, about 60 Wh/kg to about 400 Wh/kg, about 60 Wh/kg to about 500 Wh/kg, about 80 Wh/kg to about 100 Wh/kg, about 80 Wh/kg to about 150 Wh/kg, about 80 Wh/kg to about 200 Wh/kg, about 80 Wh/kg to about 250 Wh/kg, about 80 Wh/kg to about 300 Wh/kg, about 80 Wh/kg to about 350 Wh/kg, about 80 Wh/kg to about 400 Wh/kg, about 80 Wh/kg to about 500 Wh/kg, about 100 Wh/kg to about 150 Wh/kg, about 100 Wh/kg to about 200 Wh/kg, about 100 Wh/kg to about 250 Wh/kg, about 100 Wh/kg to about 300 Wh/kg, about 100 Wh/kg to about 350 Wh/kg, about 100 Wh/kg to about 400 Wh/kg, about 100 Wh/kg to about 500 Wh/kg, about 150 Wh/kg to about 200 Wh/kg, about 150 Wh/kg to about 250 Wh/kg, about 150 Wh/kg to about 300 Wh/kg, about 150 Wh/kg to about 350 Wh/kg, about 150 Wh/kg to about 400 Wh/kg, about 150 Wh/kg to about 500 Wh/kg, about 200 Wh/kg to about 250 Wh/kg, about 200 Wh/kg to about 300 Wh/kg, about 200 Wh/kg to about 350 Wh/kg, about 200 Wh/kg to about 400 Wh/kg, about 200 Wh/kg to about 500 Wh/kg, about 250 Wh/kg to about 300 Wh/kg, about 250 Wh/kg to about 350 Wh/kg, about 250 Wh/kg to about 400 Wh/kg, about 250 Wh/kg to about 500 Wh/kg, about 300 Wh/kg to about 350 Wh/kg, about 300 Wh/kg to about 400 Wh/kg, about 300 Wh/kg to about 500 Wh/kg, about 350 Wh/kg to about 400 Wh/kg, about 350 Wh/kg to about 500 Wh/kg, or about 400 Wh/kg to about 500 Wh/kg.

In some embodiments wherein an electrode comprises a composite electrode comprising a composite material, wherein the composite material comprises silicon, the energy storage device has an electrode-specific gravimetric power density of about 1.5 kW/kg to about 20 kW/kg. In some embodiments wherein an electrode comprises a composite electrode comprising a composite material, wherein the composite material comprises silicon, the energy storage device has an electrode-specific gravimetric power density of at least about 1.5 kW/kg. In some embodiments wherein an electrode comprises a composite electrode comprising a composite material, wherein the composite material comprises silicon, the energy storage device has an electrode-specific gravimetric power density of at most about 20 kW/kg. In some embodiments wherein an electrode comprises a composite electrode comprising a composite material, wherein the composite material comprises silicon, the energy storage device has an electrode-specific gravimetric power density of about 1.5 kW/kg to about 2 kW/kg, about 1.5 kW/kg to about 3 kW/kg, about 1.5 kW/kg to about 5 kW/kg, about 1.5 kW/kg to about 10 kW/kg, about 1.5 kW/kg to about 15 kW/kg, about 1.5 kW/kg to about 20 kW/kg, about 2 kW/kg to about 3 kW/kg, about 2 kW/kg to about 5 kW/kg, about 2 kW/kg to about 10 kW/kg, about 2 kW/kg to about 15 kW/kg, about 2 kW/kg to about 20 kW/kg, about 3 kW/kg to about 5 kW/kg, about 3 kW/kg to about 10 kW/kg, about 3 kW/kg to about 15 kW/kg, about 3 kW/kg to about 20 kW/kg, about 5 kW/kg to about 10 kW/kg, about 5 kW/kg to about 15 kW/kg, about 5 kW/kg to about 20 kW/kg, about 10 kW/kg to about 15 kW/kg, about 10 kW/kg to about 20 kW/kg, or about 15 kW/kg to about 20 kW/kg.

In some embodiments wherein an electrode comprises a composite electrode comprising a composite material, wherein the composite material comprises silicon, the energy storage device has a total capacitance of about 50 F to about 1,000 F. In some embodiments wherein an electrode comprises a composite electrode comprising a composite material, wherein the composite material comprises silicon, the energy storage device has a total capacitance of at least about 50 F. In some embodiments wherein an electrode comprises a composite electrode comprising a composite material, wherein the composite material comprises silicon, the energy storage device has a total capacitance of at most about 1,000 F. In some embodiments wherein an electrode comprises a composite electrode comprising a composite material, wherein the composite material comprises silicon, the energy storage device has a total capacitance of about 50 F to about 100 F, about 50 F to about 200 F, about 50 F to about 300 F, about 50 F to about 400 F, about 50 F to about 500 F, about 50 F to about 750 F, about 50 F to about 1,000 F, about 100 F to about 200 F, about 100 F to about 300 F, about 100 F to about 400 F, about 100 F to about 500 F, about 100 F to about 750 F, about 100 F to about 1,000 F, about 200 F to about 300 F, about 200 F to about 400 F, about 200 F to about 500 F, about 200 F to about 750 F, about 200 F to about 1,000 F, about 300 F to about 400 F, about 300 F to about 500 F, about 300 F to about 750 F, about 300 F to about 1,000 F, about 400 F to about 500 F, about 400 F to about 750 F, about 400 F to about 1,000 F, about 500 F to about 750 F, about 500 F to about 1,000 F, or about 750 F to about 1,000 F.

In some embodiments, an electrode comprises a composite electrode comprising a composite material, wherein the composite material comprises sulfur.

In some embodiments wherein an electrode comprises a composite electrode comprising a composite material, and wherein the composite material comprises sulfur, the energy storage device has a stack-specific energy density of about 16 Wh/kg to about 750 Wh/kg. In some embodiments wherein an electrode comprises a composite electrode comprising a composite material, and wherein the composite material comprises sulfur, the energy storage device has a stack-specific energy density of at least about 16 Wh/kg. In some embodiments wherein an electrode comprises a composite electrode comprising a composite material, wherein the composite material comprises sulfur, the energy storage device has a stack-specific energy density of at most about 750 Wh/kg. In some embodiments wherein an electrode comprises a composite electrode comprising a composite material, and wherein the composite material comprises sulfur, the energy storage device has a stack-specific energy density of about 16 Wh/kg to about 25 Wh/kg, about 16 Wh/kg to about 50 Wh/kg, about 16 Wh/kg to about 100 Wh/kg, about 16 Wh/kg to about 200 Wh/kg, about 16 Wh/kg to about 300 Wh/kg, about 16 Wh/kg to about 400 Wh/kg, about 16 Wh/kg to about 500 Wh/kg, about 16 Wh/kg to about 600 Wh/kg, about 16 Wh/kg to about 750 Wh/kg, about 25 Wh/kg to about 50 Wh/kg, about 25 Wh/kg to about 100 Wh/kg, about 25 Wh/kg to about 200 Wh/kg, about 25 Wh/kg to about 300 Wh/kg, about 25 Wh/kg to about 400 Wh/kg, about 25 Wh/kg to about 500 Wh/kg, about 25 Wh/kg to about 600 Wh/kg, about 25 Wh/kg to about 750 Wh/kg, about 50 Wh/kg to about 100 Wh/kg, about 50 Wh/kg to about 200 Wh/kg, about 50 Wh/kg to about 300 Wh/kg, about 50 Wh/kg to about 400 Wh/kg, about 50 Wh/kg to about 500 Wh/kg, about 50 Wh/kg to about 600 Wh/kg, about 50 Wh/kg to about 750 Wh/kg, about 100 Wh/kg to about 200 Wh/kg, about 100 Wh/kg to about 300 Wh/kg, about 100 Wh/kg to about 400 Wh/kg, about 100 Wh/kg to about 500 Wh/kg, about 100 Wh/kg to about 600 Wh/kg, about 100 Wh/kg to about 750 Wh/kg, about 200 Wh/kg to about 300 Wh/kg, about 200 Wh/kg to about 400 Wh/kg, about 200 Wh/kg to about 500 Wh/kg, about 200 Wh/kg to about 600 Wh/kg, about 200 Wh/kg to about 750 Wh/kg, about 300 Wh/kg to about 400 Wh/kg, about 300 Wh/kg to about 500 Wh/kg, about 300 Wh/kg to about 600 Wh/kg, about 300 Wh/kg to about 750 Wh/kg, about 400 Wh/kg to about 500 Wh/kg, about 400 Wh/kg to about 600 Wh/kg, about 400 Wh/kg to about 750 Wh/kg, about 500 Wh/kg to about 600 Wh/kg, about 500 Wh/kg to about 750 Wh/kg, or about 600 Wh/kg to about 750 Wh/kg.

In some embodiments wherein an electrode comprises a composite electrode comprising a composite material, wherein the composite material comprises sulfur, the energy storage device has a stack-specific power density of about 0.5 kW/kg to about 8 kW/kg. In some embodiments wherein an electrode comprises a composite electrode comprising a composite material, wherein the composite material comprises sulfur, the energy storage device has a stack-specific power density of at least about 0.5 kW/kg. In some embodiments wherein an electrode comprises a composite electrode comprising a composite material, wherein the composite material comprises sulfur, the energy storage device has a stack-specific power density of at most about 8 kW/kg. In some embodiments wherein an electrode comprises a composite electrode comprising a composite material, wherein the composite material comprises sulfur, the energy storage device has a stack-specific power density of about 0.5 kW/kg to about 1 kW/kg, about 0.5 kW/kg to about 2 kW/kg, about 0.5 kW/kg to about 3 kW/kg, about 0.5 kW/kg to about 4 kW/kg, about 0.5 kW/kg to about 5 kW/kg, about 0.5 kW/kg to about 6 kW/kg, about 0.5 kW/kg to about 7 kW/kg, about 0.5 kW/kg to about 8 kW/kg, about 1 kW/kg to about 2 kW/kg, about 1 kW/kg to about 3 kW/kg, about 1 kW/kg to about 4 kW/kg, about 1 kW/kg to about 5 kW/kg, about 1 kW/kg to about 6 kW/kg, about 1 kW/kg to about 7 kW/kg, about 1 kW/kg to about 8 kW/kg, about 2 kW/kg to about 3 kW/kg, about 2 kW/kg to about 4 kW/kg, about 2 kW/kg to about 5 kW/kg, about 2 kW/kg to about 6 kW/kg, about 2 kW/kg to about 7 kW/kg, about 2 kW/kg to about 8 kW/kg, about 3 kW/kg to about 4 kW/kg, about 3 kW/kg to about 5 kW/kg, about 3 kW/kg to about 6 kW/kg, about 3 kW/kg to about 7 kW/kg, about 3 kW/kg to about 8 kW/kg, about 4 kW/kg to about 5 kW/kg, about 4 kW/kg to about 6 kW/kg, about 4 kW/kg to about 7 kW/kg, about 4 kW/kg to about 8 kW/kg, about 5 kW/kg to about 6 kW/kg, about 5 kW/kg to about 7 kW/kg, about 5 kW/kg to about 8 kW/kg, about 6 kW/kg to about 7 kW/kg, about 6 kW/kg to about 8 kW/kg, or about 7 kW/kg to about 8 kW/kg.

In some embodiments wherein an electrode comprises a composite electrode comprising a composite material, wherein the composite material comprises sulfur, the energy storage device has an electrode-specific gravimetric energy density of about 250 Wh/kg to about 750 Wh/kg. In some embodiments wherein an electrode comprises a composite electrode comprising a composite material, wherein the composite material comprises sulfur, the energy storage device has an electrode-specific gravimetric energy density of at least about 250 Wh/kg. In some embodiments wherein an electrode comprises a composite electrode comprising a composite material, wherein the composite material comprises sulfur, the energy storage device has an electrode-specific gravimetric energy density of at most about 750 Wh/kg. In some embodiments wherein an electrode comprises a composite electrode comprising a composite material, wherein the composite material comprises sulfur, the energy storage device has an electrode-specific gravimetric energy density of about 250 Wh/kg to about 300 Wh/kg, about 250 Wh/kg to about 400 Wh/kg, about 250 Wh/kg to about 500 Wh/kg, about 250 Wh/kg to about 600 Wh/kg, about 250 Wh/kg to about 750 Wh/kg, about 300 Wh/kg to about 400 Wh/kg, about 300 Wh/kg to about 500 Wh/kg, about 300 Wh/kg to about 600 Wh/kg, about 300 Wh/kg to about 750 Wh/kg, about 400 Wh/kg to about 500 Wh/kg, about 400 Wh/kg to about 600 Wh/kg, about 400 Wh/kg to about 750 Wh/kg, about 500 Wh/kg to about 600 Wh/kg, about 500 Wh/kg to about 750 Wh/kg, or about 600 Wh/kg to about 750 Wh/kg.

In some embodiments wherein an electrode comprises a composite electrode comprising a composite material, wherein the composite material comprises sulfur, the energy storage device has an electrode-specific gravimetric power density of about 0.5 kW/kg to about 18 kW/kg. In some embodiments wherein an electrode comprises a composite electrode comprising a composite material, wherein the composite material comprises sulfur, the energy storage device has an electrode-specific gravimetric power density of at least about 0.5 kW/kg. In some embodiments wherein an electrode comprises a composite electrode comprising a composite material, wherein the composite material comprises sulfur, the energy storage device has an electrode-specific gravimetric power density of at most about 18 kW/kg. In some embodiments wherein an electrode comprises a composite electrode comprising a composite material, wherein the composite material comprises sulfur, the energy storage device has an electrode-specific gravimetric power density of about 0.5 kW/kg to about 1 kW/kg, about 0.5 kW/kg to about 2 kW/kg, about 0.5 kW/kg to about 4 kW/kg, about 0.5 kW/kg to about 6 kW/kg, about 0.5 kW/kg to about 8 kW/kg, about 0.5 kW/kg to about 12 kW/kg, about 0.5 kW/kg to about 14 kW/kg, about 0.5 kW/kg to about 16 kW/kg, about 0.5 kW/kg to about 18 kW/kg, about 1 kW/kg to about 2 kW/kg, about 1 kW/kg to about 4 kW/kg, about 1 kW/kg to about 6 kW/kg, about 1 kW/kg to about 8 kW/kg, about 1 kW/kg to about 12 kW/kg, about 1 kW/kg to about 14 kW/kg, about 1 kW/kg to about 16 kW/kg, about 1 kW/kg to about 18 kW/kg, about 2 kW/kg to about 4 kW/kg, about 2 kW/kg to about 6 kW/kg, about 2 kW/kg to about 8 kW/kg, about 2 kW/kg to about 12 kW/kg, about 2 kW/kg to about 14 kW/kg, about 2 kW/kg to about 16 kW/kg, about 2 kW/kg to about 18 kW/kg, about 4 kW/kg to about 6 kW/kg, about 4 kW/kg to about 8 kW/kg, about 4 kW/kg to about 12 kW/kg, about 4 kW/kg to about 14 kW/kg, about 4 kW/kg to about 16 kW/kg, about 4 kW/kg to about 18 kW/kg, about 6 kW/kg to about 8 kW/kg, about 6 kW/kg to about 12 kW/kg, about 6 kW/kg to about 14 kW/kg, about 6 kW/kg to about 16 kW/kg, about 6 kW/kg to about 18 kW/kg, about 8 kW/kg to about 12 kW/kg, about 8 kW/kg to about 14 kW/kg, about 8 kW/kg to about 16 kW/kg, about 8 kW/kg to about 18 kW/kg, about 12 kW/kg to about 14 kW/kg, about 12 kW/kg to about 16 kW/kg, about 12 kW/kg to about 18 kW/kg, about 14 kW/kg to about 16 kW/kg, about 14 kW/kg to about 18 kW/kg, or about 16 kW/kg to about 18 kW/kg.

In some embodiments wherein an electrode comprises a composite electrode comprising a composite material, wherein the composite material comprises sulfur, the energy storage device has a total capacitance of about 50 F to about 1,000 F. In some embodiments wherein an electrode comprises a composite electrode comprising a composite material, wherein the composite material comprises sulfur, the energy storage device has a total capacitance of at least about 50 F. In some embodiments wherein an electrode comprises a composite electrode comprising a composite material, wherein the composite material comprises sulfur, the energy storage device has a total capacitance of at most about 1,000 F. In some embodiments wherein an electrode comprises a composite electrode comprising a composite material, wherein the composite material comprises sulfur, the energy storage device has a total capacitance of about 50 F to about 100 F, about 50 F to about 200 F, about 50 F to about 300 F, about 50 F to about 400 F, about 50 F to about 500 F, about 50 F to about 750 F, about 50 F to about 1,000 F, about 100 F to about 200 F, about 100 F to about 300 F, about 100 F to about 400 F, about 100 F to about 500 F, about 100 F to about 750 F, about 100 F to about 1,000 F, about 200 F to about 300 F, about 200 F to about 400 F, about 200 F to about 500 F, about 200 F to about 750 F, about 200 F to about 1,000 F, about 300 F to about 400 F, about 300 F to about 500 F, about 300 F to about 750 F, about 300 F to about 1,000 F, about 400 F to about 500 F, about 400 F to about 750 F, about 400 F to about 1,000 F, about 500 F to about 750 F, about 500 F to about 1,000 F, or about 750 F to about 1,000 F.

In some embodiments, an electrode comprises a composite electrode comprising a composite material, wherein the composite material comprises sulfur transition metal oxide.

In some embodiments a transition metal oxide comprises hafnium(IV) oxide, osmium dioxide, palladium(II) oxide, rhenium(IV) oxide, strontium ruthenate, strontium Titanate, tungsten pentoxide, tungsten trioxide, yttrium barium copper oxide, niobium pentoxide or any combination thereof.

In some embodiments wherein an electrode comprises a composite electrode comprising a composite material, and wherein the composite material comprises a transition metal oxide, the energy storage device has a stack-specific energy density of about 8 Wh/kg to about 90 Wh/kg. In some embodiments wherein an electrode comprises a composite electrode comprising a composite material, and wherein the composite material comprises a transition metal oxide, the energy storage device has a stack-specific energy density of at least about 8 Wh/kg. In some embodiments wherein an electrode comprises a composite electrode comprising a composite material, and wherein the composite material comprises a transition metal oxide, the energy storage device has a stack-specific energy density of at most about 90 Wh/kg. In some embodiments wherein an electrode comprises a composite electrode comprising a composite material, and wherein the composite material comprises a transition metal oxide, the energy storage device has a stack-specific energy density of about 8 Wh/kg to about 10 Wh/kg, about 8 Wh/kg to about 20 Wh/kg, about 8 Wh/kg to about 30 Wh/kg, about 8 Wh/kg to about 40 Wh/kg, about 8 Wh/kg to about 50 Wh/kg, about 8 Wh/kg to about 60 Wh/kg, about 8 Wh/kg to about 70 Wh/kg, about 8 Wh/kg to about 80 Wh/kg, about 8 Wh/kg to about 90 Wh/kg, about 10 Wh/kg to about 20 Wh/kg, about 10 Wh/kg to about 30 Wh/kg, about 10 Wh/kg to about 40 Wh/kg, about 10 Wh/kg to about 50 Wh/kg, about 10 Wh/kg to about 60 Wh/kg, about 10 Wh/kg to about 70 Wh/kg, about 10 Wh/kg to about 80 Wh/kg, about 10 Wh/kg to about 90 Wh/kg, about 20 Wh/kg to about 30 Wh/kg, about 20 Wh/kg to about 40 Wh/kg, about 20 Wh/kg to about 50 Wh/kg, about 20 Wh/kg to about 60 Wh/kg, about 20 Wh/kg to about 70 Wh/kg, about 20 Wh/kg to about 80 Wh/kg, about 20 Wh/kg to about 90 Wh/kg, about 30 Wh/kg to about 40 Wh/kg, about 30 Wh/kg to about 50 Wh/kg, about 30 Wh/kg to about 60 Wh/kg, about 30 Wh/kg to about 70 Wh/kg, about 30 Wh/kg to about 80 Wh/kg, about 30 Wh/kg to about 90 Wh/kg, about 40 Wh/kg to about 50 Wh/kg, about 40 Wh/kg to about 60 Wh/kg, about 40 Wh/kg to about 70 Wh/kg, about 40 Wh/kg to about 80 Wh/kg, about 40 Wh/kg to about 90 Wh/kg, about 50 Wh/kg to about 60 Wh/kg, about 50 Wh/kg to about 70 Wh/kg, about 50 Wh/kg to about 80 Wh/kg, about 50 Wh/kg to about 90 Wh/kg, about 60 Wh/kg to about 70 Wh/kg, about 60 Wh/kg to about 80 Wh/kg, about 60 Wh/kg to about 90 Wh/kg, about 70 Wh/kg to about 80 Wh/kg, about 70 Wh/kg to about 90 Wh/kg, or about 80 Wh/kg to about 90 Wh/kg.

In some embodiments wherein an electrode comprises a composite electrode comprising a composite material, wherein the composite material comprises a transition metal oxide, the energy storage device has an electrode-specific gravimetric power density of about 0.5 kW/kg to about 20 kW/kg. In some embodiments wherein an electrode comprises a composite electrode comprising a composite material, wherein the composite material comprises a transition metal oxide, the energy storage device has an electrode-specific gravimetric power density of at least about 0.5 kW/kg. In some embodiments wherein an electrode comprises a composite electrode comprising a composite material, wherein the composite material comprises a transition metal oxide, the energy storage device has an electrode-specific gravimetric power density of at most about 20 kW/kg. In some embodiments wherein an electrode comprises a composite electrode comprising a composite material, wherein the composite material comprises a transition metal oxide, the energy storage device has an electrode-specific gravimetric power density of about 0.5 kW/kg to about 1 kW/kg, about 0.5 kW/kg to about 5 kW/kg, about 0.5 kW/kg to about 10 kW/kg, about 0.5 kW/kg to about 15 kW/kg, about 0.5 kW/kg to about 20 kW/kg, about 1 kW/kg to about 5 kW/kg, about 1 kW/kg to about 10 kW/kg, about 1 kW/kg to about 15 kW/kg, about 1 kW/kg to about 20 kW/kg, about 5 kW/kg to about 10 kW/kg, about 5 kW/kg to about 15 kW/kg, about 5 kW/kg to about 20 kW/kg, about 10 kW/kg to about 15 kW/kg, about 10 kW/kg to about 20 kW/kg, or about 15 kW/kg to about 20 kW/kg.

In some embodiments wherein an electrode comprises a composite electrode comprising a composite material, wherein the composite material comprises a transition metal oxide, the energy storage device has a stack-specific energy density of about 20 Wh/kg to about 280 Wh/kg. In some embodiments wherein an electrode comprises a composite electrode comprising a composite material, wherein the composite material comprises a transition metal oxide, the energy storage device has a stack-specific energy density of at least about 20 Wh/kg. In some embodiments wherein an electrode comprises a composite electrode comprising a composite material, wherein the composite material comprises a transition metal oxide, the energy storage device has a stack-specific energy density of at most about 280 Wh/kg. In some embodiments wherein an electrode comprises a composite electrode comprising a composite material, wherein the composite material comprises a transition metal oxide, the energy storage device has an stack-specific energy density of about 20 Wh/kg to about 40 Wh/kg, about 20 Wh/kg to about 60 Wh/kg, about 20 Wh/kg to about 80 Wh/kg, about 20 Wh/kg to about 100 Wh/kg, about 20 Wh/kg to about 140 Wh/kg, about 20 Wh/kg to about 180 Wh/kg, about 20 Wh/kg to about 220 Wh/kg, about 20 Wh/kg to about 280 Wh/kg, about 40 Wh/kg to about 60 Wh/kg, about 40 Wh/kg to about 80 Wh/kg, about 40 Wh/kg to about 100 Wh/kg, about 40 Wh/kg to about 140 Wh/kg, about 40 Wh/kg to about 180 Wh/kg, about 40 Wh/kg to about 220 Wh/kg, about 40 Wh/kg to about 280 Wh/kg, about 60 Wh/kg to about 80 Wh/kg, about 60 Wh/kg to about 100 Wh/kg, about 60 Wh/kg to about 140 Wh/kg, about 60 Wh/kg to about 180 Wh/kg, about 60 Wh/kg to about 220 Wh/kg, about 60 Wh/kg to about 280 Wh/kg, about 80

Wh/kg to about 100 Wh/kg, about 80 Wh/kg to about 140 Wh/kg, about 80 Wh/kg to about 180 Wh/kg, about 80 Wh/kg to about 220 Wh/kg, about 80 Wh/kg to about 280 Wh/kg, about 100 Wh/kg to about 140 Wh/kg, about 100 Wh/kg to about 180 Wh/kg, about 100 Wh/kg to about 220 Wh/kg, about 100 Wh/kg to about 280 Wh/kg, about 140 Wh/kg to about 180 Wh/kg, about 140 Wh/kg to about 220 Wh/kg, about 140 Wh/kg to about 280 Wh/kg, about 180 Wh/kg to about 220 Wh/kg, about 180 Wh/kg to about 280 Wh/kg, or about 220 Wh/kg to about 280 Wh/kg.

In some embodiments wherein an electrode comprises a composite electrode comprising a composite material, wherein the composite material comprises a transition metal oxide, the energy storage device has an electrode-specific gravimetric power density of about 1.5 kW/kg to about 40 kW/kg. In some embodiments wherein an electrode comprises a composite electrode comprising a composite material, wherein the composite material comprises a transition metal oxide, the energy storage device has an electrode-specific gravimetric power density of at least about 1.5 kW/kg. In some embodiments wherein an electrode comprises a composite electrode comprising a composite material, wherein the composite material comprises a transition metal oxide, the energy storage device has an electrode-specific gravimetric power density of at most about 40 kW/kg. In some embodiments wherein an electrode comprises a composite electrode comprising a composite material, wherein the composite material comprises a transition metal oxide, the energy storage device has an electrode-specific gravimetric power density of about 1.5 kW/kg to about 3 kW/kg, about 1.5 kW/kg to about 5 kW/kg, about 1.5 kW/kg to about 10 kW/kg, about 1.5 kW/kg to about 20 kW/kg, about 1.5 kW/kg to about 30 kW/kg, about 1.5 kW/kg to about 40 kW/kg, about 3 kW/kg to about 5 kW/kg, about 3 kW/kg to about 10 kW/kg, about 3 kW/kg to about 20 kW/kg, about 3 kW/kg to about 30 kW/kg, about 3 kW/kg to about 40 kW/kg, about 5 kW/kg to about 10 kW/kg, about 5 kW/kg to about 20 kW/kg, about 5 kW/kg to about 30 kW/kg, about 5 kW/kg to about 40 kW/kg, about 10 kW/kg to about 20 kW/kg, about 10 kW/kg to about 30 kW/kg, about 10 kW/kg to about 40 kW/kg, about 20 kW/kg to about 30 kW/kg, about 20 kW/kg to about 40 kW/kg, or about 30 kW/kg to about 40 kW/kg.

In some embodiments wherein an electrode comprises a composite electrode comprising a composite material, wherein the composite material comprises a transition metal oxide, the energy storage device has a total capacitance of about 50 F to about 1,000 F. In some embodiments wherein an electrode comprises a composite electrode comprising a composite material, wherein the composite material comprises a transition metal oxide, the energy storage device has a total capacitance of at least about 50 F. In some embodiments wherein an electrode comprises a composite electrode comprising a composite material, wherein the composite material comprises a transition metal oxide, the energy storage device has a total capacitance of at most about 1,000 F. In some embodiments wherein an electrode comprises a composite electrode comprising a composite material, wherein the composite material comprises a transition metal oxide, the energy storage device has a total capacitance of about 50 F to about 100 F, about 50 F to about 200 F, about 50 F to about 300 F, about 50 F to about 400 F, about 50 F to about 500 F, about 50 F to about 750 F, about 50 F to about 1,000 F, about 100 F to about 200 F, about 100 F to about 300 F, about 100 F to about 400 F, about 100 F to about 500 F, about 100 F to about 750 F, about 100 F to about 1,000 F, about 200 F to about 300 F, about 200 F to about 400 F, about 200 F to about 500 F, about 200 F to about 750 F, about 200 F to about 1,000 F, about 300 F to about 400 F, about 300 F to about 500 F, about 300 F to about 750 F, about 300 F to about 1,000 F, about 400 F to about 500 F, about 400 F to about 750 F, about 400 F to about 1,000 F, about 500 F to about 750 F, about 500 F to about 1,000 F, or about 750 F to about 1,000 F.

In some embodiments, the first electrode and the second electrode comprise composite electrodes, wherein the composite material of the first electrode comprises silicon, and wherein the composite material of the second electrode comprises sulfur.

In some embodiments wherein the first electrode and the second electrode comprise composite electrodes, wherein the composite material of the first electrode comprises silicon, and wherein the composite material of the second electrode comprises sulfur, the energy storage device has a stack-specific energy density of about 75 Wh/kg to about 900 Wh/kg. In some embodiments wherein the first electrode and the second electrode comprise composite electrodes, wherein the composite material of the first electrode comprises silicon, and wherein the composite material of the second electrode comprises sulfur, the energy storage device has a stack-specific energy density of at least about 75 Wh/kg. In some embodiments wherein the first electrode and the second electrode comprise composite electrodes, wherein the composite material of the first electrode comprises silicon, and wherein the composite material of the second electrode comprises sulfur, the energy storage device has a stack-specific energy density of at most about 900 Wh/kg. In some embodiments wherein the first electrode and the second electrode comprise composite electrodes, wherein the composite material of the first electrode comprises silicon, and wherein the composite material of the second electrode comprises sulfur, the energy storage device has a stack-specific energy density of about 75 Wh/kg to about 100 Wh/kg, about 75 Wh/kg to about 200 Wh/kg, about 75 Wh/kg to about 300 Wh/kg, about 75 Wh/kg to about 400 Wh/kg, about 75 Wh/kg to about 500 Wh/kg, about 75 Wh/kg to about 600 Wh/kg, about 75 Wh/kg to about 700 Wh/kg, about 75 Wh/kg to about 800 Wh/kg, about 75 Wh/kg to about 900 Wh/kg, about 100 Wh/kg to about 200 Wh/kg, about 100 Wh/kg to about 300 Wh/kg, about 100 Wh/kg to about 400 Wh/kg, about 100 Wh/kg to about 500 Wh/kg, about 100 Wh/kg to about 600 Wh/kg, about 100 Wh/kg to about 700 Wh/kg, about 100 Wh/kg to about 800 Wh/kg, about 100 Wh/kg to about 900 Wh/kg, about 200 Wh/kg to about 300 Wh/kg, about 200 Wh/kg to about 400 Wh/kg, about 200 Wh/kg to about 500 Wh/kg, about 200 Wh/kg to about 600 Wh/kg, about 200 Wh/kg to about 700 Wh/kg, about 200 Wh/kg to about 800 Wh/kg, about 200 Wh/kg to about 900 Wh/kg, about 300 Wh/kg to about 400 Wh/kg, about 300 Wh/kg to about 500 Wh/kg, about 300 Wh/kg to about 600 Wh/kg, about 300 Wh/kg to about 700 Wh/kg, about 300 Wh/kg to about 800 Wh/kg, about 300 Wh/kg to about 900 Wh/kg, about 400 Wh/kg to about 500 Wh/kg, about 400 Wh/kg to about 600 Wh/kg, about 400 Wh/kg to about 700 Wh/kg, about 400 Wh/kg to about 800 Wh/kg, about 400 Wh/kg to about 900 Wh/kg, about 500 Wh/kg to about 600 Wh/kg, about 500 Wh/kg to about 700 Wh/kg, about 500 Wh/kg to about 800 Wh/kg, about 500 Wh/kg to about 900 Wh/kg, about 600 Wh/kg to about 700 Wh/kg, about 600 Wh/kg to about 800 Wh/kg, about 600 Wh/kg to about 900 Wh/kg, about 700 Wh/kg to about 800 Wh/kg, about 700 Wh/kg to about 900 Wh/kg, or about 800 Wh/kg to about 900 Wh/kg.

A third embodiment presented herein is a method of composing an electrode comprising: forming a solution of graphene oxide and a first solvent; heating the solution to form a holey graphene oxide; centrifuging the holey graphene oxide in the solution; washing the holey graphene oxide in a second solvent; forming a dispersion of the holey graphene oxide in a third solvent; and adding an acid to the dispersion to form a holey graphene oxide framework;

In some embodiments, the method is capable of forming an electrode in a roll-to-roll process. In some embodiments, the method is capable of continuously forming an electrode in a roll-to-roll process.

In some embodiments, the concentration of graphene oxide in the solution is about 1.2 g/L to about 5 g/L. In some embodiments, the concentration of graphene oxide in the solution is at least about 1.2 g/L. In some embodiments, the concentration of graphene oxide in the solution is at most about 5 g/L. In some embodiments, the concentration of graphene oxide in the solution about 1.2 g/L to about 1.5 g/L, about 1.2 g/L to about 1.75 g/L, about 1.2 g/L to about 2 g/L, about 1.2 g/L to about 2.5 g/L, about 1.2 g/L to about 3 g/L, about 1.2 g/L to about 3.5 g/L, about 1.2 g/L to about 4 g/L, about 1.2 g/L to about 5 g/L, about 1.5 g/L to about 1.75 g/L, about 1.5 g/L to about 2 g/L, about 1.5 g/L to about 2.5 g/L, about 1.5 g/L to about 3 g/L, about 1.5 g/L to about 3.5 g/L, about 1.5 g/L to about 4 g/L, about 1.5 g/L to about 5 g/L, about 1.75 g/L to about 2 g/L, about 1.75 g/L to about 2.5 g/L, about 1.75 g/L to about 3 g/L, about 1.75 g/L to about 3.5 g/L, about 1.75 g/L to about 4 g/L, about 1.75 g/L to about 5 g/L, about 2 g/L to about 2.5 g/L, about 2 g/L to about 3 g/L, about 2 g/L to about 3.5 g/L, about 2 g/L to about 4 g/L, about 2 g/L to about 5 g/L, about 2.5 g/L to about 3 g/L, about 2.5 g/L to about 3.5 g/L, about 2.5 g/L to about 4 g/L, about 2.5 g/L to about 5 g/L, about 3 g/L to about 3.5 g/L, about 3 g/L to about 4 g/L, about 3 g/L to about 5 g/L, about 3.5 g/L to about 4 g/L, about 3.5 g/L to about 5 g/L, or about 4 g/L to about 5 g/L.

In some embodiments, the first solvent comprises an oxidizing agent comprising oxygen, ozone, hydrogen peroxide, fluorite dioxide, lithium peroxide, barium peroxide, fluorine, chlorine, nitric acid, nitrate compounds, sulfuric acid, peroxydisulfuric acid, peroxymonosulfuric acid, chlorite, chlorate, perchlorate, halogen compounds hypochlorite, hypohalite compounds, household bleach, hexavalent chromium compounds, chromic acids, dichromic acids, chromium trioxide, pyridinium chlorochromate, chromate compounds, dichromate compounds, permanganate compounds, potassium permanganate, sodium perborate, nitrous oxide, potassium nitrate, sodium bismuthate or any combination thereof.

In some embodiments, the solution is heated to a temperature of about 50° C. to about 200° C. In some embodiments, the solution is heated to a temperature of at least about 50° C. In some embodiments, the solution is heated to a temperature of at most about 200° C. In some embodiments, the solution is heated to a temperature of about 50° C. to about 75° C., about 50° C. to about 100° C., about 50° C. to about 125° C., about 50° C. to about 150° C., about 50° C. to about 175° C., about 50° C. to about 200° C., about 75° C. to about 100° C., about 75° C. to about 125° C., about 75° C. to about 150° C., about 75° C. to about 175° C., about 75° C. to about 200° C., about 100° C. to about 125° C., about 100° C. to about 150° C., about 100° C. to about 175° C., about 100° C. to about 200° C., about 125° C. to about 150° C., about 125° C. to about 175° C., about 125° C. to about 200° C., about 150° C. to about 175° C., about 150° C. to about 200° C., or about 175° C. to about 200° C.

In some embodiments, the period of time that the solution is heated is about 12 hours to about 48 hours. In some embodiments, the period of time that the solution is heated is at least about 12 hours. In some embodiments, the period of time that the solution is heated is at most about 48 hours. In some embodiments, the period of time that the solution is heated is about 12 hours to about 18 hours, about 12 hours to about 24 hours, about 12 hours to about 30 hours, about 12 hours to about 36 hours, about 12 hours to about 42 hours, about 12 hours to about 48 hours, about 18 hours to about 24 hours, about 18 hours to about 30 hours, about 18 hours to about 36 hours, about 18 hours to about 42 hours, about 18 hours to about 48 hours, about 24 hours to about 30 hours, about 24 hours to about 36 hours, about 24 hours to about 42 hours, about 24 hours to about 48 hours, about 30 hours to about 36 hours, about 30 hours to about 42 hours, about 30 hours to about 48 hours, about 36 hours to about 42 hours, about 36 hours to about 48 hours, or about 42 hours to about 48 hours.

In some embodiments, at least one of the second solvent and the third solvent comprises formic acid, n-Butanol, isopropanol, n-propanol, ethanol, methanol, acetic acid, water or any combination thereof.

In some embodiments, the acid comprises a weak acid. In some embodiments, a weak acid comprises formic acetic, acetic acid, trichloroacetic acid, hydrofluoric acid, hydrocyanic, hydrogen sulfide or any combination thereof.

Some embodiments further comprise pressing the holey graphene oxide framework onto a metallic foam comprising steel, stainless nickel, aluminum, copper, bismuth, chromium, cobalt, gallium, gold, iron, indium, lead, magnesium, mercury, silver, sodium, tin, titanium, zinc, zirconium, bronze or any combination thereof.

Some embodiments further comprise depositing the holey graphene oxide framework onto a current collector comprising: a metal film comprising silver, copper, gold, aluminum, calcium, tungsten, zinc, tungsten, brass, bronze, nickel, lithium, iron, platinum, tin, carbon steel, lead, titanium, stainless steel, mercury, chromium, gallium arsenide, or any combination thereof; or a polymeric film comprising polyfluorene, polyphenylene, polypyrene, polyazulene, polynaphthalene, polyacetylene, poly p-phenylene vinylene, polypyrrole, polycarbazole, polyindole, polyazepinem, polyaniline, polythiophene, poly 3,4-ethylenedioxythiophene, poly p-phenylene sulfide, polyacetylene, poly p-phenylene vinylene, or any combination thereof.

In some embodiments, the first solvent comprises an oxidizing agent, wherein the oxidizing agent comprises oxygen, ozone, hydrogen peroxide, fluorite dioxide, lithium peroxide, barium peroxide, fluorine, chlorine, nitric acid, nitrate compounds, sulfuric acid, peroxydisulfuric acid, peroxymonosulfuric acid, chlorite, chlorate, perchlorate, halogen compounds hypochlorite, hypohalite compounds, household bleach, hexavalent chromium compounds, chromic acids, dichromic acids, chromium trioxide, pyridinium chlorochromate, chromate compounds, dichromate compounds, permanganate compounds, potassium permanganate, sodium perborate, nitrous oxide, potassium nitrate, sodium bismuthate or any combination thereof.

In some embodiments, the second solvent comprises formic acid, n-Butanol, isopropanol, n-propanol, ethanol, methanol, acetic acid, water or any combination thereof.

In some embodiments, the third solvent comprises formic acid, n-Butanol, isopropanol, n-propanol, ethanol, methanol, acetic acid, water or any combination thereof.

In some embodiments, the acid comprises a weak acid. In some embodiments, a weak acid comprises formic acetic, acetic acid, trichloroacetic acid, hydrofluoric acid, hydrocyanic, hydrogen sulfide or any combination thereof.

Some embodiments further comprise placing the dispersion in a container.

Some embodiments further comprise pressing the holey graphene oxide framework onto a foam, wherein the foam is a metallic foam comprising steel, stainless nickel, aluminum, copper, bismuth, chromium, cobalt, gallium, gold, iron, indium, lead, magnesium, mercury, silver, sodium, tin, titanium, zinc, zirconium, bronze or any combination thereof.

Some embodiments further comprise depositing the holey graphene oxide framework onto a current collector.

In some embodiments, the current collector comprises a metal film or a polymeric film or any combination thereof, wherein the metallic film comprises metal film comprises silver, copper, gold, aluminum, calcium, tungsten, zinc, tungsten, brass, bronze, nickel, lithium, iron, platinum, tin, carbon steel, lead, titanium, stainless steel, mercury, chromium, gallium arsenide or any combination thereof, In some embodiments, the current collector comprises a polymeric film, wherein the polymeric film comprises polyfluorene, polyphenylene, polypyrene, polyazulene, polynaphthalene, polyacetylene, poly p-phenylene vinylene, polypyrrole, polycarbazole, polyindole, polyazepinem, polyaniline, polythiophene, poly 3,4-ethylenedioxythiophene, poly p-phenylene sulfide, polyacetylene, poly p-phenylene vinylene or any combination thereof.

A fourth aspect provided herein is a method of composing an electrode with a three-dimensional graphene framework with an ultra-high sulfur content, the method comprising: synthesizing graphene oxide comprising: forming a graphene oxide suspension and drying the suspension; and synthesizing a composite sulfur-graphene oxide the graphene oxide comprising: adding a sulfur precursor to the graphene oxide suspension and a first solvent; adding an first acid to form a first solution, stirring the first solution, adding a second acid to the first solution to form a second solution, heating the second solution, washing the second solution in a second solvent, and freeze drying the second solution.

In some embodiments, the sulfur precursor comprises sodium thiosulfate, alkaline sodium thiosulfate, ammonium thiosulfate, barium thiosulfate, calcium thiosulfate, gold(I) sodium thiosulfate dehydrate, potassium thiosulfate, a sulfate, or any combination thereof.

In some embodiments, a sulfate comprises ammonium aluminum sulfate hydroxide, ammonium iron sulfate hydroxide, barium aluminum sulfate oxide hydroxide, barium chromate sulfate, barium sulfate, beudantite lead iron arsenate sulfate hydroxide, calcium aluminum arsenate sulfate hydroxide, calcium aluminum sulfate oxide hydroxide, calcium sulfate, copper iron aluminum sulfate hydroxide, copper lead carbonate sulfate hydroxide, copper sulfate hydroxide, hydrated aluminum sulfate hydroxide, hydrated calcium aluminum silicon hydroborate sulfate hydroxide, hydrated calcium aluminum sulfate fluoride hydroxide, hydrated calcium aluminum sulfate hydroxide, hydrated calcium carbonate sulfate, hydrated calcium copper sulfate hydroxide, hydrated calcium copper zinc sulfate hydroxide, hydrated calcium iron aluminum manganese sulfate tetrahydroxoborate hydroxide, hydrated calcium magnesium carbonate sulfate chloride hydroxide, hydrated calcium manganese carbonate sulfate hydroxide, hydrated calcium manganese sulfate hydroxide, hydrated calcium silicon carbonate sulfate hydroxide, hydrated calcium sulfate, hydrated cobalt magnesium nickel aluminum sulfate, hydrated cobalt manganese nickel sulfate, hydrated cobalt sulfate, hydrated copper aluminum sulfate hydroxide chloride, hydrated copper aluminum sulfate hydroxide, hydrated copper aluminum sulfate hydroxide, hydrated copper carbonate sulfate hydroxide, hydrated copper iron zinc sulfate, hydrated copper sulfate hydroxide chloride, hydrated copper sulfate hydroxide, hydrated copper sulfate, hydrated copper sulfate, hydrated copper uranyl sulfate hydroxide, hydrated copper zinc sulfate hydroxide, hydrated hydrogen calcium aluminum arsenate sulfate hydroxide, hydrated iron aluminum sulfate, hydrated iron magnesium nickel chromium aluminum sulfate, hydrated iron magnesium sulfate hydroxide, hydrated iron sulfate hydroxide, hydrated iron sulfate hydroxide, hydrated iron sulfate, hydrated iron sulfate, hydrated iron sulfate, hydrated iron sulfate, hydrated iron sulfate, hydrated magnesium aluminum sulfate, hydrated magnesium iron sulfate hydroxide, hydrated magnesium manganese zinc sulfate hydroxide, hydrated magnesium nickel iron chromium aluminum carbonate sulfate hydroxide, hydrated magnesium sulfate, hydrated magnesium sulfate, hydrated magnesium sulfate, hydrated magnesium sulfate, hydrated magnesium sulfate, hydrated magnesium zinc manganese sulfate hydroxide, hydrated manganese aluminum sulfate, hydrated manganese sulfate, hydrated manganese sulfate, hydrated manganese sulfate, hydrated manganese zinc iron sulfate, hydrated nickel iron sulfate, hydrated nickel sulfate, hydrated nickel sulfate, hydrated potassium aluminum sulfate, hydrated potassium calcium magnesium sulfate, hydrated potassium iron sulfate, hydrated potassium magnesium sulfate, hydrated potassium sodium iron nitrate sulfate, hydrated potassium sodium magnesium nitrate sulfate, hydrated potassium uranyl sulfate hydroxide, hydrated sodium calcium magnesium zinc aluminum silicate sulfate hydroxide, hydrated sodium magnesium sulfate, hydrated sodium sulfate, hydrated uranyl sulfate hydroxide, hydrated zinc copper iron sulfate, hydrated zinc iron manganese aluminum sulfate, hydrated zinc magnesium sulfate, hydrated zinc manganese sulfate, hydrated zinc sulfate, hydronium iron sulfate hydroxide, lead aluminum arsenate sulfate hydroxide, lead aluminum phosphate sulfate hydroxide, lead copper aluminum sulfate hydroxide, lead copper iron aluminum sulfate hydroxide, lead copper sulfate hydroxide, lead copper sulfate silicate hydroxide, lead gallium arsenate sulfate hydroxide, lead iron phosphate sulfate hydroxide, lead iron sulfate hydroxide, lead iron sulfate hydroxide, lead strontium aluminum phosphate sulfate hydroxide, lead sulfate, lead sulfate, magnesium manganese zinc iron carbonate sulfate hydroxide, potassium aluminum sulfate hydroxide, potassium iron sulfate hydroxide, potassium sodium sulfate, silver iron sulfate hydroxide, silver iron sulfate hydroxide, sodium aluminum sulfate hydroxide, sodium calcium borate sulfate chloride hydroxide, sodium calcium potassium aluminum sulfate hydroxide, sodium calcium sulfate, sodium carbonate sulfate, sodium iolate sulfate, sodium iron sulfate hydroxide, sodium magnesium sulfate, sodium potassium carbonate sulfate chloride, sodium sulfate, strontium aluminum phosphate sulfate hydroxide, strontium cerium aluminum arsenate sulfate hydroxide, strontium sulfate, thallium potassium iron sulfate hydroxide, or any combination thereof.

In some embodiments, at least one of the first solvent and the second solvent comprises formic acid, n-Butanol, isopropanol, n-propanol, ethanol, methanol, acetic acid, water, deionized water or any combination thereof.

In some embodiments, the first acid comprises perchloric acid, hydroiodic acid, hydrobromic acid, hydrochloric acid, sulfuric acid, p-toluenesulfonic acid methanesulfonic acid, or any combination thereof.

In some embodiments, the second acid comprises formic acid, ascorbic acid, acetic acid, trichloroacetic acid, hydrofluoric acid, hydrocyanic, hydrogen sulfide, or any combination thereof.

In some embodiments, the concentration of the sulfur precursor is about 0.5 M to about 2 M. In some embodiments, the concentration of the sulfur precursor is at least about 0.5 M. In some embodiments, the concentration of the sulfur precursor is at most about 2 M. In some embodiments, the concentration of the sulfur precursor is about 0.5 M to about 0.75 M, about 0.5 M to about 1 M, about 0.5 M to about 1.25 M, about 0.5 M to about 1.5 M, about 0.5 M to about 1.75 M, about 0.5 M to about 2 M, about 0.75 M to about 1 M, about 0.75 M to about 1.25 M, about 0.75 M to about 1.5 M, about 0.75 M to about 1.75 M, about 0.75 M to about 2 M, about 1 M to about 1.25 M, about 1 M to about 1.5 M, about 1 M to about 1.75 M, about 1 M to about 2 M, about 1.25 M to about 1.5 M, about 1.25 M to about 1.75 M, about 1.25 M to about 2 M, about 1.5 M to about 1.75 M, about 1.5 M to about 2 M, or about 1.75 M to about 2 M.

In some embodiments, the concentration of the GO suspension is about 1.1 g/L to about 4.6 g/L. In some embodiments, the concentration of the GO suspension is at least about 1.1 g/L. In some embodiments, the concentration of the GO suspension is at most about 4.6 g/L. In some embodiments, the concentration of the GO suspension is about 1.1 g/L to about 1.25 g/L, about 1.1 g/L to about 1.5 g/L, about 1.1 g/L to about 1.75 g/L, about 1.1 g/L to about 2 g/L, about 1.1 g/L to about 2.5 g/L, about 1.1 g/L to about 3 g/L, about 1.1 g/L to about 3.5 g/L, about 1.1 g/L to about 4 g/L, about 1.1 g/L to about 4.6 g/L, about 1.25 g/L to about 1.5 g/L, about 1.25 g/L to about 1.75 g/L, about 1.25 g/L to about 2 g/L, about 1.25 g/L to about 2.5 g/L, about 1.25 g/L to about 3 g/L, about 1.25 g/L to about 3.5 g/L, about 1.25 g/L to about 4 g/L, about 1.25 g/L to about 4.6 g/L, about 1.5 g/L to about 1.75 g/L, about 1.5 g/L to about 2 g/L, about 1.5 g/L to about 2.5 g/L, about 1.5 g/L to about 3 g/L, about 1.5 g/L to about 3.5 g/L, about 1.5 g/L to about 4 g/L, about 1.5 g/L to about 4.6 g/L, about 1.75 g/L to about 2 g/L, about 1.75 g/L to about 2.5 g/L, about 1.75 g/L to about 3 g/L, about 1.75 g/L to about 3.5 g/L, about 1.75 g/L to about 4 g/L, about 1.75 g/L to about 4.6 g/L, about 2 g/L to about 2.5 g/L, about 2 g/L to about 3 g/L, about 2 g/L to about 3.5 g/L, about 2 g/L to about 4 g/L, about 2 g/L to about 4.6 g/L, about 2.5 g/L to about 3 g/L, about 2.5 g/L to about 3.5 g/L, about 2.5 g/L to about 4 g/L, about 2.5 g/L to about 4.6 g/L, about 3 g/L to about 3.5 g/L, about 3 g/L to about 4 g/L, about 3 g/L to about 4.6 g/L, about 3.5 g/L to about 4 g/L, about 3.5 g/L to about 4.6 g/L, or about 4 g/L to about 4.6 g/L.

In some embodiments, the concentration of at least one of the first acid and the second acid is at least about 0.5 M. In some embodiments, the concentration of at least one of the first acid and the second acid is at most about 4 M. In some embodiments, the concentration of at least one of the first acid and the second acid is about from 0.5 M to about 4 M. In some embodiments, the concentration of at least one of the first acid and the second acid is about 0.5 M to about 1 M, about 0.5 M to about 1.5 M, about 0.5 M to about 2 M, about 0.5 M to about 2.5 M, about 0.5 M to about 3 M, about 0.5 M to about 3.5 M, about 0.5 M to about 4 M, about 1 M to about 1.5 M, about 1 M to about 2 M, about 1 M to about 2.5 M, about 1 M to about 3 M, about 1 M to about 3.5 M, about 1 M to about 4 M, about 1.5 M to about 2 M, about 1.5 M to about 2.5 M, about 1.5 M to about 3 M, about 1.5 M to about 3.5 M, about 1.5 M to about 4 M, about 2 M to about 2.5 M, about 2 M to about 3 M, about 2 M to about 3.5 M, about 2 M to about 4 M, about 2.5 M to about 3 M, about 2.5 M to about 3.5 M, about 2.5 M to about 4 M, about 3 M to about 3.5 M, about 3 M to about 4 M, or about 3.5 M to about 4 M.

In some embodiments, the temperature at which the second solution is heated is about 48° C. to about 190° C. In some embodiments, the temperature at which the second solution is heated is at least about 48° C. In some embodiments, the temperature at which the second solution is heated is at most about 190° C. In some embodiments, the temperature at which the second solution is heated is about 48° C. to about 60° C., about 48° C. to about 80° C., about 48° C. to about 100° C., about 48° C. to about 120° C., about 48° C. to about 140° C., about 48° C. to about 160° C., about 48° C. to about 190° C., about 60° C. to about 80° C., about 60° C. to about 100° C., about 60° C. to about 120° C., about 60° C. to about 140° C., about 60° C. to about 160° C., about 60° C. to about 190° C., about 80° C. to about 100° C., about 80° C. to about 120° C., about 80° C. to about 140° C., about 80° C. to about 160° C., about 80° C. to about 190° C., about 100° C. to about 120° C., about 100° C. to about 140° C., about 100° C. to about 160° C., about 100° C. to about 190° C., about 120° C. to about 140° C., about 120° C. to about 160° C., about 120° C. to about 190° C., about 140° C. to about 160° C., about 140° C. to about 190° C., or about 160° C. to about 190° C.

In some embodiments, the forming of a graphene oxide suspension is performed by a Hummer's method.

In some embodiments, the method continuously forms an electrode in a roll-to-roll process.

In some embodiments, the suspension is dried for a period of time of about 12 hours to about 24 hours. In some embodiments, the suspension is dried for a period of time of at least about 12 hours. In some embodiments, the suspension is dried for a period of time of at most about 24 hours. In some embodiments, the suspension is dried for a period of time of about 12 hours to about 14 hours, about 12 hours to about 16 hours, about 12 hours to about 18 hours, about 12 hours to about 20 hours, about 12 hours to about 22 hours, about 12 hours to about 24 hours, about 14 hours to about 16 hours, about 14 hours to about 18 hours, about 14 hours to about 20 hours, about 14 hours to about 22 hours, about 14 hours to about 24 hours, about 16 hours to about 18 hours, about 16 hours to about 20 hours, about 16 hours to about 22 hours, about 16 hours to about 24 hours, about 18 hours to about 20 hours, about 18 hours to about 22 hours, about 18 hours to about 24 hours, about 20 hours to about 22 hours, about 20 hours to about 24 hours, or about 22 hours to about 24 hours.

In some embodiments, the temperature at which the suspension is dried is about 50° C. to about 150° C. In some embodiments, the temperature at which the suspension is dried is at least about 50° C. In some embodiments, the temperature at which the suspension is dried is at most about 150° C. In some embodiments, the temperature at which the suspension is dried about 50° C. to about 75° C., about 50° C. to about 100° C., about 50° C. to about 125° C., about 50° C. to about 150° C., about 75° C. to about 100° C., about 75° C. to about 125° C., about 75° C. to about 150° C., about 100° C. to about 125° C., about 100° C. to about 150° C., or about 125° C. to about 150° C.

Some embodiments further comprise: adding a portion of a sulfur precursor to the graphene oxide suspension and a first solvent; adding an first acid to form a first solution; stirring the first solution; adding a second acid to the first solution to form a second solution; heating the second solution; washing the second solution in a second solvent; and freeze drying the second solution.

In some embodiments, the volume of a sulfur precursor is about 0.05 ml to about 2 ml. In some embodiments, the volume of a sulfur precursor is at least about 0.05 ml. In some embodiments, the volume of a sulfur precursor is at most about 2 ml. In some embodiments, the volume of a sulfur precursor is about 0.05 ml to about 0.1 ml, about 0.05 ml to about 0.25 ml, about 0.05 ml to about 0.5 ml, about 0.05 ml to about 0.75 ml, about 0.05 ml to about 1 ml, about 0.05 ml to about 1.25 ml, about 0.05 ml to about 1.5 ml, about 0.05 ml to about 1.75 ml, about 0.05 ml to about 2 ml, about 0.1 ml to about 0.25 ml, about 0.1 ml to about 0.5 ml, about 0.1 ml to about 0.75 ml, about 0.1 ml to about 1 ml, about 0.1 ml to about 1.25 ml, about 0.1 ml to about 1.5 ml, about 0.1 ml to about 1.75 ml, about 0.1 ml to about 2 ml, about 0.25 ml to about 0.5 ml, about 0.25 ml to about 0.75 ml, about 0.25 ml to about 1 ml, about 0.25 ml to about 1.25 ml, about 0.25 ml to about 1.5 ml, about 0.25 ml to about 1.75 ml, about 0.25 ml to about 2 ml, about 0.5 ml to about 0.75 ml, about 0.5 ml to about 1 ml, about 0.5 ml to about 1.25 ml, about 0.5 ml to about 1.5 ml, about 0.5 ml to about 1.75 ml, about 0.5 ml to about 2 ml, about 0.75 ml to about 1 ml, about 0.75 ml to about 1.25 ml, about 0.75 ml to about 1.5 ml, about 0.75 ml to about 1.75 ml, about 0.75 ml to about 2 ml, about 1 ml to about 1.25 ml, about 1 ml to about 1.5 ml, about 1 ml to about 1.75 ml, about 1 ml to about 2 ml, about 1.25 ml to about 1.5 ml, about 1.25 ml to about 1.75 ml, about 1.25 ml to about 2 ml, about 1.5 ml to about 1.75 ml, about 1.5 ml to about 2 ml, or about 1.75 ml to about 2 ml.

In some embodiments, the volume of the GO suspension is about 0.1 ml to about 0.5 ml. In some embodiments, the volume of the GO suspension is at least about 0.1 ml. In some embodiments, the volume of the GO suspension is at most about 0.5 ml. In some embodiments, the volume of the GO suspension is about 0.1 ml to about 0.2 ml, about 0.1 ml to about 0.3 ml, about 0.1 ml to about 0.4 ml, about 0.1 ml to about 0.5 ml, about 0.2 ml to about 0.3 ml, about 0.2 ml to about 0.4 ml, about 0.2 ml to about 0.5 ml, about 0.3 ml to about 0.4 ml, about 0.3 ml to about 0.5 ml, or about 0.4 ml to about 0.5 ml.

In some embodiments, the volume of the first solvent is about 0.3 ml to about 1.2 ml. In some embodiments, the volume of the first solvent is at least about 0.3 ml. In some embodiments, the volume of the first solvent is at most about 1.2 ml. In some embodiments, the volume of the first solvent is about 0.3 ml to about 0.4 ml, about 0.3 ml to about 0.5 ml, about 0.3 ml to about 0.6 ml, about 0.3 ml to about 0.7 ml, about 0.3 ml to about 0.8 ml, about 0.3 ml to about 0.9 ml, about 0.3 ml to about 1 ml, about 0.3 ml to about 1.1 ml, about 0.3 ml to about 1.2 ml, about 0.4 ml to about 0.5 ml, about 0.4 ml to about 0.6 ml, about 0.4 ml to about 0.7 ml, about 0.4 ml to about 0.8 ml, about 0.4 ml to about 0.9 ml, about 0.4 ml to about 1 ml, about 0.4 ml to about 1.1 ml, about 0.4 ml to about 1.2 ml, about 0.5 ml to about 0.6 ml, about 0.5 ml to about 0.7 ml, about 0.5 ml to about 0.8 ml, about 0.5 ml to about 0.9 ml, about 0.5 ml to about 1 ml, about 0.5 ml to about 1.1 ml, about 0.5 ml to about 1.2 ml, about 0.6 ml to about 0.7 ml, about 0.6 ml to about 0.8 ml, about 0.6 ml to about 0.9 ml, about 0.6 ml to about 1 ml, about 0.6 ml to about 1.1 ml, about 0.6 ml to about 1.2 ml, about 0.7 ml to about 0.8 ml, about 0.7 ml to about 0.9 ml, about 0.7 ml to about 1 ml, about 0.7 ml to about 1.1 ml, about 0.7 ml to about 1.2 ml, about 0.8 ml to about 0.9 ml, about 0.8 ml to about 1 ml, about 0.8 ml to about 1.1 ml, about 0.8 ml to about 1.2 ml, about 0.9 ml to about 1 ml, about 0.9 ml to about 1.1 ml, about 0.9 ml to about 1.2 ml, about 1 ml to about 1.1 ml, about 1 ml to about 1.2 ml, or about 1.1 ml to about 1.2 ml.

In some embodiments, the first solvent comprises formic acid, n-Butanol, isopropanol, n-propanol, ethanol, methanol, acetic acid, water, deionized water or any combination thereof.

In some embodiments, the volume of the first acid is about 0.05 ml to about 0.2 ml. In some embodiments, the volume of the first acid is at least about 0.05 ml. In some embodiments, the volume of the first acid is at most about 0.2 ml. In some embodiments, the volume of the first acid is about 0.05 ml to about 0.075 ml, about 0.05 ml to about 0.1 ml, about 0.05 ml to about 0.125 ml, about 0.05 ml to about 0.15 ml, about 0.05 ml to about 0.175 ml, about 0.05 ml to about 0.2 ml, about 0.075 ml to about 0.1 ml, about 0.075 ml to about 0.125 ml, about 0.075 ml to about 0.15 ml, about 0.075 ml to about 0.175 ml, about 0.075 ml to about 0.2 ml, about 0.1 ml to about 0.125 ml, about 0.1 ml to about 0.15 ml, about 0.1 ml to about 0.175 ml, about 0.1 ml to about 0.2 ml, about 0.125 ml to about 0.15 ml, about 0.125 ml to about 0.175 ml, about 0.125 ml to about 0.2 ml, about 0.15 ml to about 0.175 ml, about 0.15 ml to about 0.2 ml, or about 0.175 ml to about 0.2 ml.

In some embodiments, the first acid is a strong acid. In some embodiments, a strong acid comprises perchloric acid, hydroiodic acid, hydrobromic acid, hydrochloric acid, sulfuric acid, p-toluenesulfonic acid methanesulfonic acid, or any combination thereof. In some embodiments, the first acid is added drop-wise.

In some embodiments, the first solution is stirred for a period of time of about 1 hour to about 4 hours. In some embodiments, the first solution is stirred for a period of time of at least about 1 hour. In some embodiments, the first solution is stirred for a period of time of at most about 4 hours. In some embodiments, the first solution is stirred for a period of time of about 1 hour to about 1.5 hours, about 1 hour to about 2 hours, about 1 hour to about 2.5 hours, about 1 hour to about 3 hours, about 1 hour to about 3.5 hours, about 1 hour to about 4 hours, about 1.5 hours to about 2 hours, about 1.5 hours to about 2.5 hours, about 1.5 hours to about 3 hours, about 1.5 hours to about 3.5 hours, about 1.5 hours to about 4 hours, about 2 hours to about 2.5 hours, about 2 hours to about 3 hours, about 2 hours to about 3.5 hours, about 2 hours to about 4 hours, about 2.5 hours to about 3 hours, about 2.5 hours to about 3.5 hours, about 2.5 hours to about 4 hours, about 3 hours to about 3.5 hours, about 3 hours to about 4 hours, or about 3.5 hours to about 4 hours.

In some embodiments, the volume of the second acid is about 10 μL to about 40 μL. In some embodiments, the volume of the second acid is at least about 10 μL. In some embodiments, the volume of the second acid is at most about 40 μL. In some embodiments, the volume of the second acid is about 10 μL to about 15 μL, about 10 μL to about 20 μL, about 10 μL to about 25 μL, about 10 μL to about 30 μL, about 10 μL to about 35 μL, about 10 μL to about 40 μL, about 15 μL to about 20 μL, about 15 μL to about 25 μL, about 15 μL to about 30 μL, about 15 μL to about 35 μL, about 15 μL to about 40 μL, about 20 μL to about 25 μL, about 20 μL to about 30 μL, about 20 μL to about 35 μL, about 20 μL to about 40 μL, about 25 μL to about 30 μL, about 25 μL to about 35 μL, about 25 μL to about 40 μL, about 30 μL to about 35 μL, about 30 μL to about 40 μL, or about 35 μL to about 40 μL.

In some embodiments, the concentration of the second acid is about 0.5 M to about 2 M. In some embodiments, the concentration of the second acid is at least about 0.5 M. In some embodiments, the concentration of the second acid is at most about 2 M. In some embodiments, the concentration of the second acid is about 0.5 M to about 0.75 M, about 0.5 M to about 1 M, about 0.5 M to about 1.25 M, about 0.5 M to about 1.5 M, about 0.5 M to about 1.75 M, about 0.5 M to about 2 M, about 0.75 M to about 1 M, about 0.75 M to about 1.25 M, about 0.75 M to about 1.5 M, about 0.75 M to about 1.75 M, about 0.75 M to about 2 M, about 1 M to about 1.25 M, about 1 M to about 1.5 M, about 1 M to about 1.75 M, about 1 M to about 2 M, about 1.25 M to about 1.5 M, about 1.25 M to about 1.75 M, about 1.25 M to about 2 M, about 1.5 M to about 1.75 M, about 1.5 M to about 2 M, or about 1.75 M to about 2 M.

In some embodiments, the second acid comprises a weak acid. In some embodiments, a weak acid comprises formic acid, ascorbic acid, acetic acid, trichloroacetic acid, hydrofluoric acid, hydrocyanic, hydrogen sulfide or any combination thereof.

In some embodiments, the period of time of which the second solution is heated is about 1 hour to about 4 hours. In some embodiments, the period of time of which the second solution is heated is at least about 1 hour. In some embodiments, the period of time of which the second solution is heated is at most about 4 hours. In some embodiments, the period of time of which the second solution is heated is about 1 hour to about 1.5 hours, about 1 hour to about 2 hours, about 1 hour to about 2.5 hours, about 1 hour to about 3 hours, about 1 hour to about 3.5 hours, about 1 hour to about 4 hours, about 1.5 hours to about 2 hours, about 1.5 hours to about 2.5 hours, about 1.5 hours to about 3 hours, about 1.5 hours to about 3.5 hours, about 1.5 hours to about 4 hours, about 2 hours to about 2.5 hours, about 2 hours to about 3 hours, about 2 hours to about 3.5 hours, about 2 hours to about 4 hours, about 2.5 hours to about 3 hours, about 2.5 hours to about 3.5 hours, about 2.5 hours to about 4 hours, about 3 hours to about 3.5 hours, about 3 hours to about 4 hours, or about 3.5 hours to about 4 hours.

In some embodiments, the second solvent comprises formic acid, n-Butanol, isopropanol, n-propanol, ethanol, methanol, acetic acid, water, deionized water or any combination thereof.

In some embodiments, the graphene frameworks described herein can be employed for a variety of other electrical storage means or non-electrical storage means.

Other goals and advantages of the embodiments described herein will be further appreciated and understood when considered in conjunction with the following description and accompanying drawings. While the following description may contain specific details describing particular embodiments described herein, this should not be construed as limitations to the scope of the embodiments described herein but rather as an exemplification of preferable embodiments. For each embodiment described herein, many variations are possible as suggested herein that are known to those of ordinary skill in the art. A variety of changes and modifications may be made within the scope of the embodiments described herein without departing from the spirit thereof.

BRIEF DESCRIPTION OF THE DRAWINGS

Novel features of the disclosure are set forth with particularity in the appended claims. A better understanding of the features and advantages of the present disclosure will be obtained by reference to the following detailed description that sets forth illustrative embodiments, in which the principles of the embodiments are utilized, and the accompanying drawings or figures (also "FIG." and "FIGs." herein), of which:

DETAILED DESCRIPTION

Figure 1A:
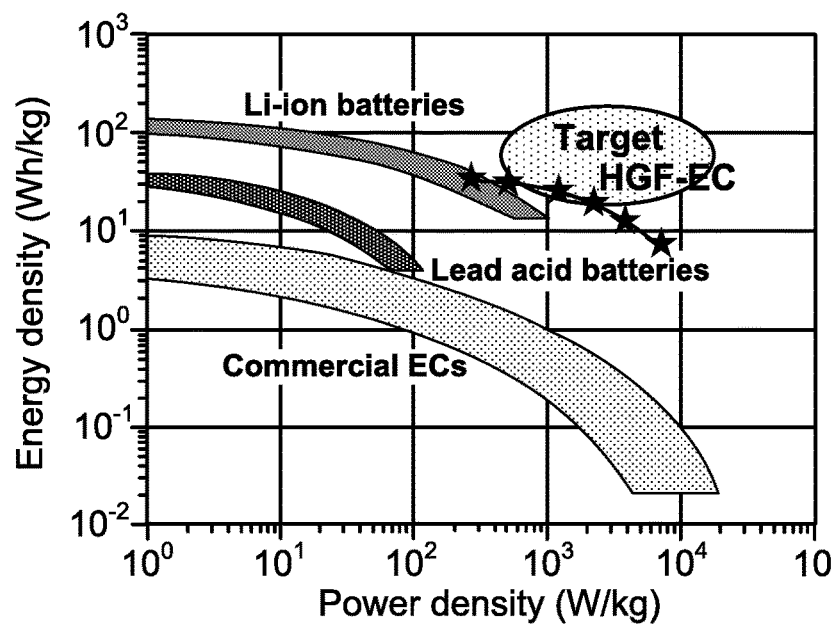
FIG. 1A, FIG. 1B, and FIG. 1C show Ragone plots of device-level gravimetric/volumetric energy density versus power density for three dimensional graphene frameworks and electrochemical capacitors, in comparison with other existing energy storage technologies and performance targets.

Provided herein are graphene materials, fabrication processes and devices with improved performance. In some embodiments, the present disclosure provides supercapacitors (SCs) comprising a graphene material and their fabrication processes. Such SCs avoid the shortcomings of current energy storage technologies. A SC of the present disclosure may comprise one or more supercapacitor cells. A SC may comprise a positive electrode and a negative electrode. The positive electrode and a negative electrode of an SC may be separated by a separator. The separator may comprise an electrolyte. The positive electrode may be a cathode during discharge. The negative electrode may be an anode during discharge. In some embodiments, a plurality of supercapacitor cells may be arranged (e.g., interconnected) in a pack.

Various aspects of the disclosure described herein may be applied to any of the particular applications set forth below or in any other type of manufacturing, synthesis or processing setting. Other manufacturing, synthesis or processing of materials may equally benefit from features described herein. For example, the methods, devices and systems herein may be advantageously applied to manufacture (or synthesis) of various forms of graphene or graphene oxide. The embodiments described herein may be applied as a standalone method, device or system, or as part of an integrated manufacturing or materials (e.g., chemicals) processing system. It shall be understood that different aspects of the disclosure may be appreciated individually, collectively, or in combination with each other.

An aspect of the disclosure provides supercapacitor devices comprising two or more electrodes, wherein each electrode is composed of a three-dimensional porous framework, and electrolytes disposed between the electrodes.

An aspect of the disclosure provides electrodes comprising an active material, wherein the active material comprises a three dimensional graphene framework (3DGF) or a holey three dimensional graphene framework (H3DGF). Another aspect of the disclosure provides a composite electrode comprising a capacitive or pseudo-capacitive composite material.

Reference will now be made to the figures. It will be appreciated that the figures and features therein are not necessarily drawn to scale. The schematic illustrations, images, formulas, charts and graphs referred to herein represent fabricated exemplary devices that serve as a representation of the appearance, characteristics and functionality of the devices produced by the exemplary methods described herein.

Terms and Definitions

Unless otherwise defined, all technical terms used herein have the same meaning as commonly understood by one of ordinary skill in the art. As used in this specification and the appended claims, the singular forms "a," "an," and "the" include plural references unless the context clearly dictates otherwise. Any reference to "or" herein is intended to encompass "and/or" unless otherwise stated.

As used herein, and unless otherwise defined, the term "about" refers to a range of values within plus and/or minus 10% of the specified value.

As used herein, and unless otherwise specified, the term GO refers to graphene oxide.

As used herein, and unless otherwise specified, the term RGO refers to reduced graphene oxide.

As used herein, and unless otherwise specified, the term 3D refers to three dimensional.

As used herein, and unless otherwise specified, the term 3DGF or 3DG refers to a three dimensional graphene framework.

As used herein, and unless otherwise specified, the term H3DGF refers to a holey three dimensional graphene framework.

As used herein, and unless otherwise specified, the term SEM refers to a scanning electron microscope.

As used herein, and unless otherwise specified, the term TEM refers to a transmission electron microscope.

As used herein, and unless otherwise specified, XRD refers to X-Ray Power Diffraction.

As used herein, and unless otherwise specified, the C-rate is a measure of the rate at which an energy storage device is charged or discharged relative to its maximum capacity.

As used herein, and unless otherwise specified, activation refers to the process whereby a sample is prepared or excited for a subsequent reaction.

As used herein, and unless otherwise specified, lithiation refers to the reaction with lithium or an organolithium compound.

As used herein, and unless otherwise specified, precursor is a compound that participates in a chemical reaction that produces another compound.

As used herein, and unless otherwise specified, coulombic efficiency (also called faradaic efficiency, faradaic yield, coulombic efficiency or current efficiency) describes the efficiency with which charge (electrons) is transferred in a system facilitating an electrochemical reaction.

As used herein, and unless otherwise specified, electrode-specific refers to a measurement as normalized by the weight or volume of the electrode.

As used herein, and unless otherwise specified, sulfur-specific refers to a measurement as normalized by the weight or volume of sulfur.

As used herein, and unless otherwise specified, nanopore refers to a pore whose diameter is from about 1 nm to about 1,000 nm.

As used herein, and unless otherwise specified, micropore refers to a pore whose diameter is from about 1 μm to about 1,000 μm.

As used herein, and unless otherwise specified, mF refers to a millifarad.

While preferable embodiments have been shown and described herein, it will be obvious to those skilled in the art that such embodiments are provided by way of example only. Numerous variations, changes, and substitutions will now occur to those skilled in the art. It should be understood that various alternatives to the embodiments described herein may be employed.

Electrical Energy Storage Devices

Figure 1B:
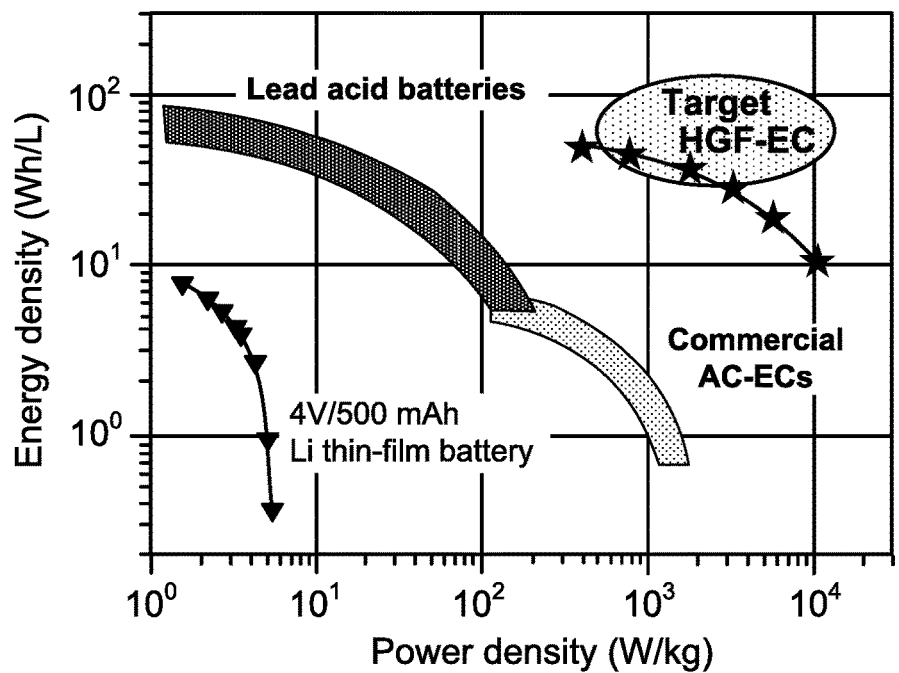
Figure 1C:
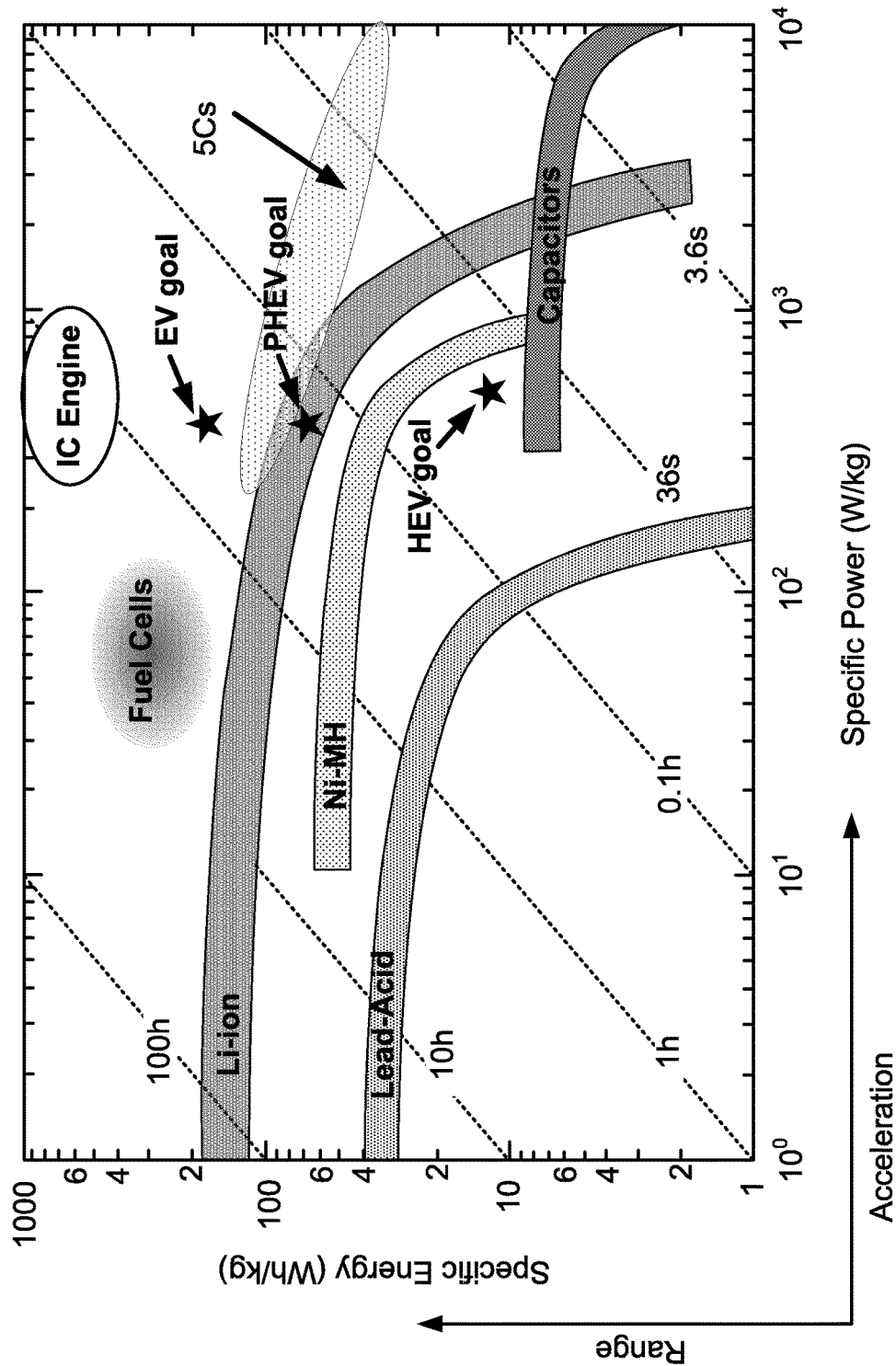

Referring to FIGS. 1A-1C, batteries and SCs represent two complementary energy storage technologies, whereas batteries may offer a high energy density and low power density, while SCs may offer a superior power density and a low energy density. An ideal energy storage device may be capable of delivering both a high energy density and a high power density. Beyond ultrahigh power density, SCs may also attractive for their long cyclic lifetime and low maintenance costs.

Electrical energy storage devices (EESDs) are of increasing importance for applications in mobile electronics, hybrid electric vehicles, renewable energy harvesting and energy conversion. Although lithium ion batteries currently represent a main source of energy storage technology, lithium ion battery capacities may be largely constrained by the theoretical capacities of cathodic materials, such as $LiCoO_2$ (about 272 mAh/g) and $LiFePO_4$ (about 170 mAh/g), which may be unable to satisfy the increasing consumer demand for energy storage.

Commercially available SCs may not be fit for widespread adoption, as their energy densities are typically 1-2 orders of magnitude lower than that of commercially available Lithium Ion (Li-ion) batteries. It is against this background that a need arose to develop the embodiments described in this disclosure.

SCs may comprise a EESD with a much higher capacitance than, and which may be recharged a hundred to a thousand times faster than, normal capacitors. Some supercapacitors may contain power densities in excess of 10 kW/kg; 10 times larger than current lithium-ion batteries. Unlike batteries, whose charging and discharging speed may be limited by chemical reactions, supercapacitors store charge through highly reversible ion absorption and/or redox reactions, which may enable fast energy capture and delivery.

Supercapacitors may exhibit a high power density and excellent low-temperature performance, and as such, have been increasingly employed as energy storage resources in such applications as portable electronic devices, medical devices, back-up power devices, flash cameras, factories, regenerative braking systems and hybrid electric vehicles. High power density may continue to attract increasing attention, especially for conditions in which huge amounts of energy are stored or emitted in a limited time, such as load-leveling the emerging smart electrical grid, flash charging electronics and quick acceleration for electric vehicles.

SCs may represent the ideal energy storage technology for electric vehicles (EVs), hybrid-EVs (HEVs), and plug-in hybrid-EVs (PHEVs). Although some current supercapacitors have shown significant gains in energy density, these devices may exhibit a loss of power and/or cycling capability over time. Additionally, a significant drawback of today's battery-based EVs may be that their battery packs require about an hour or more to fully recharge, exceeding the time required to fill a gas tank (about 5 minutes), and the acceptable period of time for an on-the-road re-charge. As such, the creation of SCs may greatly increase the power density and shorten the re-charge time by orders of magnitude, thus increasing the utility of EVs. Additionally, SCs with much higher power densities may also efficiently absorb peak power during braking energy re-harvest or rapid acceleration. Such SCs, in combination with traditional batteries, may greatly reduce high-power stress to the traditional batteries and therefore increase their lifetime, robustness, and safety. As such, the creation of a SC with an energy density may offer an ideal energy storage solution for EVs.

In some embodiments, a supercapacitor (SC), or an electrochemical capacitor, is an energy storage device that is typically comprised of two or more electrodes, wherein each electrode is separated by an ion-permeable membrane (separator), and wherein an electrolyte ionically connects the electrodes, such that ions in the electrolyte form double electric polarity layers, opposing the electrodes' polarities, when the electrodes are polarized by an applied voltage. An electrode of an electrochemical cell, in which electrons leave the active material within cell and oxidation occurs, may be referred to as an anode. An electrode of an electrochemical cell, in which the electrons enter the active material within cell and reduction occurs, may be referred to as a cathode. Each electrode may become either an anode or a cathode depending on the direction of current through the cell.

The electrode material may strongly affect the energy storage performance of a supercapacitor. Because the energy storage in SCs relies on surface charge absorption, a high-performance SC electrode may require a high ion-accessible surface area, high electrical conductivity, a high ionic transport rate, and high electrochemical stability.

In some embodiments, a SC electrode comprises an active material and a current collector substrate. The mass percentage of active materials is typically about 35-40% of the entire device. As active materials are typically porous, and thus brittle and poor conductors, a current collector may be employed as a support structure and a conducting path to decrease the resistance of the supercapacitor. In some embodiments, a SC is a hybrid SC comprising one electrode that exhibits a high electrostatic capacitance and another electrode that exhibits a high electrochemical capacitance.

In some embodiments, a current collector is comprised of carbon cloth silicon, metal oxide, gallium arsenide, glass, steel, stainless steel, or any combination thereof. In some embodiments, a SC current collector is designed to flex and bend under stress. The state-of-art SCs available today may be constructed using porous activated carbon electrodes.

Since the anode typically undergoes lithiation during hybrid SCs charging, a lower anode lithiation voltage may provide a larger device voltage window and thus a higher SC energy density. As such, the cycling stability of an SC's anode may often be the limiting factor for the SC device's cycling life. Therefore, an ideal anode in a hybrid SC system may exhibit a low working voltage so that the device fully utilizes the voltage window of the electrolyte and provide a high energy density. Additionally, the anode should have a high specific capacity and energy density, and should possess an excellent rate capability comparable to a high-power cathode, to achieve a high power density. Finally, the anode should exhibit a long cycling life to improve cycling stability of a hybrid system. An ideal cathode should have a high working voltage, high specific capacity, and a good rate-capability.

A graphene material may be provided in the positive electrode (cathode during discharge), the negative electrode (anode during discharge), or both. Graphene may represent an SC electrode ideal material because of its single atomic thickness, high theoretical specific surface area (about 2,630 $m^2/g$), high theoretical gravimetric capacitance (about 550 F/g), high intrinsic electrical conductivity, excellent mechanical flexibility, and exceptional electrochemical stability. However, due to strong $\pi$-$\pi$ interactions between graphene sheets, the graphene flakes may tend to re-stack to form graphite-like powders, or films when they are processed into bulk electrodes. This restacking may severely reduce the accessible surface area and the ion diffusion rate, thus impairing the gravimetric capacitance and charge/discharge rate of an electrode.

An activation method, however, may be employed to prepare activated graphene with ultra-small micropores and an ultrahigh specific surface area. Such microporous surfaces, however, may limit the gravimetric capacitance of the electrode due to the decreased efficiency of electrolyte ions access. Although a laser-scribing method may be employed to mitigate these challenges for on-chip micro-supercapacitors, through the formation of porous structures that increase the accessible surface area and boost the gravimetric capacitance, the intrinsic scale of this laser scribing approach may be insufficient to form larger energy devices for such applications as transportation and renewable energy storage.

Per FIGS. 1A-1C, embodiments of this disclosure are directed to SCs with energy densities that rival lead acid and Li-ion batteries, while retaining a 10-100 times higher power density. Compared to the benchmark performance targets defined by USABC/Freedom CAR for the applications of electronic vehicles (EVs), hybrid electric vehicles (HEVs), and plug-in hybrid electric vehicles (PHEVs), embodiments of this disclosure realize a much higher power density, while retaining a high energy density, which is particularly desirable for target goals of those applications. Therefore, embodiments of this disclosure provide SCs that transform the energy storage technology landscape, in such products as EVs or electrical planes.

For traditional devices, the energy densities have been typically shown to decrease significantly with increasing power densities. Although current hybrid SCs may exhibit high energy and high power densities as well as long cycling lives, their capabilities may be limited by current anodes that may display low intrinsic electrical conductivity, large volume changes during the lithiation/delithiation process, unstable solid electrolyte interphase (SEI), and thus a poor cycling stability and rate-capability.

A void-shell structure within an electrode can cure these deficiencies, by accommodating the volume changes during charging and discharging and preventing the formation of an unstable solid electrolyte interface (SEI). However, the current state of the art template-assisted procedures for synthesizing yolk-shell structures are multistep, time-consuming, expensive, difficult to scale, and require toxic chemicals. Chemically reduced holey three dimensional graphene frameworks (3DGF) or holey three dimensional graphene frameworks (H3DGF), however, provide an effective solution to overcome these challenges, and enable the production of high performing SC electrodes on a large-scale.

As such, a SC was designed by optimizing and scaling the production and capabilities of 3DGF or H3DGF based SC electrodes. 3DGFs and H3DGFs were employed as a scaffold to create composite electrodes for high energy density hybrid pseudo-capacitors (PCs). Full power density cells were produced with energy densities approaching or even exceeding today's Li-ion batteries.

This disclosure is directed to developing SC devices. The disruptive energy storage technology disclosed herein is deployable on a commercial scale, leading to the development and deployment of advanced EESD technologies. The SCs described herein play an important role in one or more applications or areas, such as, for example, portable electronics (e.g., cellphones, computers, cameras, etc.), medical devices (e.g., life-sustaining and life-enhancing medical devices, including pacemakers, defibrillators, hearing aids, pain management devices, and drug pumps, electric vehicles (e.g., EESDs with long lifetime are needed to improve the electric vehicles industry, space (e.g., the EESDs may be used in space to power space systems including rovers, landers, spacesuits and electronic equipment), military EESDs (e.g., the military uses special EESDs for powering a large number of electronics and equipment; reduced mass/volume of the EESDs described herein are highly preferred), electric aircraft (e.g., an aircraft that runs on electric motors rather than internal combustion engines, with electricity coming from solar cells or EESDs), grid scale energy storage (e.g., EESDs may be used to store electrical energy during times when production (from power plants) exceeds consumption and the stored energy may be used at times when consumption exceeds production), renewable energy (e.g., since the sun does not shine at night and the wind does not blow at all times, EESDs in off-the-grid power systems may store excess electricity from renewable energy sources for use during hours after sunset and when the wind is not blowing; high power EESDs may harvest energy from solar cells with higher efficiency than current state-of-the-art EESDs), power tools (e.g., the EESDs described herein may enable fast-charging cordless power tools such as drills, screwdrivers, saws, wrenches and grinders; current EESDs have a long recharging time), or any combination thereof.

3D Graphene Frameworks

Figure 2A:
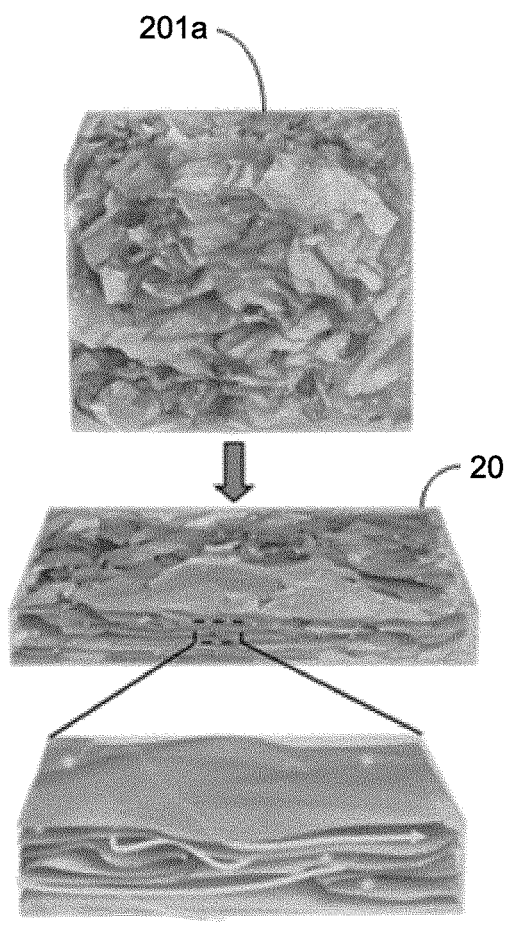
FIG. 2A and FIG. 2B show schematic illustrations of a compressed and an uncompressed holey three dimensional graphene framework and the solvated three dimensional macroporous structures of graphene frameworks.
Figure 2B:
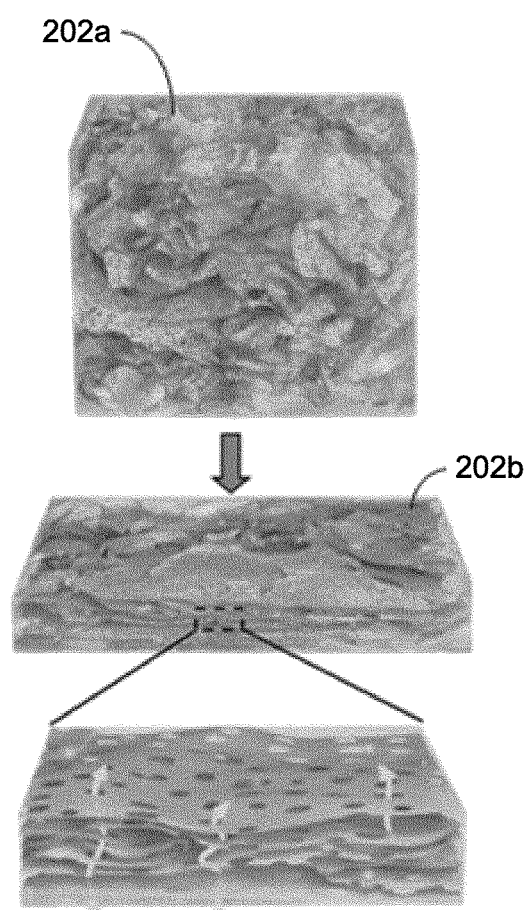

Although a highly porous activated 3D graphene framework (3DGF) 201a, formed from low-packing-density materials, per FIG. 2A, is used to provide electrodes with a large specific surface area and a high gravimetric capacitance, due to its high ion diffusion, such electrodes may maintain a low packing density and thus a low volumetric capacitance. In addition, although an activated 3DGF 201a, exhibits an abundance of empty space, the large required volume of the electrolyte within, increases the total mass of the device, and may thus reduce the overall energy density as normalized by the total mass of the device. As such, SC electrodes should be designed to simultaneously achieve high gravimetric and high volumetric capacitances while retaining an excellent rate capability. Alternatively, a compacted activated 3DGF 201b, per FIG. 2B, displays an increased volumetric capacitance and a decreased ion-accessible surface area and ion diffusion rate, and thus exhibits a lower gravimetric capacitance and a poor rate performance. For example, laser-scribed porous graphene electrodes may exhibit a rather low packing density of about 0.05 g/cm$^3$, and consequentially a high gravimetric performance and a low volumetric capacitance. Compacting the 3DGF through vacuum filtration and capillary compression, however, greatly improves the volumetric capacitance ($<$~200 F/cm$^3$) while maintaining a modest gravimetric capacitance (~167 F/g).

A holey 3D graphene framework (H3DGF) 202a, a form of a 3DGF, represents an ideal SC electrode material. H3DGFs 202a can be obtained by conjugating holey graphene sheets into a 3D network with a porous structure. The highly interconnected and interlocked 3D network structure of a compressed H3DGF's 202b graphene sheets, per FIG. 2B, prevents restacking, and serve as a highly porous monolithic structure with a high specific surface area that can be directly used as an electrode without any binder additives. Nanopores in H3DGFs 202a 202b further increase its specific surface area.

Unlike activated 3DGF 201a, whose ultra-small micropores may be difficult to access by electrolyte ions, an uncompressed H3DGF 202a or a compressed H3DGF 202b exhibits a hierarchy of sufficiently large and well integrated pores that form a continuous network of open channels, whose entire surface area may be fully wetted by electrolytes and accessible to electrolyte ions, for efficient ion transport therethrough. In some examples, compressed H3DGF 202b, with its interlocked graphene sheets, is mechanically compacted to form a freestanding electrode, without complete restacking of the graphene sheets, to achieve a high packing density while maintaining its initial solvated condition.

Figure 9:
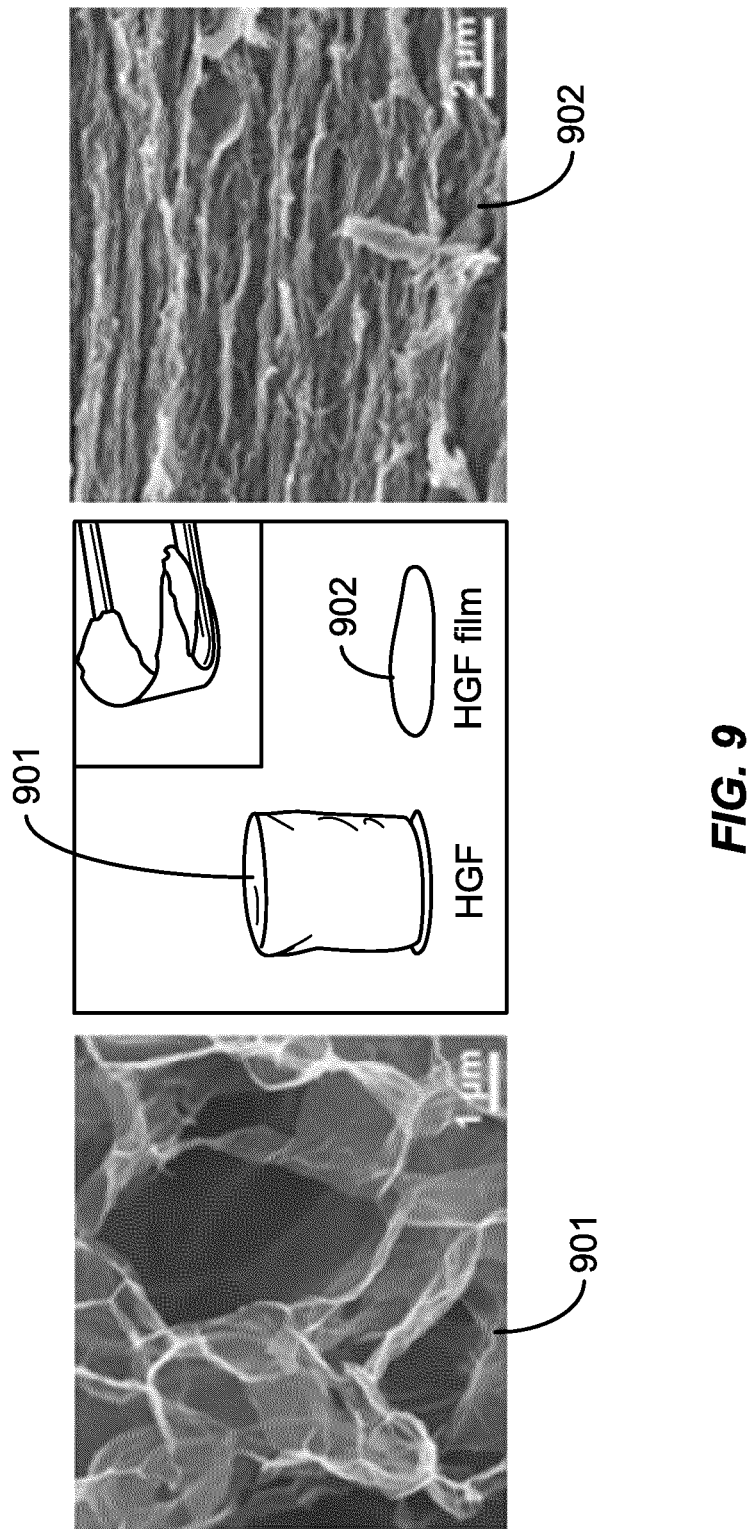
FIG. 9 shows exemplary SEM images of the interior microstructures of an uncompressed and a compressed holey three dimensional graphene framework (H3DGF), and an exemplary photograph of a H3DGF before and after mechanical compression, and the flexibility of the compressed H3DGF.

Side and cross sectioned views of an exemplary uncompressed H3DGF 901 and an exemplary compressed H3DGF 902 are shown per FIG. 9. Unlike activated graphene films, the nanopores in a H3DGF are sufficiently large to function as ion diffusion shortcuts between the graphene layers, and thus increase ion transport across the entire framework, and facilitate ion access to the entire surface area. As such, a H3DGF exhibits a high electrical conductivity and thus can be directly used as SC electrodes without additional conductive additives.

The specific surface area of currently available graphene electrodes is about 40-60% of the theoretical value of single-layer graphene (about 2,630 m$^2$/g). H3DGFs, as described herein, with a high surface and ion-accessible specific surface area were formed by tuning the size and thickness of the graphene sheets to increase the size and the density of, and to optimize the assembly and pore hierarchy of, the nanopores within the graphene sheet. As such, since the specific capacitance of a H3DGF is proportional to its specific surface area, and since the efficient porosity of H3DGF allows for a high ion diffusion rate, H3DGF electrodes exhibit a specific capacitance of about 1,250-2,000 F/g.

In some embodiments, mechanically robust 3DGFs and H3DGFs, with their high electrochemical active surface area and excellent electron transport rates, are capable of functioning as a robust conductive scaffold to act within a composite electrode to support electrochemically active capacitive or pseudo-capacitive materials, such as silicon (Si), sulfur (S), or transition metal oxides (TMOs), to further increase the energy density of a SC, pseudo-capacitor (PC) or any other EESD. Such capacitive or pseudo-capacitive composite electrodes exhibit a high theoretical capacity, wherein anodic composite materials, such as silicon and TMOs, and cathodic composite materials, such as sulfur, exhibit low and high voltage plateaus, respectively. To this end, it is desirable to develop reliable approaches, as described herein, to load nanoscale electrochemical active materials (e.g., TMO or Si) on or in a 3DGF or H3DGF scaffold in a highly uniform manner, to simultaneously ensure efficient electron and ion transport.

SCs that integrate a composite anode and a carbonaceous cathode, as described herein, exhibit a high energy density and a high power density. Current hybrid supercapacitors, however, may be impaired by the kinetic mismatch between a TMO anode, which employs a Faradaic lithium intercalation reaction, and a standard cathode, which stores charge through physical adsorption/desorption of electrolyte ions. 3DGF and H3DGF as described herein, on the other hand, which exhibit a high surface area and efficient loading of nanostructured electrode materials, simultaneously ensure high electron conductivity through the graphene network and rapid ion transport within ultra-small TMO particles. Thus, 3DGF-TMO and H3DGF-TMO composite anodes, as described herein, exhibit an improved rate-capability and cycling stability, by mitigating the kinetics gap between two asymmetric electrodes.

TMO based anode materials typically exhibit a relatively high voltage plateau, which limits the operation voltage window and thus the energy density of hybrid cells. Therefore, optimal anode materials with lower voltage plateaus, such as Si, as described herein, were employed to form SCs with a significantly high energy densities.

Lithium sulfur (Li—S) batteries represent the next generation of EESD technology. With a theoretical capacity of about 1,675 mAh/g, sulfur represents an attractive cathode composite material for high energy density, long lasting, and cheap electrical energy storage devices (EESDs). However, current Li—S batteries may exhibit low sulfur utilization and poor long term cycling behavior, due to the inherent properties of sulfur. First, because sulfur is electrically insulating, exhibits a poor electrical conductivity and undergoes dynamic expansion during charge and discharge, its use in composite electrodes often requires conductive additives (e.g., graphite) and binders whose weight does not contribute towards the storage capacity and thus reduces the energy density of the electrode. Second, sulfur cathodes may undergo a large volume expansion (of up to about 80%) upon the formation of $Li_2S$ during discharge, and likewise contract during charging, which may result in high internal strain and potential disintegration of a composite electrode. The capacity fading caused by the expansion and contraction, however, may be mitigated through increasing the porosity of the electrode. Finally, during the charge/discharge cycles, long chain lithium polysulfides ($Li_2Sn$, $4 \leq n \leq 8$) form that are soluble in the electrolyte and diffuse to, and deposit on, the lithium anode (i.e., polysulfide-shuttling process), to generate reactions that may degrade an EESD's performance.

Figure 5:
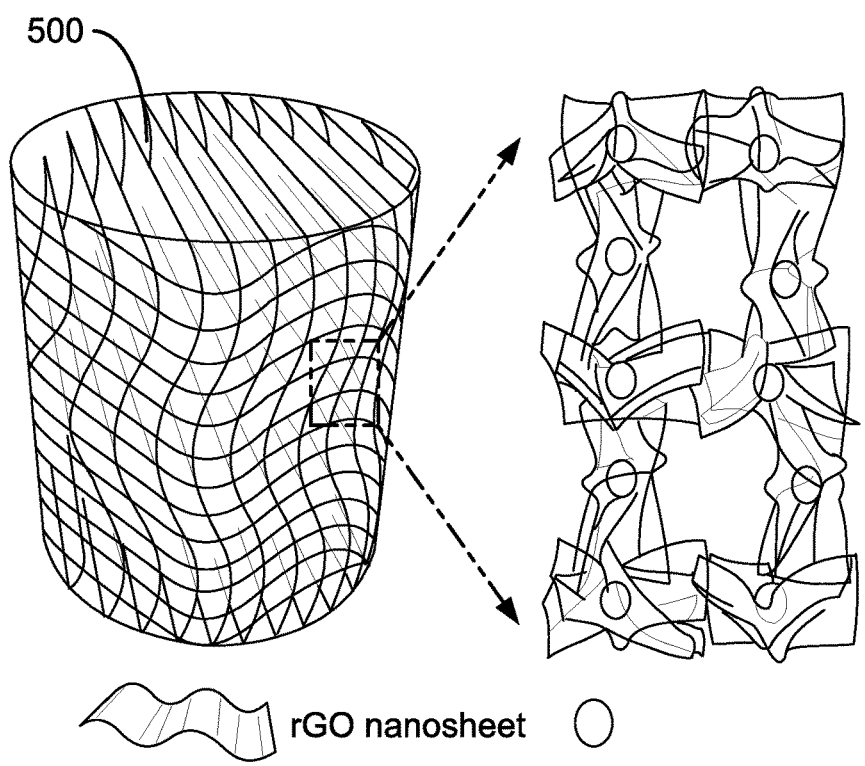
FIG. 5 shows a schematic illustration of the structure of, and the sulfur particles encapsulated within, a freestanding composite of a three dimensional graphene framework and sulfur.

Although previous SC electrodes that integrate up to 60% by weight of sulfur have displayed a variety of shortcomings, 3DGFs and H3DGFs represent ideal conductive scaffolds for efficient loading of S nanoparticles due to their high porosity, high surface area, high electrical conductivity, and efficient ion transport. FIG. 5 schematically illustrates the structure of an exemplary H3DGF-S composite 500, whereas the continuous conductive network formed by the highly interconnected H3DGF sheets form efficient high conductivity electron transport pathways, which are capable of overcoming sulfur's insulating properties. Further, because the individual graphene sheets are conjugated and interlocked together to form a monolithic mechanically strong 3D network, binders are not be required to withstand the repeated expansion and contraction of S-electrode in the charge/discharge cycles. Additionally, as described herein, 3DGF's and H3DGF's highly porous structure allows efficient incorporation of the active sulfur to form a high sulfur content of up to about 80-90% of the mass of a cathode. Finally, graphene sheets are able to wrap around and encapsulate the sulfur particles and thereby inhibit the polysulfide shuttling process and provide for a robust electrode with excellent cycling performance.

Methods of Forming 3D Graphene Frameworks

3DGFs and H3DGFs may be produced from graphene oxide (GO). As such, a major hurdle towards the commercial scale production of high performance 3DGF-SCs and H3DGF-SCs may be the development of a reliable and scalable method of GO production. A traditional method of producing GO is the modified Hummers' method, which may involve environmentally hazardous heavy metals, poisonous gases, explosion risk, long reaction times, and a tedious dialysis process to neutralize the pH, and may thus be cost prohibitive for widespread applications. As the quality of current large scale production methods of GO and reduced GO (rGO) (e.g., up to 1,200 tones/year), may not be suitable for use in high performance EESDs, there is a current unmet need for a green, safe, highly efficient and low-cost approach for scalable GO production. In some examples, an alternative oxidant to the predominantly used $KClO_3$ and $KMnO_4$, such as $K_2FeO_4$, was utilized as an efficient oxidant that is less volatile and toxic, which produced GO in about one hour at room temperature, and at a large scale. Additionally, alternative commercial sources of GO may be evaluated and employed.

The performance of 3DGFs and H3DGF based EESDs is highly dependent on its surface area (number of layers) and its conductivity (degree of oxidation/reduction). GO and rGO that exhibit a predominance of single layers and a minimal number of oxygen groups display the highest capacity and conductivity, respectively. Therefore, the degree of oxidation correlates directly to the number of defect sites in the resulting rGO, and the conductivity of the HGF. Complete oxygen group removal, and full restoration of the $\pi$-$\pi$ conjugation in the rGO, was achieved by tuning and optimizing the method of fabrication.

In some examples, a GO suspension is synthesized by a Hummer's method using natural flake graphite, wherein the concentration of GO in a suspension is about 2.3 g/L, and wherein the GO suspension is dried at a temperature of about 95° C. for a time period of about 24 hours.

Figure 6:
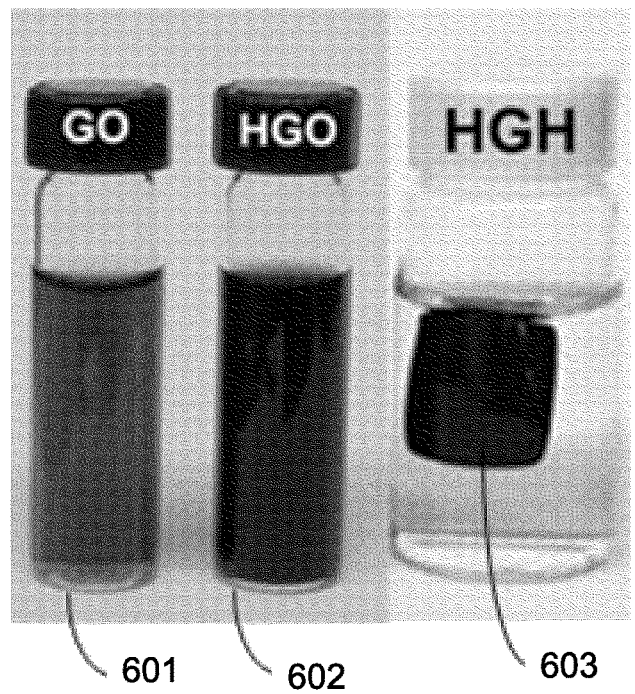
FIG. 6 shows exemplary photographs of aqueous dispersions of a graphene oxide, a holey graphene oxide, and a conjugated holey graphene hydrogel.

Per FIG. 6, an exemplary H3DGF was prepared through simultaneous reduction and conjugation of graphene oxide (GO) 601 or holey GO (HGO) 602 in an aqueous dispersion, to form an exemplary macroscopic holey graphene hydrogel (HGH) 603, or solvated H3DGF. The macroscopic size of the HGH 603 was tuned by controlling the concentration of GO 601, wherein, for example, aqueous dispersions with lower concentrations of GO 601 produced considerably larger HGHs 603, with larger micro-pores than those produced from aqueous dispersions with higher concentration dispersions. In this way, the macroscopic size, as well as the micro-pore size of the HGH 603, as described herein, was tuned to maximize the surface area of the resulting H3DGFs, while maintaining the mechanical robustness of the hydrogel for binder-free use as an electrode.

Additionally, the size of the nanopores in the basal plane of the graphene sheets was tuned by controlling the period of exposure of the GO to various concentrations of an oxidizing agent comprising oxygen, ozone, hydrogen peroxide, fluorite dioxide, lithium peroxide, barium peroxide, fluorine, chlorine, nitric acid, nitrate compounds, sulfuric acid, peroxydisulfuric acid, peroxymonosulfuric acid, chlorite, chlorate, perchlorate, halogen compounds hypochlorite, hypohalite compounds, household bleach, hexavalent chromium compounds, chromic acids, dichromic acids, chromium trioxide, pyridinium chlorochromate, chromate compounds, dichromate compounds, permanganate compounds, potassium permanganate, sodium perborate, nitrous oxide, potassium nitrate, sodium bismuthate or any combination thereof. As such, the longer the GO was exposed to the oxidizing agent, or the higher the concentration of the oxidizing agent, the larger the nanopores formed within in the graphene sheets. Therefore, as described herein, the ion diffusion rate was optimized by maximizing the size and density of the nanopores. Further, 3DGFs or H3DGFs whose nanopores were formed on the GO before reduction, displayed less robustness than a 3DGF or H3DGF whose nanopores were formed on the GO after reduction.

The electrochemical performance of 3DGF or H3DGF based electrodes, as described herein, were further optimized by modifying the arrangement/topology of the graphene sheets. For example, vertically aligned graphene sheets offer rapid transport pathways which improve the rate capability and specific capacitance of a 3DGF or H3DGF. The ordering of graphene networks was tuned by controlling the arrangement of GO into a proper liquid crystal phase (e.g., nematic) before conjugation to form 3DGFs or H3DGFs. In some examples, external forces, such as an electric field, fluidic pressure, fluidic vortices, magnetic field or mechanical deformation were also employed to tune the macroscopic alignment of GO liquid crystals and the organization of graphene sheets in the 3DGFs or H3DGFs.

In some examples, HGO may be formed by heating a homogeneous aqueous mixture of GO and an oxidizing agent comprising oxygen, ozone, hydrogen peroxide, fluorite dioxide, lithium peroxide, barium peroxide, fluorine, chlorine, nitric acid, nitrate compounds, sulfuric acid, peroxydisulfuric acid, peroxymonosulfuric acid, chlorite, chlorate, perchlorate, halogen compounds hypochlorite, hypohalite compounds, household bleach, hexavalent chromium compounds, chromic acids, dichromic acids, chromium trioxide, pyridinium chlorochromate, chromate compounds, dichromate compounds, permanganate compounds, potassium permanganate, sodium perborate, nitrous oxide, potassium nitrate, sodium bismuthate or any combination thereof at 100° C. In some examples, the residual oxidizing agent is then removed by centrifuging, or any other separation method, and by washing the reaction mixture. In some examples, the HGO was then re-dispersed in a solvent comprising formic acid, n-Butanol, isopropanol, n-propanol, ethanol, methanol, acetic acid, water, or any combination thereof, to form a stable aqueous dispersion with a high concentration. The HGO may then be reduced chemically and conjugated to form a 3DGF or H3DGF by introducing a weak acid comprising formic acid, ascorbic acid, acetic acid, trichloroacetic acid, hydrofluoric acid, hydrocyanic, hydrogen sulfide or any combination thereof, into the dispersion. The lateral size and thickness of the resulting 3DGF or H3DGF, as described herein, was tuned by employing reaction vessels of different sizes, and by adjusting the volume of the HGO.

Methods of Forming 3DGF Electrodes

Figure 3:
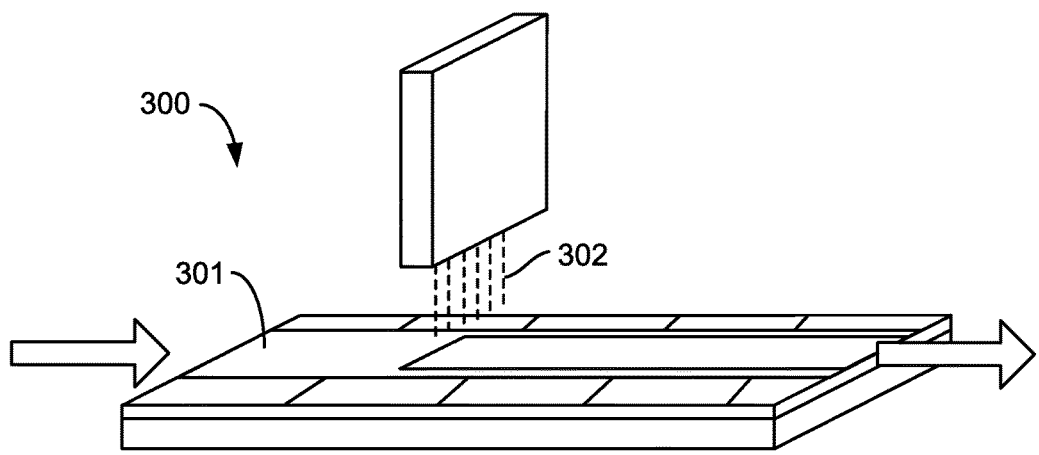
FIG. 3 shows a schematic illustration of a holey graphene ink being deposited on a current collector.

Currently, high performance graphene frameworks based SC electrodes are often formed in a batch process comprising the simultaneous reduction and conjugation GO in an autoclave, which may limit the production throughput. In some embodiments, a more efficient roll-to-roll electrode printing process comprises a continuous GO reduction and conjugation method, and the subsequent formulation of GO ink, GO-Si ink, GO-S ink, or GO-TMO ink, of a certain chemical formulation and viscosity. In some embodiments, a continuous roll-to-roll printing/coating process 300, per FIG. 3, comprises synthesizing and dispersing a GO or HGO precursor in a proper solvent to create a GO or HGO ink 302, coating a current collector 301 with the GO or HGO ink 302 at a controlled temperature and within a proper chemical environment, and subsequently reducing and conjugating the active material on the current collector under ambient conditions through chemicals, heat, autonomic self-assembly, or laser treatment. Such a process cheaply, consistently, and efficiently forms 3DGF, 3DGF-Si, or 3DGF-S, 3DGF-TMO, H3DGF, H3DGF-Si, H3DGF-S and H3DGF-TMO SC electrodes.

Figure 8A:
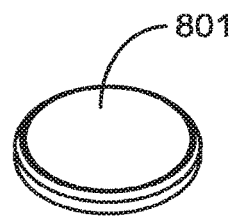
FIG. 8A and FIG. 8B show exemplary photographs that demonstrate the size difference between a coin cell and a pouch cell.
Figure 8B:
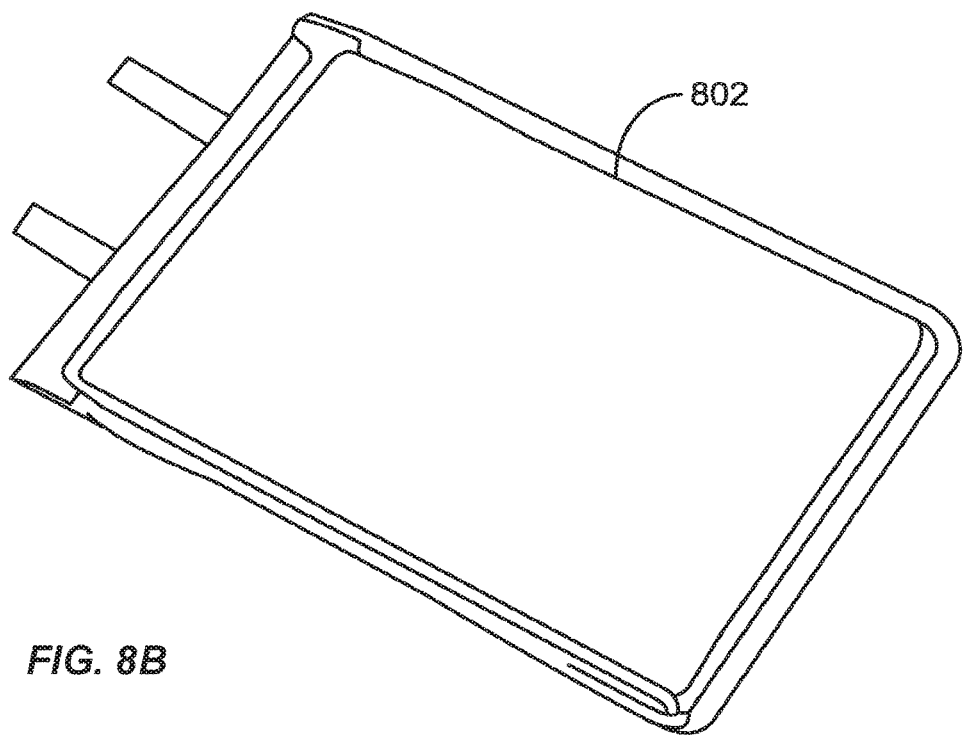

An additional barrier towards the commercial scale production of high performance 3DGF or H3DGF-SCs stems from the size difference between coin 801 and pouch cells 802 per FIGS. 8A-8B. The diameter of a typical commercially available coin cell 801 is around 10 mm, whereas a typical commercially available pouch cell 802 is usually at least about 100-200 mm in lateral size. As current graphene manufacturing methods typically require elevated temperatures for the simultaneous reduction and conjugation of GO, controlling the size and shape of 3DGF or H3DGF electrodes for both SC cell scales may be difficult. As such, 3DGF and H3DGF electrode manufacturing methods, as described herein, were finely tuned to ensure a perfect contact between large, preferably free-standing, graphene electrodes and current collectors. With the demonstration of large pouch cells, H3DGFs can be adapted for many different types of commercially relevant devices.

In some examples, the freestanding 3DGF or H3DGF were pressed onto a metallic foam current collector comprising steel, stainless nickel, aluminum, copper, bismuth, chromium, cobalt, gallium, gold, iron, indium, lead, magnesium, mercury, silver, sodium, tin, titanium, zinc, zirconium, bronze or any combination thereof. In some embodiments, a foam current collector forms a larger 3DGF/current collector contact area than a two dimensional metal foil current collector. In some examples, the 3DGF or H3DGF were directly deposited or printed onto a metallic foam current collector under a controlled condition (chemical reduction, thermal and/or laser reduction etc.), allowing direct reduction of GO and the self-assembly of the 3DGF or H3DGF on the current collector for optimum binding/contact. As metal foams are generally more costly than metallic foils, the HGO, as described herein, was also be directly deposited or printed onto a metallic foil current collector. In some examples, the electrodes formed by these methods display an increased contact surface area between the 3DGF or H3DGF and the current collector to allow for the large-scale manufacturing of consistent SCs.

Methods of Forming 3DGF-Si Electrodes

In some embodiments, a 3DGF or H3DGF silicon composite, with its sufficient empty space, provides a robust conductive network that buffers the volume changes, and stabilizes the formation of SEI, to mitigate capacity degradation, reduce excess electrolyte exhaustion, and improve rate performance.

In some embodiments, methods for composing high performance 3DGF or H3DGF-Si composite electrodes were designed to prevent agglomeration of the electrode material, ensure uniform decoration of nanoscale silicon on graphene, control buffer space, and stabilize the SEI layer. The amphiphilicity of GO and rGO with multiple functional groups offers a variety of potential strategies for the assembly of 3DGF or H3DGFs with nanoscale silicon particles. In some examples, the silicon nanoparticles were loaded onto graphene sheets or into the 3DGF network though a single or double step self-assembly approach, which ensures a high loading ratio. The long-term cycling stability and high-rate performance of 3DGF-Si or H3DGF-Si anodes, as described herein, were evaluated and optimized through studying the van der Waals force interaction between silicon nanostructures and the rGO in 3DGF or H3DGF-Si, using different polymeric surfactants/stabilizers and covalent bonds between a chemically modified silicon surface and the carboxylic functional groups of the GO/rGO. More importantly, to mitigate stress/strain and stabilize the SEI layer during the large expansion and contraction of silicon in the charge/discharge cycles, the robustness of the assembled graphene, as described herein, were investigated by tuning the mechanical properties of the 3D graphene network. Although single layer graphene exhibits an extraordinary Young's modulus of about 1,100 GPa, the mechanical properties of the assembled graphene architecture, as described herein, were optimized by tuning the properties of the graphene such as its thickness, size, alignment, and annealing conditions, which significantly affected the cycling stability and Coulombic efficiency.

Methods of Forming 3DGF-S Electrodes

Figure 4:
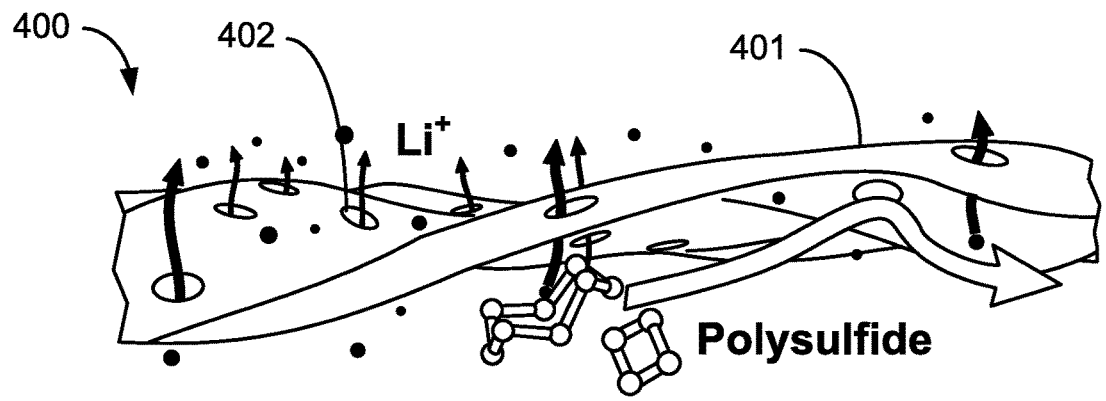
FIG. 4 shows a schematic illustration of a holey three dimensional graphene framework with nanopores whose size allows for the passage of lithium ions while preventing the transfer of larger lithium polysulfides.

Electrodes with a high sulfur loading ratio, as described herein, reduce the mass of the required passive electrode components to allow for a high overall capacity, and reduce the cost of an electrode. Overabundant S-loading, however, may reduce the structural instability of a 3DGF or H3DGF and compromise the electrical conductivity of the electrode. Per FIG. 4, the nanopores 402 on the exemplary graphene sheet 401 were designed and controlled to ensure excellent Li-ion transport, while retarding the shuttling process of larger polysulfide molecules. As such, as described herein, sulfur was uniformly loaded with a specific loading ratio within the 3DGF's and H3DGF's 3D network to fully utilize of the electrochemical properties of sulfur.

In some examples, methods for composing high performance 3DGF-S or H3DGF-S composite electrodes comprise mixing sulfur, an acid, a reactant, and a graphene material, such as GO or rGO, to form a solution, and introducing a reactant into the solution. As such, the reactant reduces the graphene material and conjugates the reduced graphene-containing material into a 3DGF or H3DGF that encapsulates the sulfur particles. In some examples, the acid comprises a strong acid comprising perchloric acid, hydroiodic acid, hydrobromic acid, hydrochloric acid, sulfuric acid, p-toluenesulfonic acid methanesulfonic acid, or any combination thereof. In some examples, the reactant comprises a weak acid comprising formic acid, ascorbic acid, acetic acid, trichloroacetic acid, hydrofluoric acid, hydrocyanic, hydrogen sulfide, or any combination thereof. In some examples, the concentration of the sulfur source may be adjusted to control the amount of sulfur encapsulated within the 3DGF or H3DGF composite. In some examples, the sulfur particles have sizes of about 10 nm to about 100 μm, about 100 nm to about 10 μm, or about 500 nm to about 10 μm. In some of these cases, no additional binders are employed. In some examples, no additional conductive additives are employed. In some of these cases, no additional binders or conductive additives are employed.

In some examples, the sulfur content of an electrode, expressed as a weight or mass percentage relative to a total weight of the electrode, is greater than about 60%, such as about 65% or greater, as about 70% or greater, as about 75% or greater, as about 80% or greater, as about 85% or greater, or about 90% or greater.

In some examples, a high capacity sulfur cathode, such as a freestanding 3DGF or H3DGF with a highly efficient sulfur loading was formed from a graphene-based material through a one-pot method comprising an efficient chemical reaction whereby a reactant may be subjected to successive chemical reactions in just one reactor.

Figure 7:
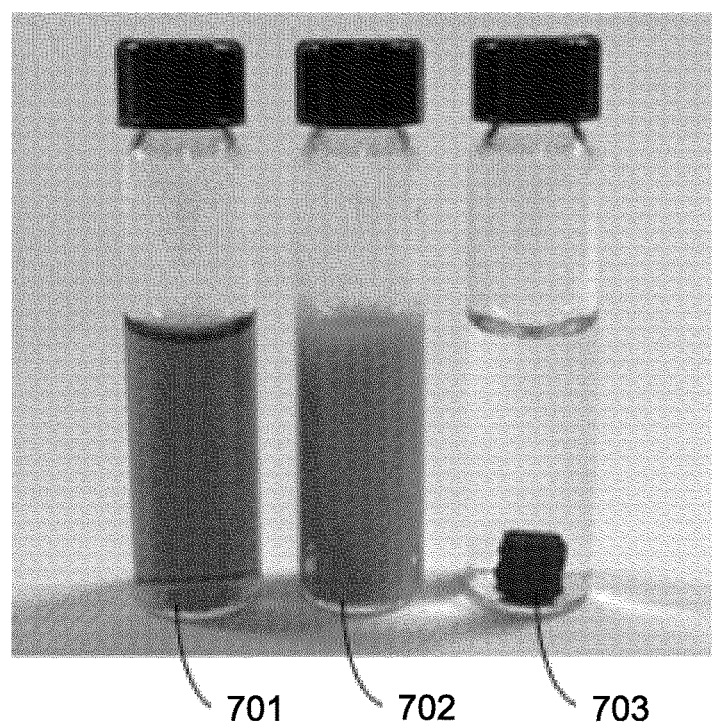
FIG. 7 shows exemplary photographs of solutions of graphene oxide, graphene oxide with $Na_2S_2O_3$ and HCl, and a reduced graphene oxide in ascorbic acid.

Per FIG. 7, an exemplary 3DGF-S composite electrode was prepared by a facile one-pot synthesis comprising mixing a sulfur precursor/source (e.g., $Na_2S_2O_3$) and an acid (e.g., HCl) in the presence of a graphene-containing material/source (e.g., graphene oxide (GO) flakes), to initiate the following chemical reaction:

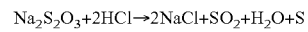

$$Na_2S_2O_3 + 2HCl \rightarrow 2NaCl + SO_2 + H_2O + S$$

As such, introduction of the ascorbic acid to drive the reduction of GO and conjugate the reduced GO into the 3D graphene hydrogel with encapsulated sulfur particles induces the 3DGF-S or 3DGF-S composite. Per, FIG. 7 the exemplary GO solution 701 shows a brownish color, while the exemplary solution of GO with $Na_2S_2O_3$ and HCl 702 displays a milky cloudy suspension, indicating the presence of a high number of sulfur particles. The introduction of ascorbic acid allows for the formation of a mechanically strong freestanding 3DGF-S composite hydrogel 703. The resulting 3DGF-S composite hydrogel in the reaction solution displays a freestanding structure and clear supernatant solution, indicating that a majority of the GO and sulfur particles were conjugated together to form a composite hydrogel with negligible GO or sulfur left in the solution. The exemplary 3DGF-S composite hydrogel were then freeze-dried for subsequent use. As such 3DGF-S composites with about 70%, about 80%, about 90%, and about 95% sulfur content (denoted as 3DGF-S70, 3DGF-S80, 3DGF-S90, and 3DGF-S95, respectively) were prepared.

As described herein, a variety of alternative sulfur loading methods were explored and evaluated comprising reducing a sulfur precursor (e.g., $Na_2S_2O_3$), a melt diffusion approach, a CVD approach, and drop casting sulfur nanoparticles onto the hydrogel. The quantity of sulfur and graphene were adjusted to tune the loading ratio, cyclability, stability and the shape of the overall structure of the electrode. As described herein, sulfur loading ratios of 60-95% were readily achieved.

In some examples, an exemplary 3DGF-S90 electrode was formed by mixing about 0.1 mL of $Na_2S_2O_3$, whose concentration is about 1 M, with about 0.22 mL of an about 2.3 g/L GO suspension, and about 0.58 mL of deionized water, to form a first solution. About 0.1 mL of about 2 M HCl was then added drop-wise to the first solution, and the resulting solution was stirring for a period of time of about 2 hours. About 20 µL of about 1 M ascorbic acid was then added to the prior solution, and heated for a period of time of about 2 hours, at a temperature of about 95° C. to form a hydrogel, wherein the hydrogel was then washed several times with water, and freeze-dried. The amounts of the $Na_2S_2O_3$ and HCl were tuned to synthesize 3DGF-S70, 80, 95, H3DGF-S70, 80, and 95 using the same method.

Methods of Forming 3DGF-TMO Electrodes

With its high surface area and conductivity, 3DGF and H3DGF, as described herein, form an efficient scaffold for nanoscale TMO loading, to simultaneously ensure efficient electron transport through the graphene network, and an ultra-short distance and rapid ion intercalation into the nanoscale TMOs.

In some examples, an electrode comprises a 3DGF or H3DGF and a layer of a TMO. In some examples a thin layer (e.g., about 10 nm) of a TMO was uniformly deposited on the graphene sheet, to ensure a high loading ratio (about 80-90%), a short electron and ion transport distance within the highly resistive TMO, and an efficient electron transport across the graphene-TMO interface. In some examples, the selected TMOs (e.g., $T-Nb_2O_5$) were loaded onto graphene sheets or into a 3DGF or H3DGF before, during, or after the formation of its 3D structures, through direct nucleation and growth of TMO nanocrystals, or through a sol-gel infiltration approach. In some examples, the composition, crystallinity, morphology, and nano/micro-structures of the composite electrodes, as described herein, were systematically tuned to achieve the desired electrochemical properties of an electrode, by varying the concentration or ratio of a precursor, and the conjugation conditions.

Figure 10:
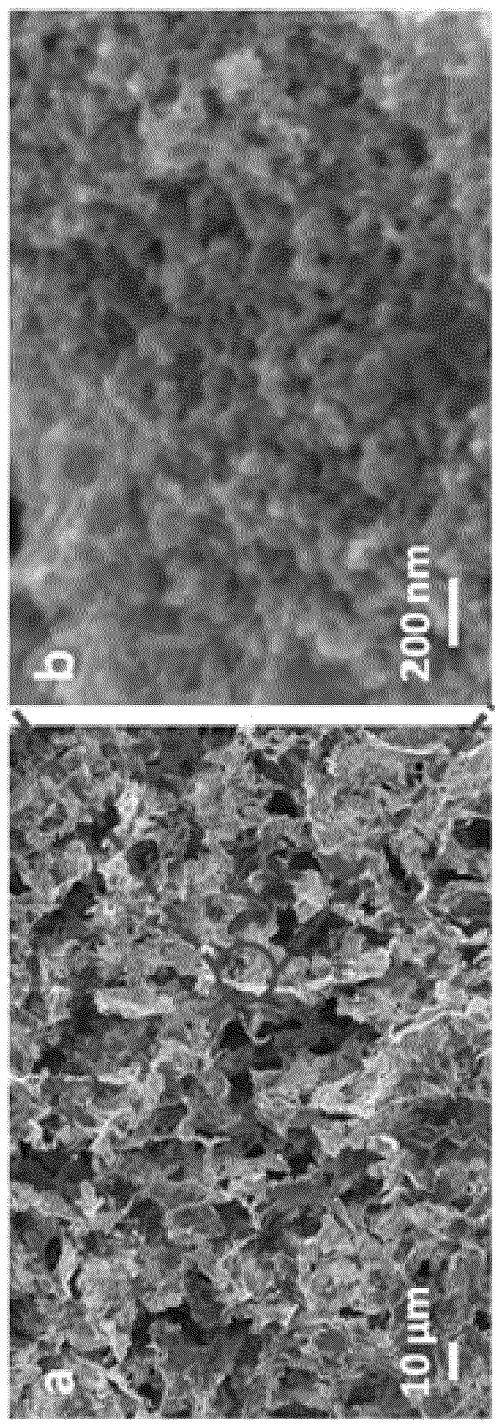
FIG. 10 shows exemplary SEM images of a H3DGF-$Nb_2O_5$ composite.

A SC that employs an aqueous electrolyte with low operation voltages may be unable to deliver a high energy density. Per FIG. 10, some TMOs, such as $TiO_2$ and $T-Nb_2O_5$, exhibit intrinsic intercalation pseudo-capacitance in non-aqueous electrolytes. The combination of such TMO electrode materials in anodes or cathodes, with a carbonaceous electrode in an organic electrolyte, as described herein, provides devices with both high energy and high power densities. However, the kinetic mismatch between a TMO anode, using the Faradaic lithium intercalation reaction, and a carbonaceous cathode, using physical adsorption/desorption of electrolyte ions, may represent a potential barrier to the production of high performance TMO composite SCs. To this end, as described herein, high-power anode materials mitigate the aforementioned kinetic gap. In some embodiments, the integration of a nanostructured TMO (e.g., $T-Nb_2O_5$) with a 3DGF or H3DGF, that exhibits a highly conductivity and high surface area, offers an ideal solution in this regard.

$T-Nb_2O_5$ is an ideal high-rate anodic composite material in hybrid systems because it exhibits a pseudo-capacitive mechanism which offers two-dimensional transport pathways, little structural change on intercalation, and no limitations from solid-state diffusion. However, because $T-Nb_2O_5$ has a relatively low theoretical capacity of about 200 mAh/g, alternative TMOs with higher theoretical capacities, such as $Fe_3O_4$, as described herein, were employed to form high capacity 3DGF-TMO or H3DGF-TMO composite anodes. In this case, the rate-capability of $Fe_3O_4$ can be mitigated by loading ultrafine $Fe_3O_4$ nanoparticles on or within the conductive scaffold, as described herein.

In some embodiments, a transition metal oxide comprises $Nb_2O_5$, $Al_2O_3$, $V_2O_5$, $Re_2O_7$, $CrO_3$, $CeO_2$, $RuO_2$, $ZrO_2$, $MoO_3$, $WO_3$, $TiO_2$, or any combination thereof.

Methods of Measuring Electrode Performance

In some examples, a SEM JEOL 6700 was employed for scanning electron microscopy. In some examples, a TEM T12 Quick CryoEM was employed for transmission electron microscopy. In some examples, a Panalytical X'Pert Pro X-ray Powder Diffractometer with Cu K-alpha radiation was employed for X-ray Diffraction (XRD). In some examples, an Axis Ultra DLD was employed for X-ray photoelectron spectroscopy. In some examples, TGA was carried out using PerkinElmer instruments Pyris Diamond TG/DTA.

In some examples, the electrochemical properties of an electrode were measured by assembling an electrode into a CR2025 coin cells, in an argon filled glovebox with water, whose oxygen content is kept below 0.1 ppm. In some examples, the mechanically pressed 3DGF-S samples with thickness of about 100 µm were directly used as the cathodes, whereas a lithium foil was used as an anode. In some examples, the electrolyte used to characterize the electrodes comprised a solution of lithium bis(trifluoromethanesulphonyl)imide (about 1 M) in about 1:1 v/v 1,2-dimethoxyethane (DME) and 1,3-dioxolane (DOL) containing $LiNO_3$ (about 1 weight %). In some examples, the 3DGF-90 cathode exhibited an area of about 0.636 $cm^2$ (a disk with a diameter of about 9 mm) and a sulfur mass loading of about 4.32 mg/$cm^2$. In some examples, galvanostatic charge/discharge cycling was carried out at a potential range of about 1.6-2.6 V vs. Li/$Li^+$ with a multichannel battery testing system (LAND CT2001A).

In some examples, the electrochemical properties of an electrode were measured by employing the electrode as a cathode in a Li—S battery cathode without any additives.

In some examples, the exemplary 3DGF or H3DGF electrodes employed in some experiments have a thickness about 140 µm, and mass loading of about 10 mg/$cm^2$, which is comparable to that of commercial SCs.

The electrochemical properties of the 3DGF and H3DGF based electrodes were investigated within symmetric and asymmetric SCs using two or three-electrode configurations in both aqueous and non-aqueous electrolytes. Full cell tests were used to evaluate the overall energy density of exemplary hybrid supercapacitors (e.g., H3DGF-TMO/H3DGF) in an non-aqueous electrolyte (e.g., $LiPF_6$ in mixture of EC/DMC) or in an ionic liquid electrolyte ($EMIMBF_4$/AN).

Although gravimetric capacitance has been traditionally used as the figure-of-merit to evaluate SC electrodes, the measurement of volumetric performance is an important metric for electrical energy storage applications with limited space, such as portable electronic products and EVs. Many electrodes, however, are still designed to optimize the trade-off between gravimetric and volumetric capacitance of graphene.

Some experimental procedures derive device performance from the characteristics of a relatively thin electrode (e.g., 100 nm), whose active electrodes have a low active material mass loading. The performance of such thin electrode devices, however, may not always extrapolate to predict the performance of thick electrodes, due to the reduced vertical ion diffusion distance of thin electrodes. As such, in some examples, the exemplary stack energy densities in this disclosure were determined by experiments on practical devices, with sizes and masses comparable to commercial devices. This demonstrates that the performance of devices disclosed here may be fundamentally scalable, which may be particularly significant for practical applications and large-scale commercialization.

Performance and Characteristics of Exemplary 3D Graphene Frameworks

Figure 11:
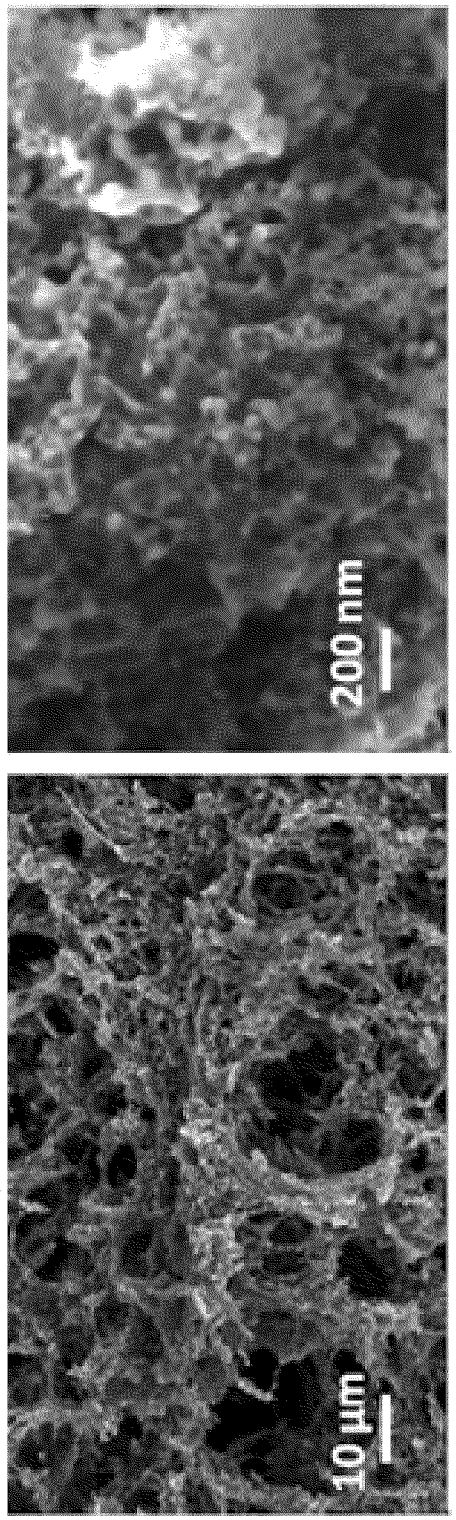
FIG. 11 shows exemplary SEM images of a H3DGF-Si composite with high mass loading.

FIG. 11 shows SEM image of an exemplary H3DGF-Si composite with a high mass loading.

Figure 12A:
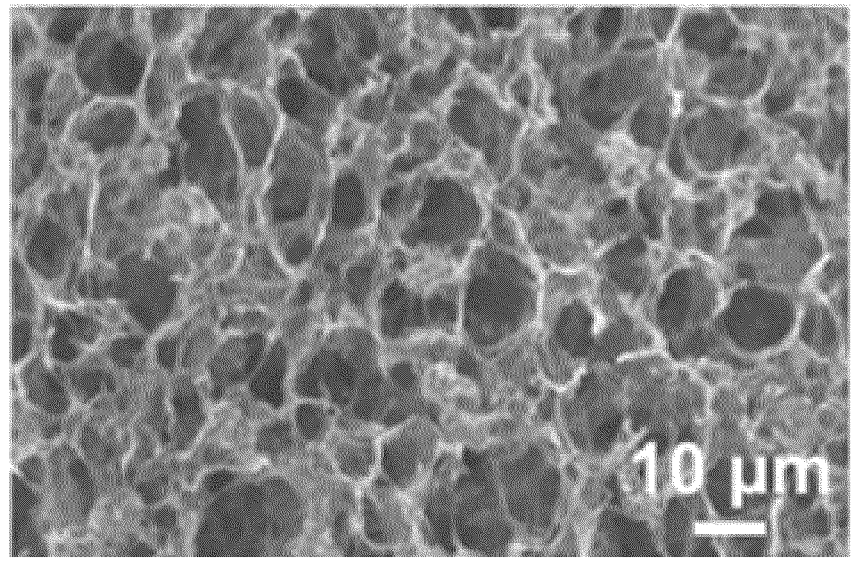
FIG. 12A and FIG. 12B show exemplary cross-sectional SEM images of the porous interconnected framework of a 3DGF-S composite, and the 1-μm sulfur particles within.
Figure 12B:
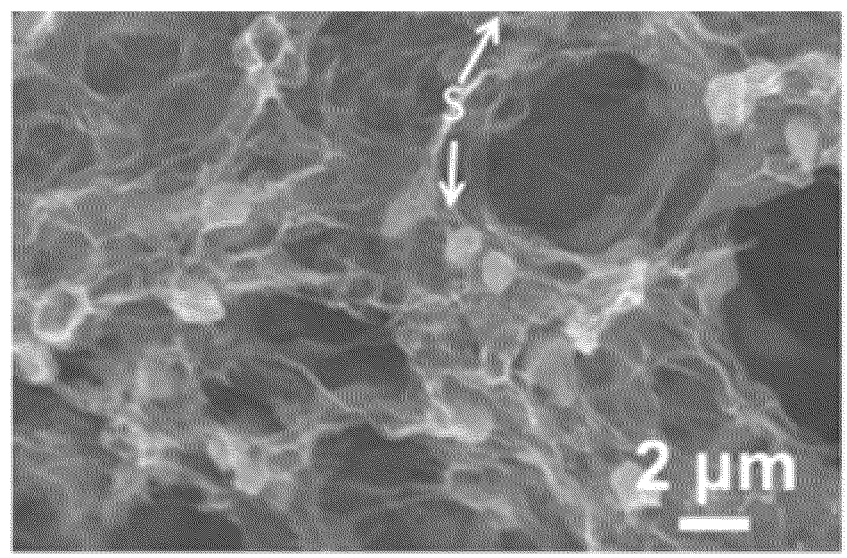

The effect of sulfur deposition via a precursor on the graphene within a non-H3DGF 3D graphene framework is seen per the cross-sectional SEM images of an exemplary H3DGF-S in FIG. 12A, and the 1-μm sulfur particles within, per FIG. 12B.

Figure 13:
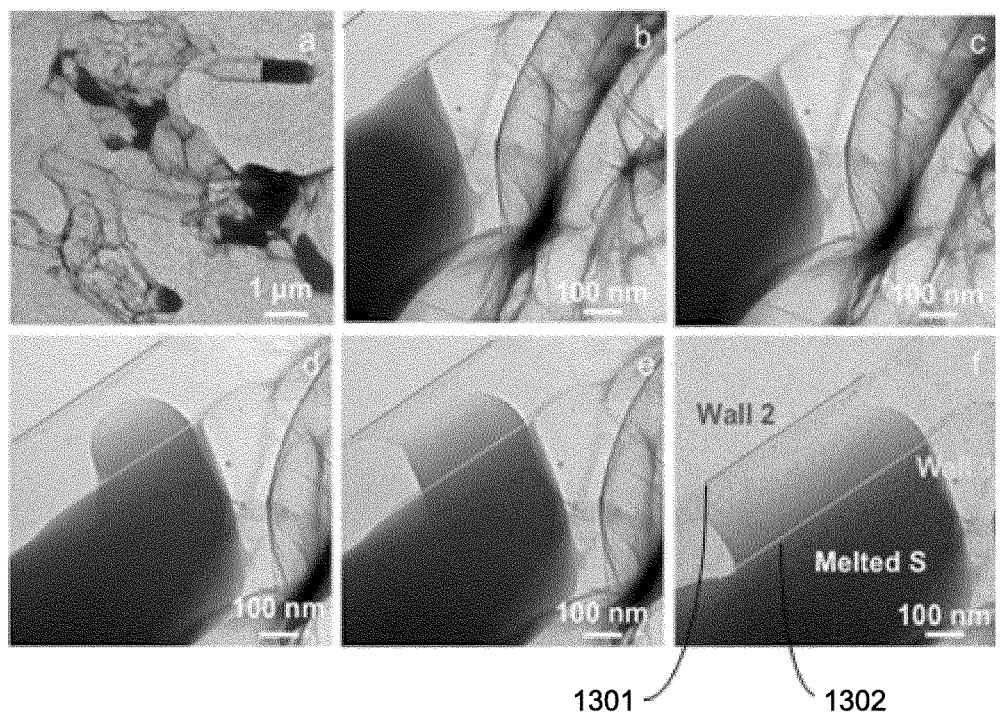
FIG. 13 shows exemplary low-magnification TEM images of sulfur particles encapsulated in a 3DGF-S composite electrode, and multiple frames of the movement of melted sulfur contained within the graphene pockets.

Further, FIG. 13 presents exemplary low-magnification TEM images of sulfur particles encapsulated in the 3DGF and delineates the movement of melted sulfur within the graphene pocket, whereas the dotted lines indicate the walls of the graphene pocket. As shown, the exemplary TEM's strong electron beam irradiation causes the sulfur particles to dynamically flow within the 3DGF without leaking out onto the copper grid. As shown, the melted sulfur flowed across graphene wall-1 1301 of the 3DGF, but was then stopped by graphene wall-2 1302 of the 3DGF. As such, these images confirm that the sulfur is well encapsulated within 3DGF's multi-level pockets and walls, to efficiently inhibit or mitigate the leakage of the liquid sulfur. Additionally, because the solid-liquid phase transformation of sulfur into soluble polysulfide in an electrolyte during a discharge process is similar to the observed melting process, the encapsulation of sulfur by a 3DGF or H3DGF is an effective means to retard the polysulfide shuttling effect.

Figure 14:
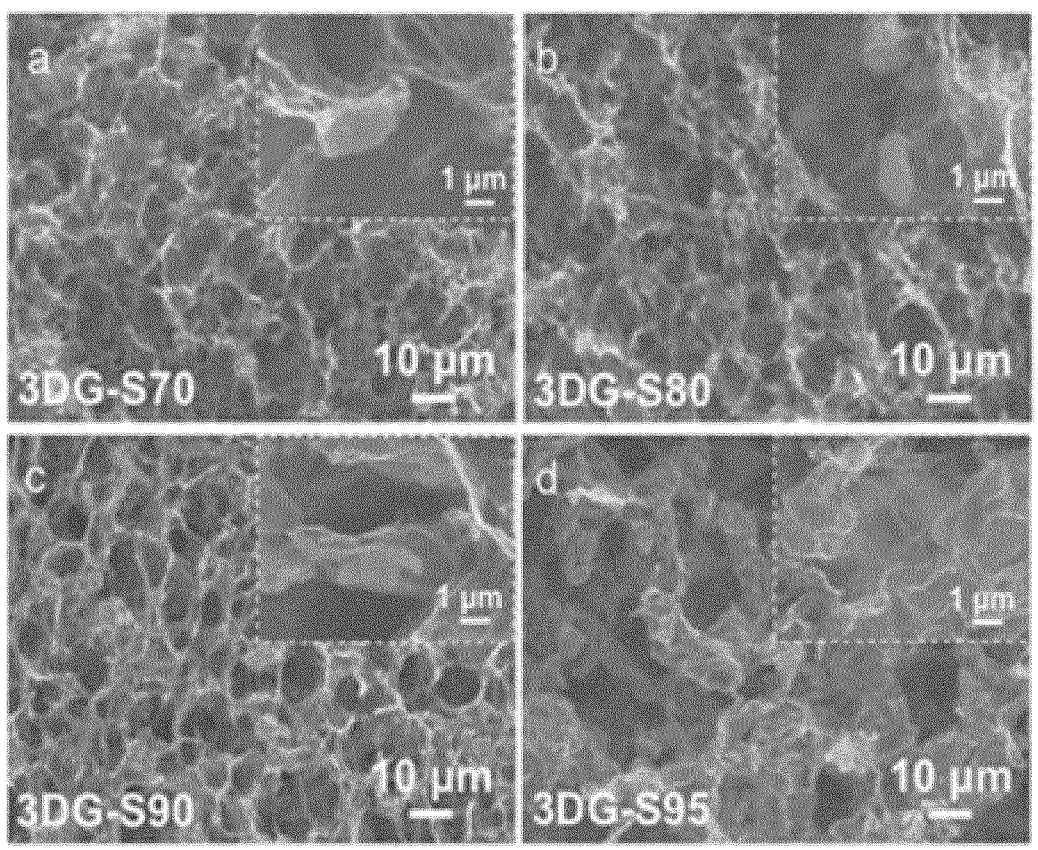
FIG. 14 shows exemplary low and high magnification SEM images of an exemplary 3DGF-S.

The scanning electron microscopic (SEM) images of the cross-section views of exemplary 3DGF-S70, 80, 90, and 95 composites, per FIG. 14, show similar micron-scale porous structures, and comparable sulfur particle sizes of about 1 μm. The exemplary 3DGF-S95 SEM images display a distinct mechanically fragile structure, with sulfur particles that cover the majority of the graphene sheets. It should be noted that increasing the sulfur loading from about 90% to about 95% approximately doubles the mass of the sulfur.

Figure 15:
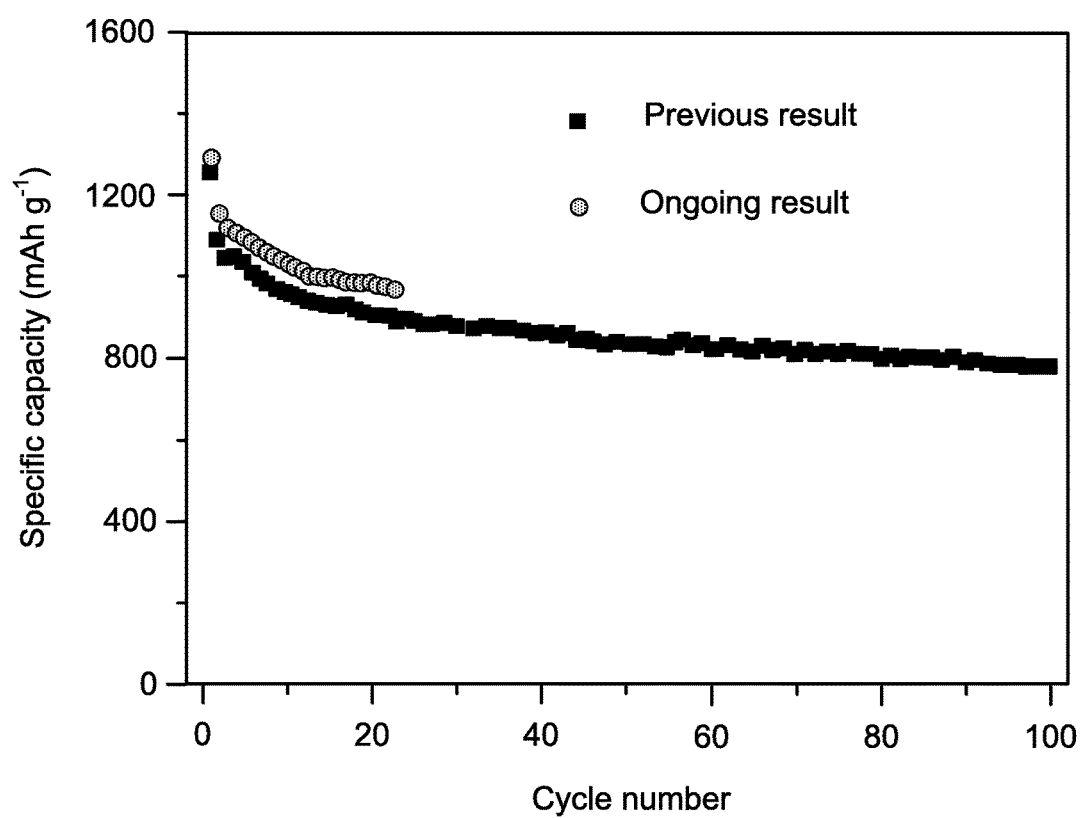
FIG. 15 shows exemplary galvanostatic testing results of a H3DGF-S composite.

In some examples, the exemplary H3DGF-S cathodes with a loading percent of about 70% exhibit a sulfur-specific capacity of about 1,252 mAh/g, per FIG. 15.

Figure 16:
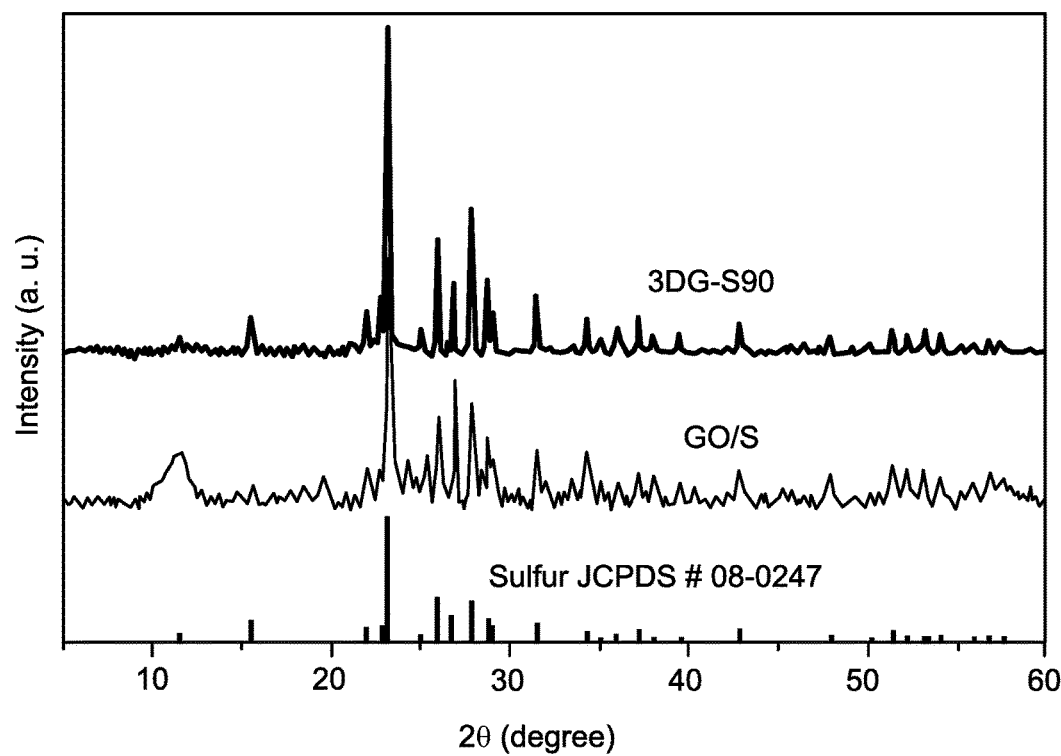
FIG. 16 shows exemplary X-ray diffraction results of pure sulfur, graphene oxide/sulfur and 3DGF-S with a sulfur content of about 90% (3DGF-S).

Per FIG. 16, X-ray diffraction (XRD) characterizations of an exemplary 3DGF-S90 before and after the reduction process and the formation of 3DGF-S composite, show an initial broad GO peak at about 11.6°, that diminishes after reduction with ascorbic acid, and rGO peaks at about 22.2°, that signify successful reduction of GO. The exemplary XRD spectra displays well-defined diffraction peaks for orthorhombic phase sulfur (JCPDS No. 08-0247), before and after reduction, confirming the successful incorporation of sulfur into the 3DGF.

Figure 17:
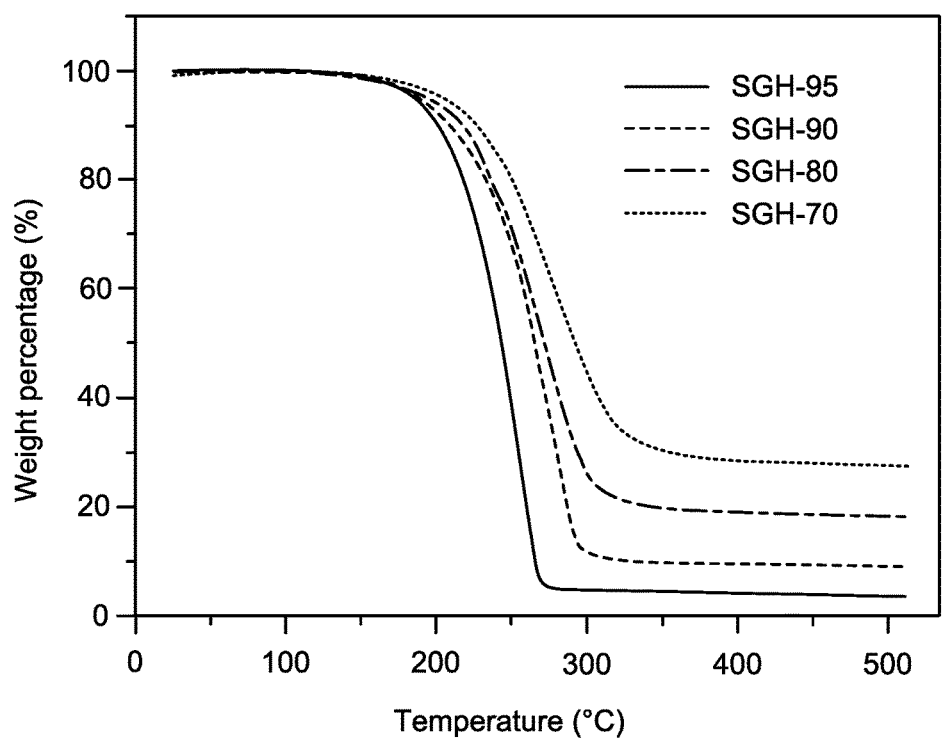
FIG. 17 shows exemplary thermographic test results of H3DGF-S composites with different sulfur loading percentages.

Thermogravimetric analysis (TGA), per FIG. 17, determines the sulfur loading of the composite structures. The TGA studies of the exemplary 3DGF-S composites show a weight reduction when the temperature is increased above about 200° C., corresponding to sulfur sublimation temperature. To determine the sulfur content, TGA was conducted on an exemplary pure 3DGF, without sulfur, to account for the weight contribution from the graphene itself After weight loss calibration, the exemplary samples' sulfur contents were determined to be about 70%, about 80%, about 90%, and about 95%. A methylene blue absorption test determined that the surface areas of the 3DGF, with and without sulfur, are highly comparable and approximately 900 m²/g when normalized by the amount of carbon, thus indicating that the inclusion of sulfur does not significant impact the overall structure of the 3DGF.

Figure 18A:
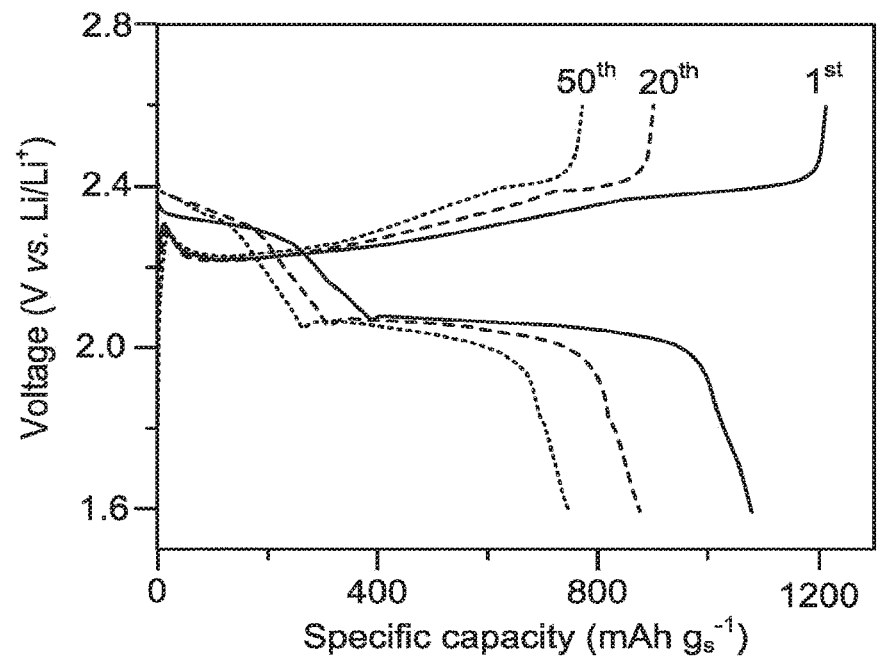
FIG. 18A, FIG. 18B, FIG. 18C, FIG. 18D, and FIG. 18E show exemplary charge and discharge profiles of the $1^{st}$, $20^{th}$ and $50^{th}$ cycles of 3DGF-S90, the cycling performance of 3DGF-S70, 80, 90, and 95 at 0.1 C, the rate performance of 3DGF-S90 at 0.2 C, 0.5 C, 1 C, and 2 C, and 3DGF-S90 cycling at 1 C for 500 cycles.

The electrochemical performance of exemplary 3DGF-S electrodes was further evaluated, per FIGS. 18A-18E, through the application of freeze-dried 3DGF-S as freestanding composite cathodes without any additives. Although the capacities of Li—S batteries are often normalized by the volume or mass of sulfur, whereas the less sulfur the higher the capacity may be expected, these exemplary measurements do not account for the weight of binders or conductive additives. As such, the exemplary measurements in FIG. 18A, are normalized by the total weight of the electrode, and highlight the major performance improvements of the disclosure herein.

Figure 18B:
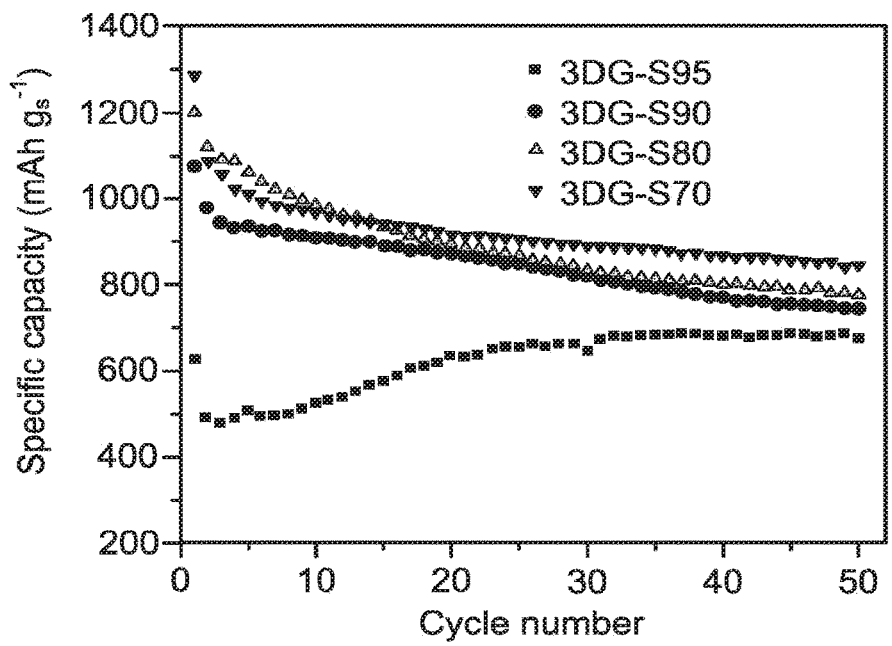
Figure 18C:
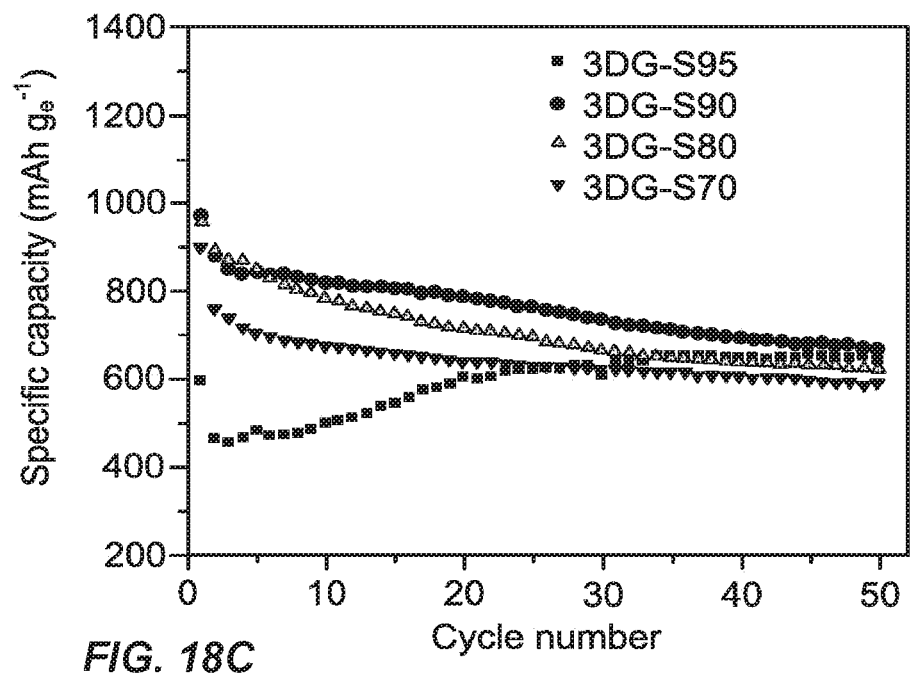

Per FIG. 18A, the galvanostatic testing discharge/charge curves of an exemplary 3DGF-S90 at 0.1 C, under a voltage range of about 1.6-2.6 V (vs. Li$^+$/Li), display a plateau at about 2.32 V and at about 2.08 V, which indicates the formation of long-chain ($Li_2S_x$, 4≤x≤8) and short-chain polysulfides ($Li_2S_2$ or $Li_2S$). In its first cycle of use, the 3DGF-S90 exhibits a capacity of about 1,070 mAh/g. The discharge/charge curves at the 20$^{th}$ and 50$^{th}$ cycles of use also clearly display two plateaus, indicating good electrochemical stability. FIG. 18B and FIG. 18C illustrate the cycling capabilities of exemplary 3DGF-S samples at 0.1 C, normalized by the sulfur weight and by the electrode's weight, respectively. Per FIG. 18C, the 3DG-S90 cathode exhibits a good cycling response at various current rates and the capacity is able to recover to 657 mAh/g at 0.2 C.

TABLE 1

Comparison of Sulfur-Specific Capacities

| | Sulfur-Specific Capacity (@ C-rate = 0.1) | |
|---|---|---|
| | at 0 Cycles | at 50 Cycles |
| 3DGF-S70 | 1,286 | 846 |
| 3DGF-S80 | 1,200 | 777 |
| 3DGF-S90 | 1,077 | 746 |
| 3DGF-S95 | 628 | 673 |

Per Table 1 and FIG. 18B, the initial capacities for the exemplary 3DGF-S70, 80, 90 and 95 electrodes are about 1,286 mAh/g, about 1,200 mAh/g, about 1,077 mAh/g, and about 628 mAh/g, respectively. As expected, a lower sulfur loading yields a higher sulfur-specific capacity, because less sulfur in the graphene framework yields more electron and ion transport pathways thus efficiently employing the benefits of sulfur. After 50 cycles, the capacities of the 3DGF-S70, 80 and 90 electrodes decrease to about 846 mAh/g, about 777 mAh/g, and about 746 mAh/g, respectively. The gradual increase in the specific capacity of 3DGF-S95 to about 673 mAh/g after 50 cycles may be attributed to the excessive insulation caused by sulfur in the framework that demands a long activation process to gradually utilize the deep-buried sulfur.

Figure 18D:
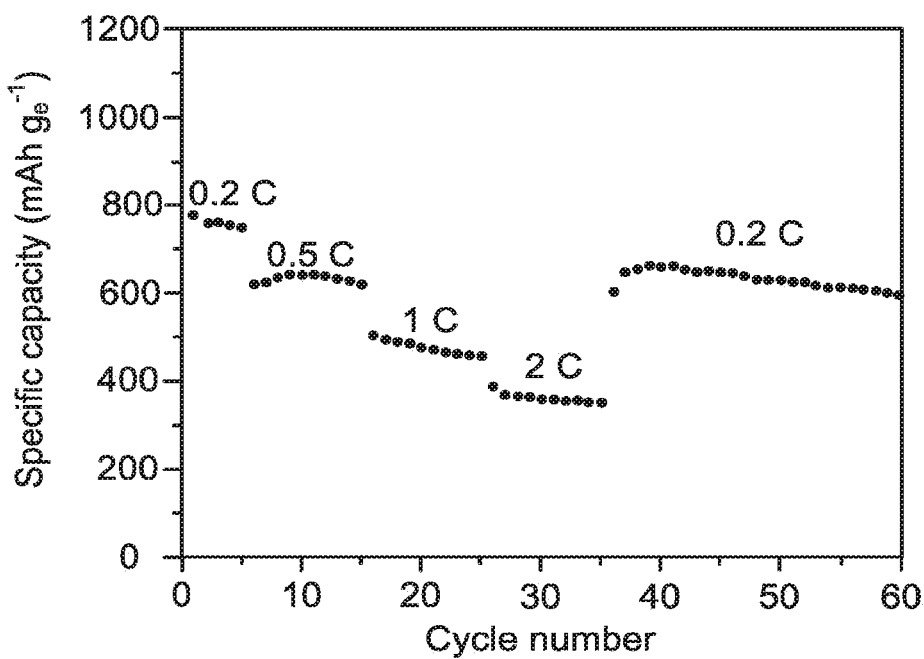
Figure 18E:
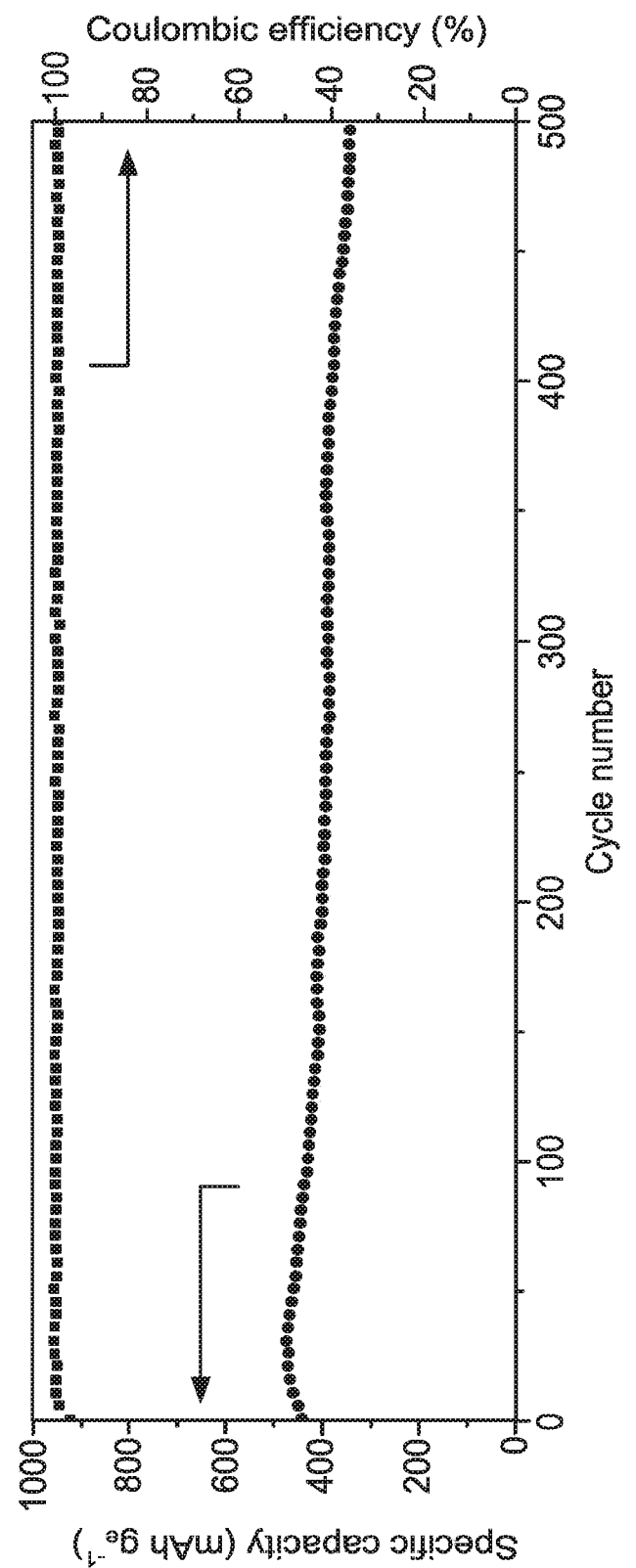

FIG. 18D illustrates the rate performance of exemplary 3DGF-S90 electrodes normalized by the mass of the entire electrode, whereas the initial capacities at C-rates of 0.2, 0.5, 1.0, and 2 C are about 772 mAh/g, about 615 mAh/g, about 500 mAh/g, and about 381 mAh/g, respectively. As such, the high intrinsic capacity of the 3DGF-S90 at a C-rate of about 1.0 delivers a power density of more than one order of magnitude higher than of a conventional lithium ion battery at that rate. It is important to note that although the C-rate is typically normalized by the weight of the sulfur only, the power densities reported herein are normalized by total mass of the electrode. The 3DGF-S90 cathode exhibits a good cycling response at various current rates and the capacity is able to recover to about 657 mAh/g at 0.2 C. FIG. 18E illustrates the long-life performance of the 3DGF-S90 cathode at 1 C. The initial specific discharge capacity normalized by the entire electrode mass is about 441 mAh/g, which increases gradually to about 473 mAh/g after 30 cycles due to the activation process, and to 341 mAh/g after 500 cycles, corresponding to a capacity retention of 77% and a capacity fading of about 0.052% per cycle. After the initial activation process that occurs during the first 10 cycles, the Coulombic efficiency is consistently maintained at about 99.5% throughout cycling.

TABLE 2

3DGF-S90 Performance Capabilities

3DGF-S90 Capacities [mAh/g]

| Sulfur-Specific-Charging (C-rate = 0.1) | |
|---|---|
| after 0 cycles | 1,077 |
| after 10 cycles | 824 |
| after 20 cycles | 790 |
| after 50 cycles | 746 |
| Sulfur-Specific-Discharging (C-rate 1) | |
| after 0 cycles | 441 |
| after 30 cycles | 473 |
| after 500 cycles | 341 |
| Electrode-Specific | |
| at C-rate = 0.1 | 969 |
| at C-rate = 0.2 | 772 |
| at C-rate = 0.5 | 615 |
| at C-rate = 1.0 | 500 |
| at C-rate = 2.0 | 381 |

The performance characteristics of the 3DGF-S90 are enumerated above in Table 2. In summary, this disclosure has reported the design and synthesis of a freestanding 3D graphene-sulfur composite using a one-pot synthesis method. The combination of the highly conductive interconnected and mechanically strong 3D graphene and the enclosed sulfur particles yielded a high performance sulfur-cathode with a record-high capacity of about 969 mAh/g, when normalized by the weight of entire cathode at 0.1 C, and a stable cycling endurance up to 500 cycles at 1 C with a capacity fading of about 0.052% per cycle. These results demonstrate that the free-standing 3DGF with an ultra-high sulfur content offers a promising pathway to a highly robust EESD.

Performance and Characteristics of Exemplary Supercapacitors with 3D Graphene Framework Electrodes Exemplary SCs were fabricated according to methods described herein. In some examples as described herein, H3DGF-TMO, H3DGF-Si and H3DGF electrodes are coupled to form supercapacitor devices with high energy and high power densities, and a long cycling life.

Fully packaged 3DGF and H3DGF-SC coin cells exhibit a stack gravimetric and volumetric energy densities of about 35 Wh/kg and about 49 Wh/L (normalized by the total weight or volume of the device including both electrodes, current collectors, electrolyte, separator, and packaging). 3DGF or H3DGF electrodes disclosed herein contain an areal mass loading of about 10 mg/cm$^2$ or more, which, when employed in the SC devices disclosed herein, deliver an areal energy density of about 23 Wh/m$^2$ or more, at an areal power density of about 176 Wh/m$^2$ or more.

Exemplary fully packaged symmetrical SC were made from 3DGFs and H3DGFs which delivered a record-high energy density (about 35 Wh/kg and about 50 Wh/L) that is about 10 times greater than those of the commercial SCs.

An exemplary hybrid H3DGF-TMO/H3DGF SCs with a H3DGF-TMO composite anode achieved an overall energy density of about 16-45 Wh/kg or more based on the total weight of the device (about 40-140 Wh/kg based on the weight of electrode materials), while retaining the power density of typical SCs (about 1-10 kW/kg).

An exemplary H3DGF-Si composite anode with high specific capacity (about 500-2,000 mAh/g) and low operation voltage potential (less than about 0.5 V) increases the stack energy density of H3DGF-Si/H3DGF hybrid SCs to about 40-100 Wh/kg. Additionally, H3DGF-Si composite anodes and H3DGF-S composite cathodes were used to form a H3DGF-Si/H3DGF-S EESD with an energy density of about 150-450 Wh/kg.

What is claimed is:

1. An electrode comprising a holey 3D graphene framework, comprising:
    a) an interconnected conductive network of holey graphene sheets, wherein nanopores are formed within the holey graphene sheets; and
    b) a capacitive or pseudo-capacitive material comprising sulfur particles, wherein the sulfur particles are encapsulated within the interconnected conductive network of holey graphene sheets, wherein the encapsulation inhibits polysulfide shuttling;
    wherein the electrode has a sulfur content of at least 60% by weight or mass of a total weight or mass of the electrode.

2. The electrode of claim 1, further comprising a current collector.

3. The electrode of claim 1, wherein the electrode has a specific surface area of about 450 m$^2$/g to about 1,800 m$^2$/g.

4. The electrode of claim 1, wherein the electrode has a loading ratio of about 30% to about 99%.

5. The electrode of claim 1, wherein the electrode has a cycle lifetime of about 500 cycles to about 2,000,000 cycles.

6. The electrode of claim 1, wherein the electrode has a specific capacity at a C-rate of about 0.1 of about 480 mAh/g to about 1,940 mAh/g.

7. The electrode of claim 1, wherein the electrode has a porosity of about 90% to about 99%.

8. The electrode of claim 1, wherein the nanopores have a pore diameter of about 1 nm to about 1,000 nm.

9. The electrode of claim 1, wherein the holey graphene sheets of the interconnected conductive network are conjugated and interlocked together to form a monolithic mechanically strong three-dimensional network.

10. The electrode of claim 1, wherein the nanopores are configured to allow lithium ion transport through the nanopores while inhibiting polysulfide shuttling.

11. The electrode of claim 1, wherein the sulfur particles have a size of about 10 nm to about 100 μm.

12. An energy storage device comprising:
    a) a first electrode and a second electrode; and
    b) an electrolyte;
    wherein at least one of the first electrode or the second electrode comprises a holey 3D graphene framework, wherein the holey 3D graphene framework comprises an interconnected conductive network of holey graphene sheets, wherein nanopores are formed within the holey graphene sheets;
    wherein the at least one of the first electrode or the second electrode further comprises a capacitive or pseudo-capacitive material comprising sulfur particles, wherein the sulfur particles are encapsulated within the interconnected conductive network of holey graphene sheets, wherein the encapsulation inhibits polysulfide shuttling; and wherein the at least one of the first electrode or the second electrode has a sulfur content of at least 60% by weight or mass of a total weight or mass of the electrode.

13. The energy storage device of claim 12, wherein the electrolyte is a non-aqueous electrolyte comprising lithium hexafluorophosphate, iodomethane, dimethyl sulfate, dimethyl carbonate, tetramethylammonium chloride, methyl triflate, diazomethane, methyl fluorosulfonate ethyl acetate, acetone, dimethylformamide, acetonitrile, dimethyl sulfoxide, nitromethane, propylene carbonate, ethylene carbonate, lithium bis(trifluoromethanesulphonyl)imide, 1-2 dimethoxyethane, 1,3-dioxolane, lithium nitrate, or any combination thereof.

14. The energy storage device of claim 12, wherein the energy storage device has a stack-specific energy density of about 16 Wh/kg to about 750 Wh/kg.

15. The energy storage device of claim 12, wherein the energy storage device has a stack-specific power density of about 0.5 kW/kg to about 8 kW/kg.

16. The energy storage device of claim 12, wherein the energy storage device has an electrode-specific gravimetric energy density of about 16 Wh/kg to about 750 WW/kg.

17. The energy storage device of claim 12, wherein the energy storage device has an electrode-specific gravimetric power density of about 0.5 kW/kg to about 18 kW/kg.

18. The energy storage device of claim 12, wherein the energy storage device has a total capacitance of about 50 F to about 1000 F.

19. The energy storage device of claim 12, wherein the nanopores have a pore diameter of about 1 nm to about 1,000 nm.

20. The energy storage device of claim 12, wherein the holey graphene sheets of the interconnected conductive network are conjugated and interlocked together to form a monolithic mechanically strong three-dimensional network.

21. The energy storage device of claim 12, wherein the nanopores are configured to allow lithium ion transport through the nanopores while inhibiting polysulfide shuttling.

22. The energy storage device of claim 12, wherein the sulfur particles have a size of about 10 nm to about 100 μm.

* * * * *